United States Patent

Inoue et al.

[11] Patent Number: 5,870,132
[45] Date of Patent: Feb. 9, 1999

[54] LASER BEAM SCANNING IMAGE FORMING APPARATUS HAVING TWO-DIMENSIONALLY DISPOSED LIGHT EMITTING PORTIONS

[75] Inventors: Nozomu Inoue; Kyu Takada; Hajime Kurihara; Yoshiro Koga, all of Suwa, Japan

[73] Assignee: Seiko Epson Corporation, Tokyo-to, Japan

[21] Appl. No.: 878,900

[22] Filed: Jun. 19, 1997

Related U.S. Application Data

[60] Continuation of Ser. No. 466,602, Jun. 6, 1995, abandoned, which is a division of Ser. No. 971,908, Dec. 18, 1992, Pat. No. 5,610,647.

[30] Foreign Application Priority Data

| May 14, 1991 | [JP] | Japan | 3-109114 |
| May 14, 1991 | [JP] | Japan | 3-109115 |
| Feb. 20, 1992 | [JP] | Japan | 4-33412 |
| Feb. 20, 1992 | [JP] | Japan | 4-33413 |
| Apr. 2, 1992 | [JP] | Japan | 4-81044 |
| Apr. 2, 1992 | [JP] | Japan | 4-81045 |
| Apr. 2, 1992 | [JP] | Japan | 4-81047 |
| Apr. 2, 1992 | [JP] | Japan | 4-81048 |

[51] Int. Cl.[6] .............. B41J 2/47; B41J 2/455; G02B 26/10
[52] U.S. Cl. .............. 347/243; 347/238; 359/204
[58] Field of Search .............. 347/241, 243, 347/242, 233, 238, 129, 224, 225, 130, 134; 359/204

[56] References Cited

U.S. PATENT DOCUMENTS

| 4,253,102 | 2/1981 | Katanka | 347/234 |
| 4,474,422 | 10/1984 | Kitamura | 359/204 |
| 4,679,057 | 7/1987 | Hamada | 347/252 |
| 4,800,401 | 1/1989 | Sato et al. | 347/242 |
| 4,924,321 | 5/1990 | Miyagawa et al. | 347/242 X |
| 4,999,648 | 3/1991 | Debesis | 347/241 |
| 5,014,075 | 5/1991 | Okino | 347/232 |
| 5,055,855 | 10/1991 | Nishio | 347/233 |
| 5,062,115 | 10/1991 | Thornton | 372/50 |
| 5,182,757 | 1/1993 | Mori et al. | 372/45 |
| 5,264,869 | 11/1993 | Appel | 347/248 |
| 5,610,647 | 3/1997 | Takada et al. | 347/137 |

FOREIGN PATENT DOCUMENTS

| 01076109 | 8/1990 | Japan . |
| 6153725 | 2/1991 | Japan . |
| 02048630 | 7/1991 | Japan . |
| 3248114 | 11/1991 | Japan . |
| 470711 | 3/1992 | Japan . |
| 01189623 | 10/1992 | Japan . |
| 6328599 | 11/1992 | Japan . |
| 2068957 | 12/1993 | Japan . |
| 2224614 | 4/1991 | United Kingdom . |

OTHER PUBLICATIONS

English Abstract JP 4–70711 Patent Abstracts of Japan.
Patent Abstracts of Japan vol. 14, No. 248 (E933) 28 May 1990.
Patent Abstracts of Japan, vol. 16, No. 42 (R1306) 31 Jan. 1992.
Patent Abstracts of Japan, vol. 13, No. 478 (P951) 30 Oct. 1989.
Patent Abstracts of Japan, vol. 13, No. 297, (P895), 10 Jul. 1989.

*Primary Examiner*—David F. Yockey
*Attorney, Agent, or Firm*—Ladas & Parry

[57] ABSTRACT

A laser beam scanning unit (53) adapted for scanning laser beams on a surface of a charged image bearing member (5) is provided. The laser beam scanning apparatus (53) comprises a semiconductor laser array (21) having a plurality of light emitting portions (21a) and a rotating polygon mirror (3) adapted for deflecting laser beams emitted from the light emitting portions to the image bearing member (5). The light emitting portions (21a) are disposed two-dimensionally on a surface of the semiconductor laser array. The lighting and the amount of light of the light emitting portions (21a) are discretely controlled by a control unit (60).

5 Claims, 30 Drawing Sheets

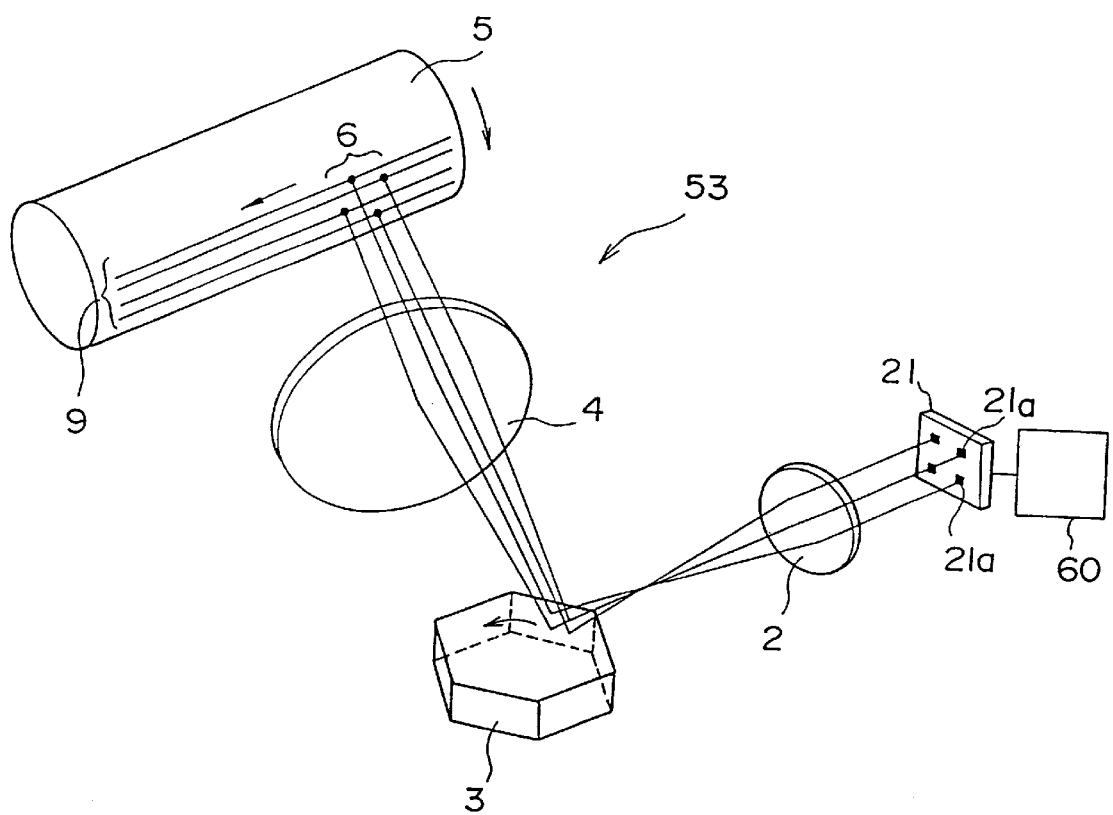
F I G. 1

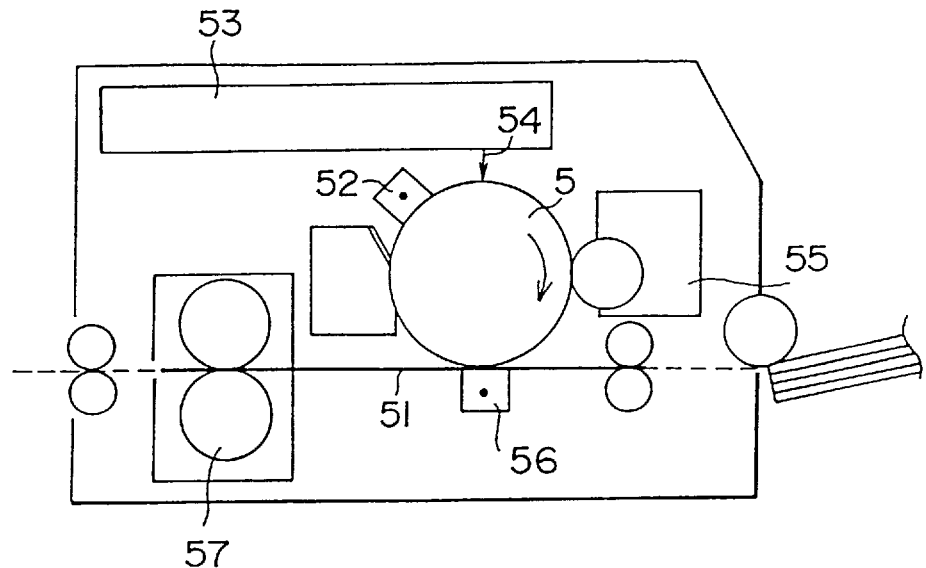
F I G. 2
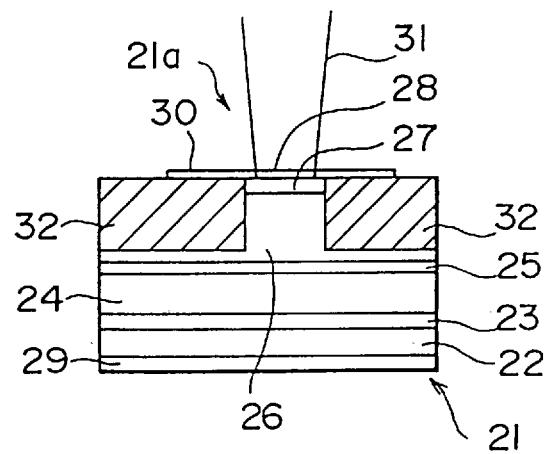
F I G. 3

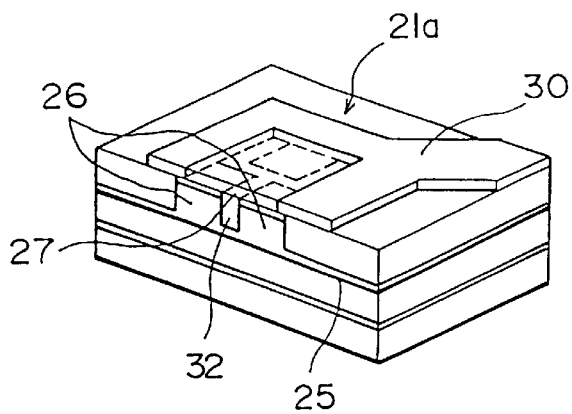
FIG. 4
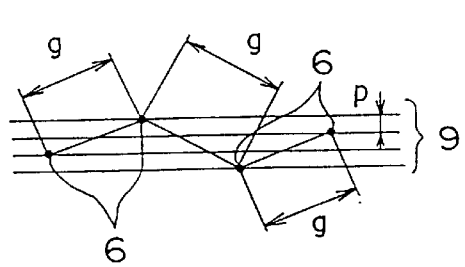 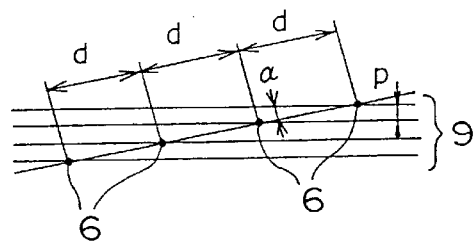
FIG. 5(a)  FIG. 5(b)
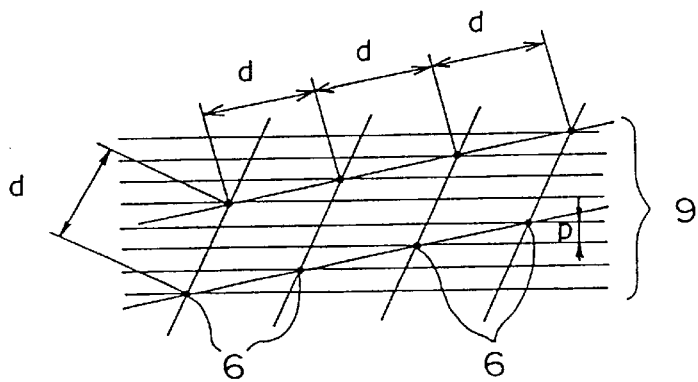
FIG. 5(c)

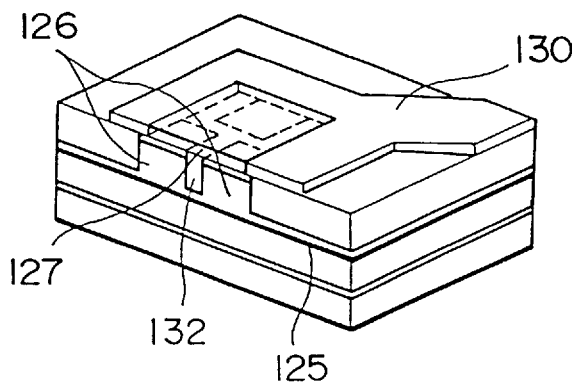
F I G. 15
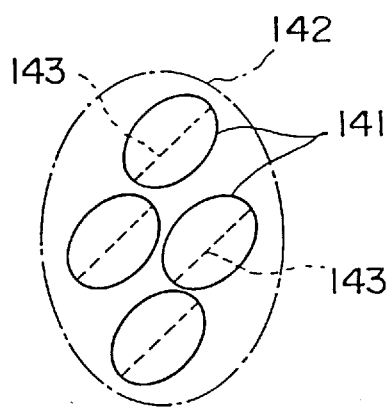
F I G. 16(a)
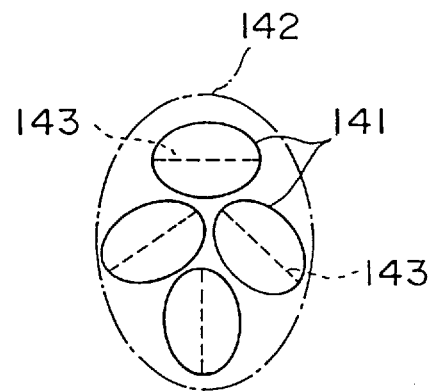
F I G. 16(b)

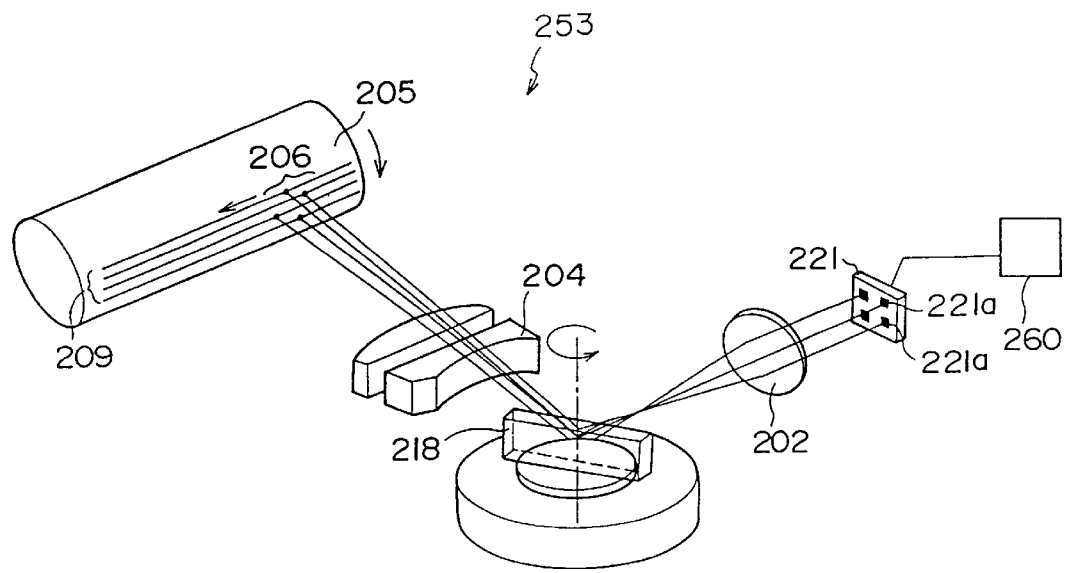
F I G. 20
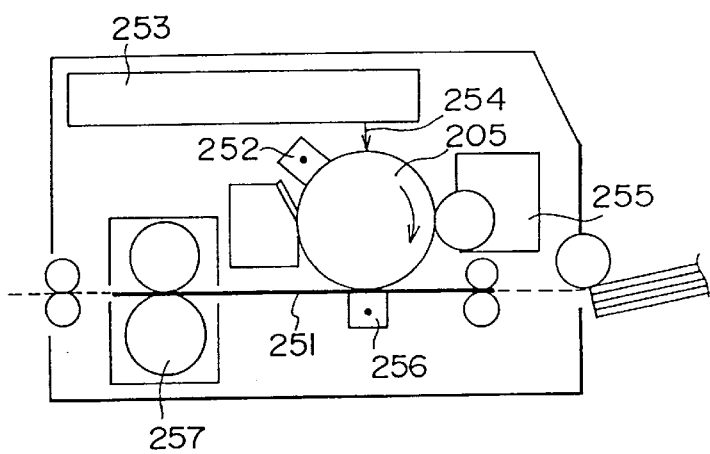
F I G. 21

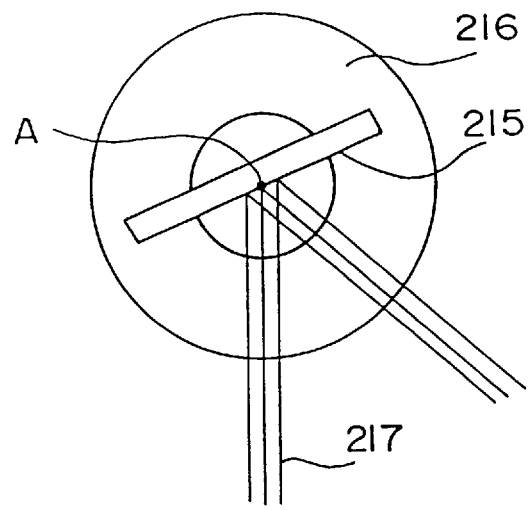
F I G. 25

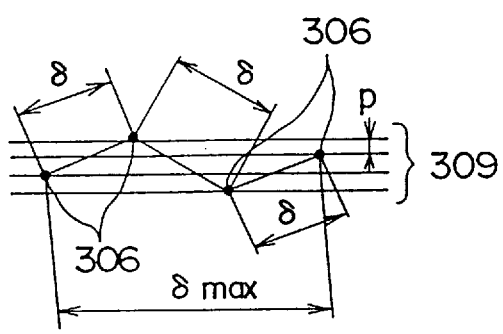
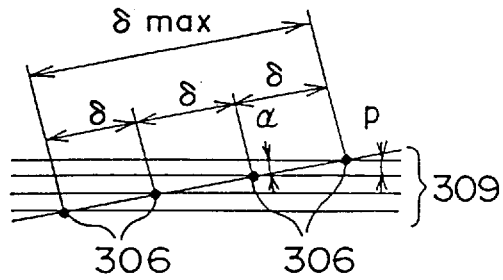
F I G. 32 (a)   F I G. 32 (b)
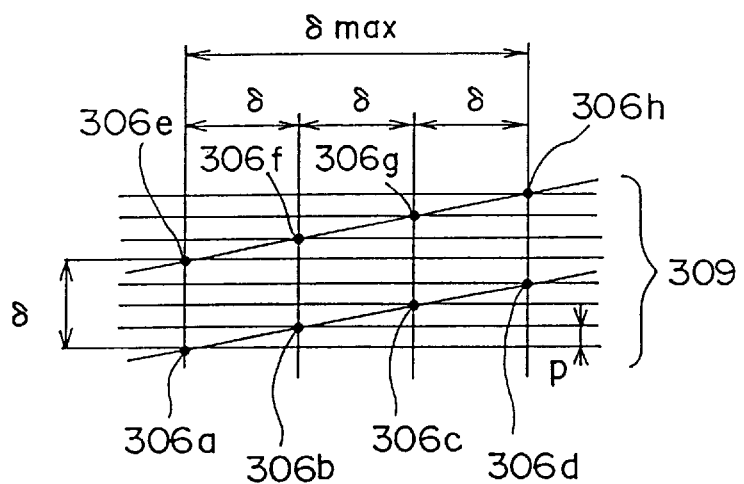
F I G. 32 (c)

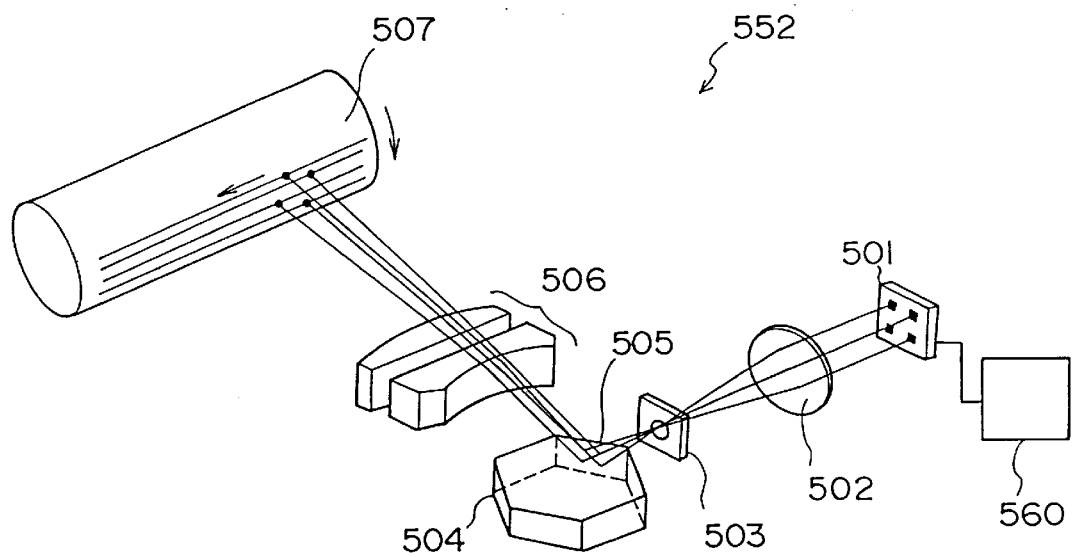
F I G. 42

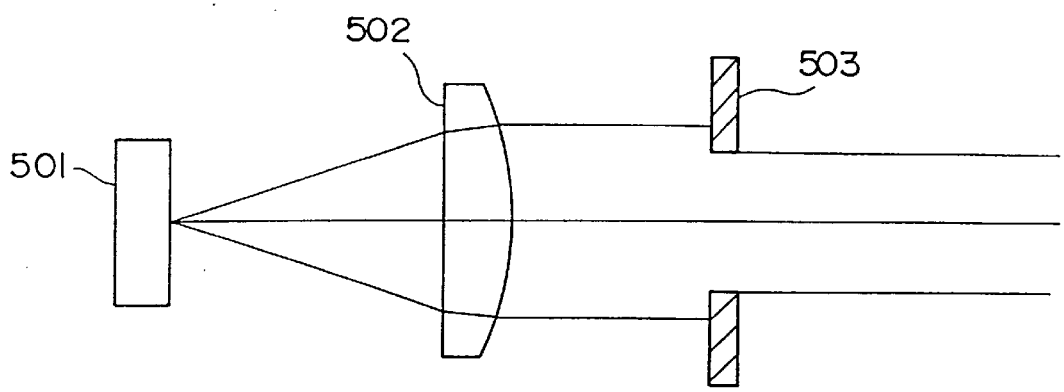
F I G. 44

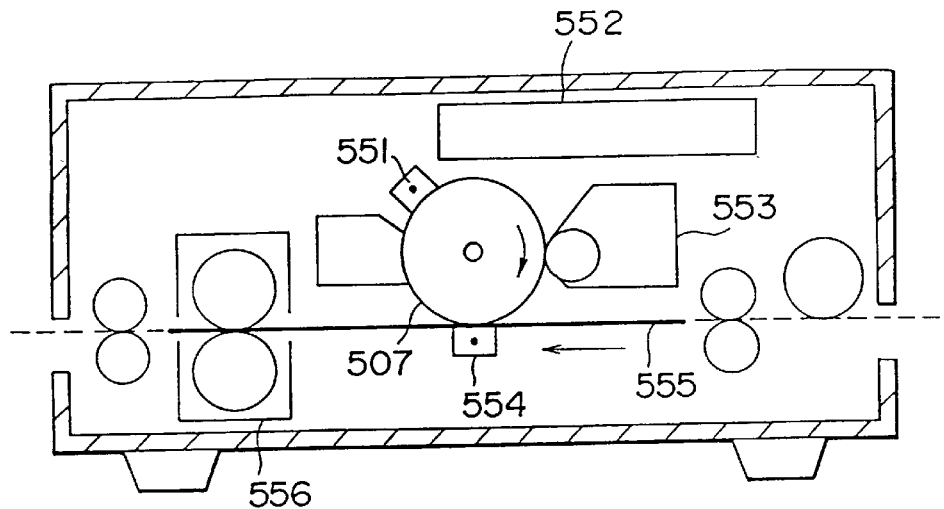
F I G. 48
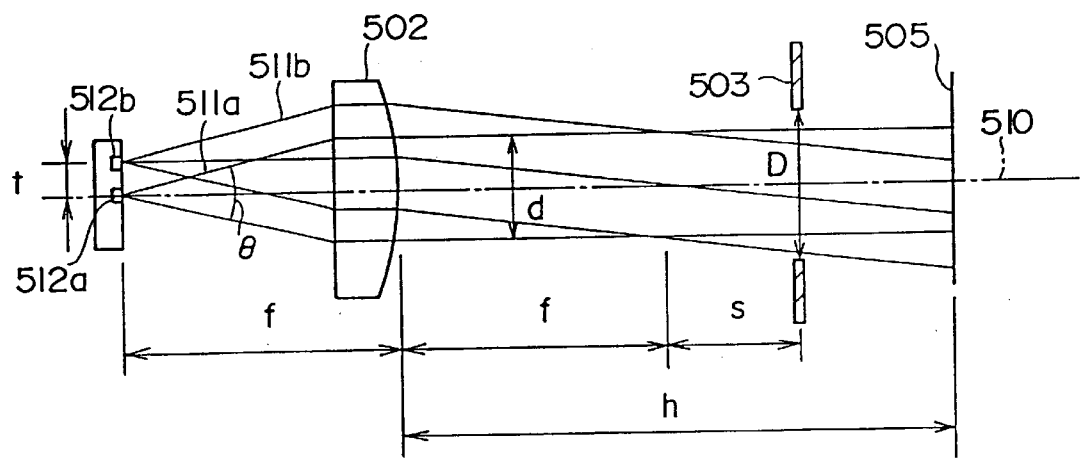
F I G. 49

LASER BEAM SCANNING IMAGE FORMING APPARATUS HAVING TWO-DIMENSIONALLY DISPOSED LIGHT EMITTING PORTIONS

This is a continuation of Ser. No. 08/466,602, filed on Jun. 6, 1995, which is a divisional of application Ser. No.: 07/971,908 filed Dec. 18, 1992, now U.S. Pat. No. 5,610,647 and PCT/JP92/00620 filed May 14, 1992.

1. Technical Field

The present invention relates to an image forming apparatus for scanning laser beams and thereby forming a latent image on a image bearing member.

2. Related Art

Heretofore, a large number of image forming apparatuses for forming a static latent image on a image bearing member with a laser beam and for printing the image on a paper at a high speed by a electrophotographic process have been used as output units of computers, facsimile machines, multi-functional copy machines, and so forth. In recent years, there has been an urgent need for improving the output speeds of these apparatuses. Accordingly, the apparatuses have been actively improved.

For example, an image forming apparatus using a rotating polygon mirror type deflecting unit deflects one laser beam with each facet and draws one scanning line. Thus, to increase the number of scanning lines in a particular time period, provided that the number of small mirror surfaces of the rotating polygon mirror is constant, the number of rotations should be increased. On the other hand, provided that the number of rotations is constant, the number of mirror surfaces of the rotating polygon mirror should be increased. To increase the number of rotations of the rotating polygon mirror, a dynamic or static bearing using pneumatic or hydraulic power is required. These bearings are expensive and difficult to handle. Thus, they are difficult to use in conventional laser printers. In contrast, provided that the number of mirror surfaces of the polygon mirror is increased, since the deflection angle becomes small, the length of the optical path following the deflecting unit becomes large. In addition, the diameter of collimated laser beams entering into an image forming optical system becomes large in proportion to the length of the optical path. Thus, the sizes of the lens and the rotating polygon mirror become large. In particular, when a high resolution is required, since the number of scanning lines are increased, the number of rotations of the polygon mirror and the length of optical path should be further increased. This situation also applies to the case where the deflecting unit is not a rotating polygon mirror. In this case, the scanning frequency and the length of the optical path following the deflecting unit increase. To solve these problems, an exposing technique for writing a plurality of scanning lines with a plurality of laser beams in one scanning sequence has been developed. This technique is referred to as a multi-beam exposing technique.

To obtain a plurality of laser beams, a plurality of gas laser (for example, He—Ne) oscillators are used as a light source. In addition, a technique wherein a laser beam generated by one oscillator is time-divided into a plurality of portions by an acousto-optical modulator (AOM) or the like has been developed. As a technique for simplifying the construction of the unit and decreasing the size thereof, for example, as disclosed in Japanese Patent Laid-Open Publication Serial No. SHO 54-7328, a semiconductor laser array where a plurality of light emitting portions for radiating laser beams are integrally disposed on one device is used as a light source.

Next, an image forming apparatus using a semiconductor laser array will be described. An image forming apparatus uses a laser array integrally disposed on one substrate as a light source. A beam radiating point of each light emitting portion is disposed at an edge of a semiconductor device substrate. A plurality of laser beams are collimated by a common collimator lens so that they have a particular diameter. Thereafter, the collimated laser beams are introduced into one facet of the rotating polygon mirror (deflecting unit). As the facet rotates, the laser beams are deflected. Next, the laser beams are spotted as an image through an image forming lens. Then, the image spot exposes the image bearing member and thereby a static latent image is formed. Next, in accordance with the electrophotographic process, the latent image is developed, transferred onto a paper, and then fixed. In addition, as disclosed in Japanese Patent Laid-Open Publication Serial No. SHO 54-158251, to decrease the distance of each adjacent scanning line scanned on the image bearing member at a time, the light emitting portions of the laser array are disposed at particular angles to the scanning plane.

On the other hand, there is still another need of an image forming apparatus using such a semiconductor laser array which can scan laser beams at a high speed and with a high resolution. However, the conventional image forming apparatus has not satisfactorily accomplished a high-speed and high-resolution laser beam scanning technique.

DISCLOSURE OF THE INVENTION

The present invention has been made with consideration of the above described points. An object of the present invention is to provide a compact image forming apparatus for scanning laser beams at a high speed and with a high resolution.

A first feature of the present invention is an image forming apparatus, comprising a image bearing member for forming a static latent image thereon, a charging unit for charging the surface of the image bearing member, a laser beam scanning unit for scanning a plurality of laser beams on the surface of the image bearing member which is charged, and a developing unit for causing a developing agent to adhere on the surface of the image bearing member scanned with the laser beams, wherein the laser beam scanning unit comprises a semiconductor laser array having a plurality of light emitting portions for emitting laser beams, the light emitting portions being formed on a device substrate, and a deflecting unit for deflecting laser beams emitted from the light emitting portions to the surface of the image bearing member, wherein the light emitting portions are disposed two-dimensionally on a surface of the semiconductor laser array, and wherein the lighting and the amount of light of each of the light emitting portions are discretely controlled.

A second feature of the present invention is a laser beam scanning unit, comprising a semiconductor laser array having a plurality of light emitting portions for emitting laser beams, the light emitting portions being formed on a device substrate, and a deflecting unit for deflecting the laser beams emitted from the light emitting portions, wherein the light emitting portions are disposed two-dimensionally on a surface of the semiconductor laser array, and wherein the lighting and the amount of light of each of the light emitting portions are discretely controlled.

A third feature of the present invention is an image forming apparatus, comprising a image bearing member for forming a static latent image thereon, a charging unit for charging the surface of the image bearing member, a laser beam scanning unit for scanning a laser beam on the surface of the image bearing member which is charged, and a developing unit for causing a developing agent to adhere on the surface of the image bearing member scanned with the laser beam, wherein the laser beam scanning unit comprises a semiconductor laser having a light emitting portion for emitting a laser beam, the light emitting portion being formed on a device substrate, and a deflecting unit for deflecting a laser beam emitted from the light emitting portion to the surface of the image bearing member, and wherein the light emitting portion has an optical axis substantially perpendicular to the surface of the device substrate.

A fourth feature of the present invention is a laser beam scanning unit comprising a semiconductor laser having a light emitting portion for emitting a laser beam, the light emitting portion being formed on a device substrate, and a deflecting unit for deflecting the laser beam emitted from the light emitting portion, wherein the light emitting portion has an optical axis substantially perpendicular to a surface of the device substrate.

A fifth feature of the present invention is an image forming apparatus comprising a image bearing member for forming a static latent image thereon, a charging unit for charging the surface of the image bearing member, a laser beam scanning unit for scanning a plurality of laser beams on the surface of the image bearing member which is charged, and a developing unit for causing a developing agent to adhere on the surface of the image bearing member scanned with the laser beams, wherein the laser beam scanning unit, comprising a semiconductor laser array for emitting a plurality of laser beams, a collimator lens for collimating each of the laser beams, a deflecting unit for periodically deflecting the direction of each of the laser beams collimated by the collimator lens, and a scanning lens for imaging each of the laser beams deflected by the deflecting unit on the image bearing member, and wherein the deflecting unit is a rotating mirror with one reflecting surface.

A sixth feature of the present invention is a laser beam scanning unit, comprising a semiconductor laser array for emitting a plurality of laser beams, a collimator lens for collimating each of the laser beams, a deflecting unit for periodically deflecting the direction of each of the laser beams collimated by the collimator lens, and a scanning lens for forming the laser beam deflected by the deflecting unit on a image bearing member, wherein the deflecting unit is a rotating mirror having one reflecting surface.

A seventh feature of the present invention is an image forming apparatus, comprising a image bearing member for forming a static latent image thereon, a charging unit for charging the surface of the image bearing member, a laser beam scanning unit for scanning a plurality of laser beams on the surface of the image bearing member which is charged, and a developing unit for causing a developing agent to adhere on the surface of the image bearing member scanned with the laser beams, wherein the laser beam scanning unit, comprising a semiconductor laser array having a plurality of light emitting portions for emitting a plurality of laser beams, a collimator lens for collimating each of the laser beams, a deflecting unit for periodically deflecting the direction of each of the laser beams collimated by the collimator lens, and a scanning lens for imaging each of the laser beams deflected by the deflecting unit on the image bearing member, and wherein the following relation is satisfied $$fc/\delta max > 25$$

where fc is the focal length of the collimator lens and $\delta max$ is the distance between the mutually most spaced-apart two of the light emitting portions of the semiconductor laser array.

An eighth feature of the present invention is a laser beam forming apparatus, comprising a semiconductor laser array having a plurality of light emitting portions for emitting laser beams, a collimator lens for collimating each of a plurality of laser beams, a deflecting unit for periodically deflecting the direction of each of the plurality of laser beams collimated by the collimator lens, and a scanning lens for imaging the laser beams deflected by the deflecting unit on the image bearing member, wherein the following relation is satisfied $$fc/\delta max > 50$$

where fc is the focal length of the collimator lens and $\delta max$ is the distance between the mutually most spaced-apart two of the light emitting portions of the semiconductor laser array.

A ninth feature of the present invention is an image forming apparatus, comprising a image bearing member for forming a static latent image on a surface thereof, a charging unit for charging the surface of the image bearing member, a laser beam scanning unit for scanning a plurality of laser beams to the charged surface of the image bearing member, and a developing unit for causing a developing agent to adhere on the surface of the image bearing member, wherein the laser beam scanning unit comprises a plurality of light emitting portions adapted for emitting laser beams and disposed on a device substrate, and a deflecting unit for deflecting the laser beams emitted from the light emitting portions, wherein the center axis of each laser beam emitted from the semiconductor laser array is substantially perpendicular to a surface of the device substrate, wherein an aperture stop is disposed at a position where cross sections of the laser beams are matched at least partially, the position being on an optical path between the semiconductor laser array and the deflecting unit, and wherein, provided that the strongest power of laser beams which has passed through the aperture stop is 1, the powers of the remaining laser beams are 0.9 or higher.

A tenth feature of the present invention is a laser beam forming apparatus, comprising a semiconductor laser array having a plurality of light emitting portions for emitting laser beams, the light emitting portions being disposed on a device substrate, and a deflecting unit for deflecting laser beams emitted from the light emitting portions, wherein an aperture stop is disposed at a position where cross sections of the laser beams are matched at least partially, the position being on an optical path between the semiconductor laser array and the deflecting unit, and wherein, provided that the strongest power of laser beams which has passed through the aperture stop is 1, the powers of the remaining laser beams are 0.9 or higher.

An eleventh feature of the present invention is an image forming apparatus, comprising a image bearing member for forming a static latent image on a surface thereof, a charting unit for charging the surface of the image bearing member, a laser beam scanning unit for scanning a plurality of laser beams on the charged surface of the image bearing member, and a developing unit for causing a developing agent to adhere on the scanned surface of the image bearing member, wherein the laser beam scanning unit comprises a semiconductor laser array having a plurality of light emitting portions for emitting laser beams, a collimator lens for collimating laser beams emitted from the light emitting portions, and a deflecting unit for deflecting the laser beams, wherein an aperture stop is disposed on an optical path midway between the semiconductor laser array and the deflecting unit, and wherein the following relations are satisfied $$\frac{st}{f} \leq 0.12 \left(\frac{D}{d}\right)^{2.3} + 0.17$$

$$\frac{D}{d} \leq 2$$

where f is the focal length of the collimator lens, s is the distance between a deflecting unit side focal point of the collimator lens and the aperture stop, t is the distance between a light emitting portion spaced farthest from an optical axis of the collimator lens and the optical axis, D is the diameter of the aperture stop, and d is the diameter of each of the collimated beam.

A twelfth feature of the present invention is an image forming apparatus, comprising a image bearing member for forming a static latent image on a surface thereof, a charging unit for charging the surface of the image bearing member, a laser beam scanning unit for scanning a plurality of laser beams on the charged surface of the image bearing member, and a developing unit for causing a developing agent to adhere on the scanned surface of the image bearing member, wherein the laser beam scanning unit comprises a semiconductor laser array having a plurality of light emitting portions for emitting laser beams, a collimator lens for collimating laser beams emitted from the light emitting portions, and a deflecting unit for deflecting the laser beams, wherein an aperture stop is disposed on an optical path midway between the semiconductor laser array and the deflecting unit, and wherein the following relations are satisfied $$\frac{st}{f} \leq 0.06 \left(\frac{D}{d}\right)^{2.9} + 0.08$$

$$\frac{D}{d} \leq 2$$

where f is the focal length of the collimator lens, s is the distance between a deflecting unit side focal point of the collimator lens and the aperture stop, t is the distance between a light emitting portion spaced farthest from an optical axis of the collimator lens and the optical axis, D is the diameter of the aperture stop, and d is the diameter of each of the collimated beam.

A thirteenth feature of the present invention is a laser beam scanning apparatus, comprising a semiconductor laser array having a plurality of light emitting portions for emitting laser beams, a collimator lens for collimating the laser beams emitted from the light emitting portions, and a deflecting unit for deflecting the laser beams, wherein an aperture stop is disposed on an optical path midway between the semiconductor laser array and the deflecting unit, and wherein the following relations are satisfied $$\frac{st}{f} \leq 0.12 \left(\frac{D}{d}\right)^{2.3} + 0.17$$

$$\frac{D}{d} \leq 2$$

where f is the focal length of the collimator lens, s is the distance between a deflecting unit side focal point of the collimator lens and the aperture stop, t is the distance between a light emitting portion spaced farthest from an optical axis of the collimator lens and the optical axis, D is the diameter of the aperture stop, and d is the diameter of each of the collimated beam.

A fourteenth feature of the present invention is a laser beam scanning apparatus, comprising a semiconductor laser array having a plurality of light emitting portions for emitting laser beams, a collimator lens for collimating the laser beams emitted from the light emitting portions, and a deflecting unit for deflecting the laser beams, wherein an aperture stop is disposed on an optical path midway between the semiconductor laser array and the deflecting unit, and wherein the following relations are satisfied $$\frac{st}{f} \leq 0.06 \left(\frac{D}{d}\right)^{2.9} + 0.08$$

$$\frac{D}{d} \leq 2$$

where f is the focal length of the collimator lens, s is the distance between a deflecting unit side focal point of the collimator lens and the aperture stop, t is the distance between a light emitting portion spaced farthest from an optical axis of the collimator lens and the optical axis, D is the diameter of the aperture stop, and d is the diameter of each of the collimated beam.

BRIEF DESCRIPTION OF DRAWINGS

FIG. 1 is a schematic diagram showing a laser scanning optical system of a first embodiment of an image forming apparatus in accordance with the present invention;

FIG. 2 is a side view showing the image forming apparatus;

FIG. 3 is a sectional view showing an optical resonator of a surface light emitting type semiconductor laser array;

FIG. 4 is a perspective view showing a light emitting portion of a phase-lock surface-light-emitting type semiconductor laser array;

FIG. 5 comprises schematic diagrams showing the relation of scanning lines and spot positions;

FIG. 15 is a perspective view showing a light emitting portion of a phase-lock surface-light-emitting type semiconductor laser array;

FIG. 16 comprises schematic diagrams showing an optical resonator of the light emitting portion of the phase-lock surface-light-emitting type semiconductor laser array;

FIG. 20 is a schematic diagram showing a laser scanning optical system of a third embodiment of the image forming apparatus in accordance with the present invention;

FIG. 21 is a side view showing the image forming apparatus;

FIG. 25 is a plan view showing a beam deflecting unit;

FIG. 32 comprises schematic diagrams showing the relations of scanning lines and spot positions;

FIG. 42 is an optical side view showing a laser scanning optical system of a sixth embodiment of the image forming apparatus in accordance with the present invention;

FIG. 44 is an optical side view describing that a beam is vignetted by a collimator lens;

FIG. 48 is a side view showing the image forming apparatus; and

FIG. 49 is an optical side view showing the construction of portions adjacent to a light source of a scanning optical system.

BEST MODES FOR CARRYING OUT THE INVENTION

Section 1 First Embodiment of Image Forming Apparatus
1-1 Comparison with Related Art Before describing a first embodiment of the present invention, the related art thereof will be first described as conducive to a full understanding of the conception thereof.

Figure 7:
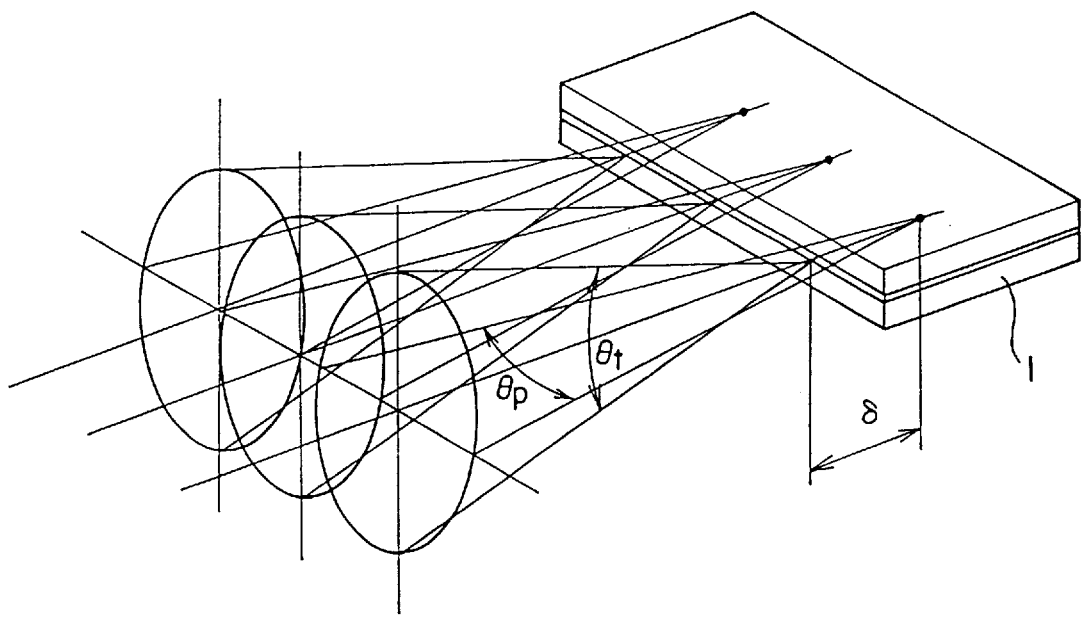
FIG. 7 is a schematic diagram showing the conception of a conventional edge emitting type semiconductor laser array.

FIG. 7 shows a conventional semiconductor laser array for use in an image forming apparatus. As shown in the figure, in a semiconductor laser array 1 which emits a laser beam, the spread angle of a laser beam on a plane which includes the optical axis thereof and which is in parallel with the contact surface largely differs from that on a plane which contains the optical axis and which is perpendicular to the contact surface. In the figure, the spread angle $\theta p$ of a conventional laser diode on the plane in parallel with the contact surface is approximately 10 degrees in full width at half maximum. On the other hand, the spread angle $\theta t$ on the plane perpendicular to the contact surface is as large as 30 degrees in full width at half maximum due to the influence of diffraction. In addition, it is difficult to freely set the values of the spread angles $\theta t$ and $\theta p$ and the ratio thereof (in other words, the ratio of the longer diameter and the shorter diameter of the ellipse). As a result, the position of the beam waist on the parallel plane differs from that of the vertical plane by $\delta$. The value of $\delta$ is generally referred to as an astigmatic difference.

Due to this astigmatic difference, the beam which leaves a collimator lens is not in parallel with either the scanning plane or the direction perpendicular thereto or both of them. Thus, the beam cannot be precisely spotted on a image bearing member, but it has an aberration. Since the focal length of an image forming lens for use in a conventional laser printer is long and the spot diameter thereof is large, this aberration does not lead to a considerable problem. However, as the need for high resolution printers arises in recent years, aberration is becoming a critical problem to solve. As one of the techniques for solving this problem, a beam shaping optical system which comprises a so-called anamorphic lens set where the power on the vertical plane differs from that on the horizontal plane is used to compensate for the astigmatic difference. However, such a beam shaping optical system is liable to raise the cost of the final product and to increase the size thereof. In addition, this system cannot be easily applied to an application which scans a plurality of laser beams.

Moreover, since a laser beam is emitted from an end face of the semiconductor laser array 1, the light emitting portion of the laser beam should be necessarily disposed one-dimensionally in line. To obtain a large number of laser beams, since the laser beams are arranged in line, the effective diameter of the optical system becomes large.

Further, because the size of the spread angle is large, the focal length of the collimator lens which collimates the beams becomes as small as several millimeters. Even if the distance between the semiconductor laser array and the collimator lens slightly varies for example by the order of several 10 µm, the resultant rays (parallel beams) are not collimated rays. Thus, the diameter of the beam introduced into an image forming optical system deviates and the size of the image spot on the image bearing member varies. Therefore, the allowable ranges of the semiconductor laser and the collimator lens become very small. As a result, the producibility is low. In addition, the position of the collimator lens which has been precisely adjusted is moved due to temperature change of the adjacent portions of the optical system and aging deformation due to aging of the constructional parts. Thus, the diameter of the image spot varies and thereby the image quality deteriorates.

Figure 8:
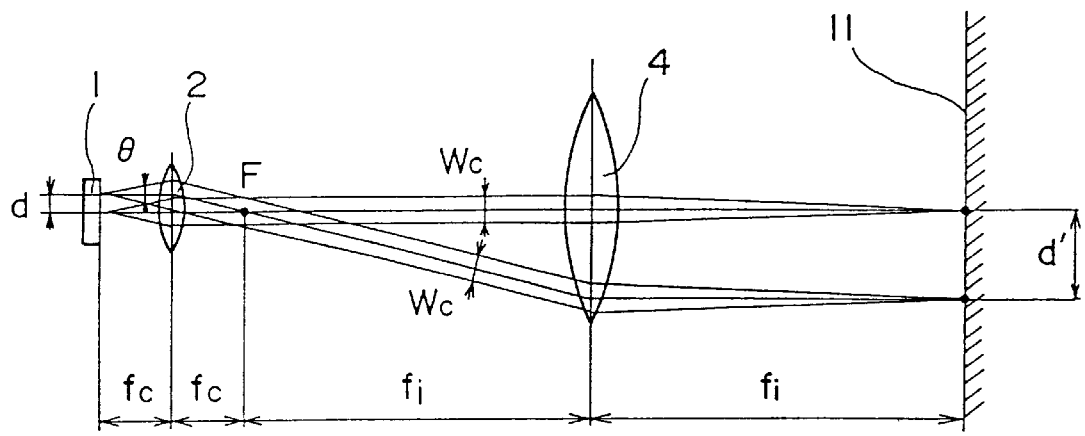
FIG. 8 is an optical side view showing an optical path of a conventional laser scanning optical system.

Furthermore, when a plurality of laser beams having parallel optical axes enter the collimator lens, the optical axes are spread with large angles. Now, for simplicity, a laser scanning optical system using two laser beams, a convex collimator lens, and a convex image forming lens will be considered. FIG. 8 is an optical side view showing the optical path of this optical system. The two laser beams spaced apart by d and emitted from the semiconductor laser array 1 are collimated by the collimator lens 2 of a focal length fc. Since the semiconductor laser array 1 is disposed at an object side focal point of the collimator lens 2, the two laser beams are intersected at an image side focal point F. To form images of the two laser beams which are nearly parallel on an image plane 11, the image forming lens 4 of the focal length fi is disposed in such a way that the object side focal point thereof matches the image side focal point F of the collimator lens 2. Since the mirror surface of the deflecting unit does not have an optical power, it is omitted in the figure. When a spot 6 of 100 µm is imaged on the image plane 11, if fi is 200 mm, the diameter Wc of the beam introduced into the image forming lens, that is, the collimate diameter, is approximately 2 mm. The spot diameter or the beam diameter is a diameter where the intensity of the cross section of a beam is the power of the peak intensity×(1/e²). The distribution of this intensity accords with the Gaussian distribution. To obtain the above-mentioned beam diameter of 2 mm, the focal length fc of the collimator lens 2 should be approximately 3 mm. As shown in FIG. 8, the distance d' between these spots is obtained by multiplying the ratio of fc and fi by d. In the conventional semiconductor laser arrays, it is difficult to set the distance between each light emitting portion to 100 µm or below due to mutual interference thereof. Thus, in this example, the spot distance d' on the image plane can be expressed as follows.

$$d' = \frac{fi}{fc} \times d = \frac{200}{3} \times 0.1 = 6.6 \text{ (mm)} \tag{1}$$

In addition, when a so-called tilt angle compensation optical system which compensates for the difference of the tilt angle of each facet of a rotating polygon mirror is used, the angle made of the optical axis of each laser beam sometimes becomes large depending on the relative distance between each lens and the collimator lens. To overcome this problem, various countermeasures such as adding another lens are considered. For example, as disclosed in Japanese Patent Laid-Open Publication Serial No. SHO 58-211735, a construction for compensating for the mutual angle of the optical axis of each laser beam by using a prism has been proposed. However, this construction leads to a complicating the optical system. Thus, the cost of the final product rises and the adjustment of the optical system becomes difficult. In FIG. 8, for simplicity, the tilt angle compensating lens is omitted.

Figure 9:
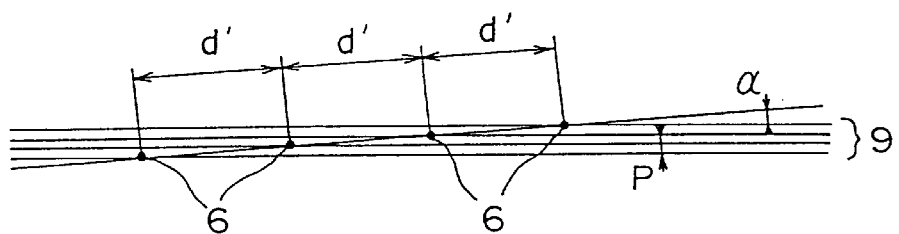
FIG. 9 is a schematic diagram showing the relation of scanning lines and spot positions.

Next, referring to FIG. 9, the relation of spot positions and scanning lines on a conventional image bearing member is shown. In this example, there are four spots. In other words, images are formed with four laser beams. As described above, since the laser scanning optical system is an enlarging optical system, the distance of each adjacent spot on the semiconductor laser array is enlarged on the image bearing member to d' as shown in the figure. Normally, the distance of each adjacent spot on the image bearing member is much larger than the distance P of each adjacent scanning line 9. For example, when the resolution is 300 dpi (that is, the number of dots per inch (=25.4 mm)), although P=25.4 /300=84.7 µm, the distance of each adjacent spot becomes as large as 6.7 mm. Thus, the angle α made of a line 12 connecting the center of the spot 6 and each scanning line 9 becomes very small as follows.

$$\alpha = \sin^{-1}\frac{P}{d'} = 0.72 \text{ } (deg) \tag{2}$$

In addition, the line which connects the light emitting portions on the semiconductor laser array 1 (that is, the edge of the contact surface) should have an angle of α to the scanning plane. As the value of a becomes small, very fine adjustment is required.

Figure 10:
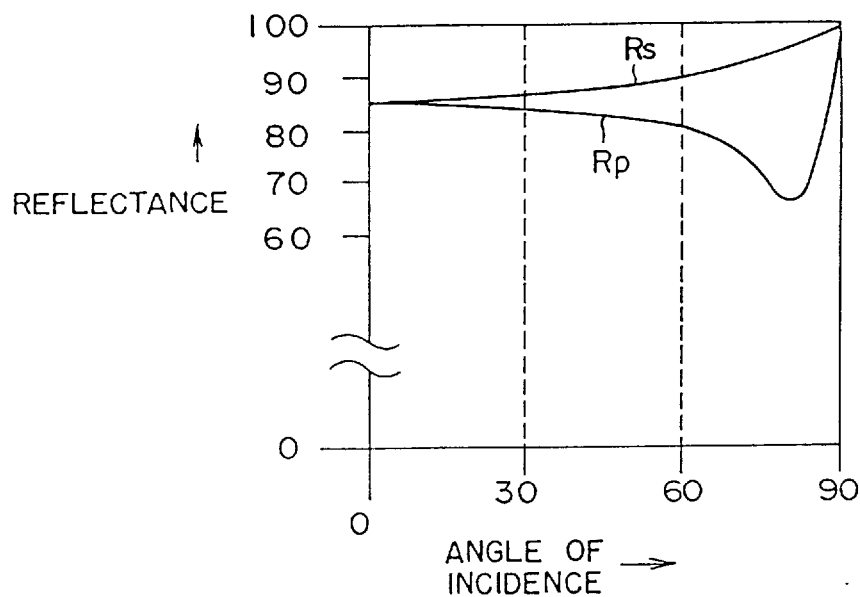
FIG. 10 is a graph indicating reflectances of P and S polarization of a metallic mirror.

Generally, a laser beam emitted from a semiconductor laser is linearly polarized. The direction of the plane of polarization of the laser beam is determined by the inclination of the contact surface of the semiconductor laser array. However, the reflectance on a reflecting surface depends on the incident angle to the mirror surface. In addition, the reflectance of P polarized light differs from that of S polarized light. FIG. 10 shows respective reflectances Rp and Rs of P polarized light and S polarized light on a metallic mirror. As the polygon mirror rotates, the incident angle of the beam relative to the mirror surface varies. Thus, as shown in the figure, the amount of light of the laser beam represented as a composition of P polarized light and S polarized light also varies. In particular, when the deflection angle of the polygon mirror is large, the amount of light of the laser beam remarkably varies. To overcome this problem, as disclosed in Japanese Patent Laid-Open Publication Serial No. SHO 58-42025, a technique for inclining the plane of polarization about the rotating axis of the rotating polygon mirror by 45 degrees has been proposed. However, as described above, in the edge emitting type semiconductor laser array l, due to the restriction of the distance of each adjacent scanning line, the inclined angle is also restricted. Thus, this technique cannot be used. In this case, the plane of polarization should be rotated with a ¼λ plate or the like.

Figure 11:
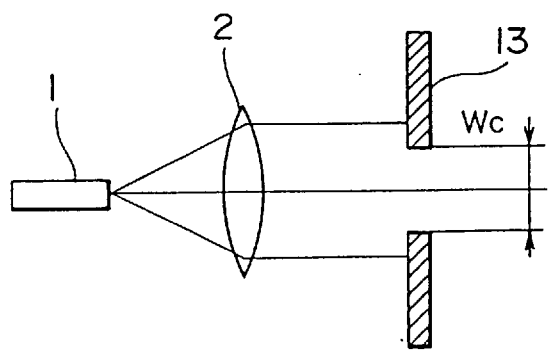
FIG. 11 is a schematic diagram showing a method of adjusting the collimate diameter of a laser beam.

In addition, each laser beam emitted from the semiconductor laser array 1 enters the same collimator lens 2. At this point, as shown in FIG. 8, the collimate diameter Wc of each laser beam is determined by the spread angle θ thereof and the distance fc between the semiconductor laser array 1 and the collimator lens 2. However, since this distance fc of each adjacent laser beam is the same, the collimate diameter Wc is determined by only the spread angle θ of the laser beam. Nevertheless, in the conventional edge emitting type semiconductor laser array 1, the spread angle varies depending on each light emitting portion, so does the collimate diameter Wc of each laser beam. As a result, the size of each spot where each collimated laser beam is imaged also varies. In a conventional laser scanning optical system which uses only one (single) laser beam, as shown in FIG. 11, with aperture stop 13 disposed either in the front or behind the collimator lens 2, the beam is shaped so as to adjust the collimator diameter Wc. However, as shown in FIG. 8, when a plurality of laser beams in a bundle are used, the aperture stop can be disposed at only the a focal point of the collimator lens.

Generally, in a conventional semiconductor laser array, unless the current which flows in an optical resonator exceeds a predetermined value, laser oscillation does not take place. This current value is referred to as the threshold current value. In the conventional semiconductor laser array, the threshold current value is as the high as several 10 mA. The heat generated by the current adversely affects the characteristics of the laser beams, such as shifting the oscillation wavelength. Thus, the heat generated by the semiconductor laser array is a problem to be solved. In particular, a semiconductor laser array which emits a plurality of laser beams has a number of heat sources equal to the number of light emitting parts. This heat has been an obstacle in integrally constructing a large number of light emitting parts.

1-2 Organization of the Present Invention

Next, an embodiment of the present invention will be described. FIG. 2 is a schematic diagram showing the overall structure of an image forming apparatus in accordance with the present invention. The process for obtaining a print result on an image transfer material 51 accords with the so-called electrophotographic process. As a image bearing member 5 of an electrophotographic printer using a semiconductor laser as a light source, an organic photoconductor (OPC) with an increased sensitivity in a longer wavelength region is widely used. This image bearing member 5 is charged to a predetermined surface potential by a charger 52. Thereafter, a laser beam scanning unit 53 performs a light writing process, that is, a light exposing process. In accordance with image information from the laser beam scanning unit 53, a plurality of laser beams 54 whose light intensities are individually modulated are scanned on image bearing member 5 in the axial direction thereof, thereby generating electric charges which neutralize the surface potential only for the exposed portion. Thus, the absolute value of the surface potential of this portion becomes low. As a result, on the image bearing member 5, a distribution of surface potential in accordance with the image, that is, a static latent image is formed. A developing unit 55 selectively adheres a developing agent in accordance with the surface potentials to the image bearing member 5. Thus, the static latent image is developed. This developing agent is transferred to a transfer material 51 (normally, a paper) by a transferring unit 56. The developing agent on the transfer material 51 is fixed with a thermal pressure by a fixing unit 57. Thereafter, the transfer material 51 is unloaded from the apparatus.

FIG. 1 is a schematic diagram showing the organization of a laser beam scanning unit 53 for use in the image forming apparatus of the present invention. In the laser beam scanning unit 53 shown in FIG. 2, the laser beams 54 are folded back and downwardly emitted. However, in the figure, the illustration of the laser beams is simplified.

In FIG. 1, a semiconductor laser array 21 comprises a plurality of light emitting portions 21a which are disposed two-dimensionally on a device substrate 22 (see FIG. 3). Laser beams emitted from the light emitting portions 21 are collimated to laser beams with a predetermined beam diameter by a collimator lens 2. The lighting and the amount of light of each of the light emitting portions 21a is discretely controlled by a control unit 60. The laser beams are introduced into one facet of a rotating polygon mirror 3. As the polygon mirror 3 rotates, these laser beams are deflected. The laser beams which pass through an image forming lens 4 are imaged at spots 6 on the image bearing member 5. In FIG. 1, for simplicity, a tilt angle compensation lens is omitted.

As the semiconductor laser array 21 having such characteristics, it is preferable to use a so-called surface light emitting type semiconductor laser array. It is more preferable to use a surface light emitting type semiconductor laser array with light emitting portions in which a group II–VI compound semiconductor is embedded. FIG. 3 is a sectional view showing one of the light emitting portions 21a of the surface light emitting type semiconductor laser array 21. In the figure, each of the light emitting portions two-dimensionally disposed on the device substrate 22 is provided with one optical resonator.

As shown in the figure, on the Ga—As device substrate 22, a semiconductor laminate reflecting layer 23 is formed. The reflecting layer 23 is composed of several tens of layers of two types of Al—Ga—As compounds. On the reflecting layer 23, a clad layer 24, an active layer 25, a clad layer 26, and a contact layer 27 are disposed, each of which is composed of Al—Ga—As compounds. On the contact layer 27, a $SiO_2$ dielectric laminate reflecting layer 28 is formed. On the entire rear surface of the Ga—As substrate, a window-shaped electrode 29 is formed. In addition, in the periphery of the dielectric laminate reflecting layer 28, a window-shaped electrode 30 is formed. Thus, all the parts formed on the Ga—As substrate constitute an optical resonator.

A light beam which is generated on the active layer 25 reciprocatively travels between the upper reflecting layer 27 and the lower reflecting layer 23 in the direction perpendicular to the surface of the device substrate 22. Thus, the light beam is oscillated. As a result, the optical axis of the laser beam 31 is substantially perpendicular to the surface of the device substrate 22. In the periphery of the optical resonator, a group II–VI compound semiconductor is embedded as an embedded layer 32. As the group II–VI compound semiconductor, it is preferable to use a group II–VI compound which contains two, three, or four elements selected from both group II elements Zn, Cd, and Hg and group VI elements O, S, Se, and Te. In addition, it is preferable to match the lattice constant of the compound with that of the semiconductor layers composed of the clad layer 24, the active layer 25, and the clad layer 26. Since the electric resistance of the group II–VI compound semiconductor is very high, the current is effectively closed in the optical resonator. In addition, since the refractive index of the embedded layer 32 differs from that of the Al—Ga—As semiconductor layer, the beam which travels in the optical resonator in the exactly just or substantially perpendicular to the surface of the device substrate 22 is totally reflected at the interface with the embedded layer 32. Thus, the beam is efficiently closed in the optical resonator.

Therefore, when such a semiconductor laser array 21 is used, the laser oscillation starts with a very small amount of current in comparison with the conventional laser array. In other words, the threshold value of the semiconductor laser array 21 is lower than that of the conventional one. Thus, even if a plurality of light emitting portions 21a are disposed on the single device substrate 22, the amount of lost heat is small and thereby high optical power or a large number of light emitting portions 21a can be obtained.

In addition, since the sectional area (near field pattern) of the laser beam emitting portions (light emitting portions) 21a of the surface light emitting type semiconductor laser array 21 is larger than that of the conventional edge emitting type semiconductor laser array, the spread angles of the laser beams are small. Although the value of the spread angle is determined by the area of the light emitting window, the area can be precisely controlled by an etching process or the like. Thus, the spread angle can be kept constant. Moreover, the ratio of the length and width of the spread angle of a laser beam, namely, the ratio of the longer diameter and shorter diameter of a beam whose cross section is in an elliptic shape can be freely set with the shape of the light emitting window. For example, when the shape of the window is a perfect circle, a laser beam with a circular cross section or an isotropic spread angle can be obtained. Thus, the astigmatic difference on the cross section in the direction of the optical axis of a beam is small.

However, in a conventional laser beam printer, the image spot of a laser beam on the image bearing member is sometimes in an elliptic shape where the scanning direction of the laser beam accords with the minor axis thereof. Since the spot moves in the scanning direction for the lighting time of the laser beam and thereby the image is expanded, the image should be corrected. Thus, the shape of the cross section of the laser beam which enters the image forming optical system is preferably elliptic. As described above, in the surface light emitting type semiconductor laser array 21, since the elliptic ratio of each emitted laser beam can be freely controlled, the laser beam with a cross section whose major axis accords with the scanning plane and whose ratio of the major axis and the minor axis is appropriate can be introduced into the image forming optical system.

Moreover, as described above, in the surface light emitting type semiconductor laser array 21, the spread angle of the laser beams from respective light emitting portions 21a can be made uniform. Thus, the diameter of each laser beam introduced into the collimator lens or the image forming optical system can be kept nearly constant. As a result, the size of each image spot on the image bearing member can be kept constant.

As the sectional area of the optical resonator increases on the surface of the device substrate 22 of the surface light emitting type semiconductor laser array 21 becomes large, laser oscillations of high order modes along with zero-th mode start. The distribution of the amount of light of the image spot has several peaks. Thus, this situation is not suitable for forming a static latent image on the image bearing member 5. To prevent this situation, a plurality of small optical resonators are closely disposed, and the phases of the laser beams oscillated are synchronized. As a result, the light emitting portions 21a which are large in size and oscillated in the zero-th mode can be obtained.

FIG. 4 shows a partial sectional view of a light emitting portion 21a of the phase-lock surface-light-emitting type semiconductor laser array 21. In this semiconductor laser array 21, a plurality of optical resonators are disposed at very short intervals. The bottom of the embedded layer 32 does not reach the active layer 25. Thus, rays which leak out from the adjacent optical resonators adversely affect each other through the clad layer 26 below the embedded layer 32. Thus, laser beams are oscillated with the same phase. As a result, the plurality of adjacent optical resonators operate as a single optical resonator. Since the wave faces of beams emitted from the optical resonators are matched, these optical resonators operate as a surface laser emitting source. Thus, the apparent area of the light emitting portions becomes large. The spread angles of laser beams are as small as 2 degrees or less in full width at half maximum.

As described above, in the phase-lock surface-light-emitting type semiconductor laser array 21, the spread angles of the laser beams are small in comparison with the conventional semiconductor laser. With respect to this characteristic, the relation between the embodiment of the present invention and the embodiment of the related art will be described. When the spread angle of a laser beam is 2 degrees in full width at half maximum and the laser beam is introduced into an image forming optical system with a beam diameter of 2 mm, the focal length fc of the collimator lens becomes approximately 35 mm. Since the focal length fc of the collimator lens 2 can become long, the adjustment allowance of the distance of the collimator lens 2 to the semiconductor laser array 21 is increased. In addition, when the distance of each adjacent laser beam emitted from the semiconductor laser array 21 is d, the distance d' of each adjacent image spot can be given by the following formula.

$$d' = \frac{fi}{fc} \times d = \frac{200}{35} \times 0.1 = 0.57 \text{ (mm)} \tag{3}$$

When the distance of each adjacent scanning line is 84.7 μm which is the same as that of the related art, the angle α made of each spot and the scanning plane is given by the following formula.

$$\alpha = \sin^{-1}\frac{P}{d'} = 8.55 \text{ } (deg) \tag{4}$$

Thus, the angle α of the semiconductor laser array 21 is much larger than that of the conventional semiconductor laser array (see Formula (3)). Therefore, the mounting adjustment in the direction of the optical axis of the semiconductor laser array 21 can be easily performed. In addition, depending on the machining tolerance of each part, the part can be mounted without necessity of the adjustment of the angle α. Moreover, since the image spots and the laser beams are closely disposed, the effective diameter of the optical system becomes small as shown in the figure.

Further, by excessively decreasing the spread angle of each laser beam, after the laser beam travels from the semiconductor laser array 21 to the rotating polygon mirror 3 to the image forming lens 4, the laser beam is not largely spread. Thus, even on the incident plane of the image forming lens 4, the size of the laser beam can be decreased enough to obtain a predetermined diameter of an image spot. In other words, a collimator lens which collimates a laser beam with a predetermined collimate diameter is not required in contrast to the conventional laser scanning optical system. However, according to the deflection angle of the rotating polygon mirror 3, the length of the optical path varies, so does the size of the laser beam introduced into the image forming lens 4. Thus, there should be provided an optical system which corrects the size of the laser beam. Nevertheless, the image forming lens 4 can be easily provided with such an optical function. Thus, the number of constituent parts of the overall optical system can be decreased.

Moreover, in the surface light emitting type semiconductor laser array 21, provided that beams of the light emitting portions 21a do not interfere each other, these light emitting portions 21a can be disposed at any positions of the device substrate 22. Thus, the light emitting portions 21a can be two-dimensionally disposed on the device substrate 22.

Now, an exposure system which scans a image bearing member 5 with four laser beams like the optical system of the embodiment of the prior art as shown in FIG. 8 will be considered. When four laser beams are disposed as shown in FIG. 5 (a), the mutual angles and distances of each the adjacent laser beams can be decreased in comparison with the case where four laser beams are disposed in line as shown in FIG. 5 (b). As a result, the size of the optical system can be accordingly decreased.

In the above example, the case where four laser beams are used was considered. When the number of laser beams is further increased, the light emitting portions 21a can be freely disposed on the semiconductor laser array 21 so that the spots 6 are,disposed at the closest positions on the image bearing member 5. As a result, more significant effects can be obtained than by the above described arrangements. In FIG. 5 (c), an example of the arrangement of image spots 6 to scanning lines 9 in the case of eight laser beams is shown.

The relative positions of image spots are not always similar to the positions of the light emitting portions 21a on the semiconductor laser array 21. For example, like the above-mentioned optical system for compensating tilt angle of the rotating polygon mirror 3, if an optical element wherein the optical characteristics in the scanning direction differ from those in the perpendicular direction thereof is disposed midway in the optical path of laser beams, the angle and distance of each adjacent laser beam in the scanning direction sometimes differ from those in the perpendicular direction thereof. However, in such a situation, according to the conventional edge emitting laser array, the light emitting portions disposed in line at most allow image spots in line to be disposed on the image bearing member. In contrast, according to the present invention, the above-mentioned effect where the light emitting portions 21a are disposed two-dimensionally on the device substrate 22 can be likewise accomplished.

In the surface light emitting type semiconductor laser array 21, generally the emitted laser beams are linearly polarized. The direction of the polarization depends on the shape of the plane of the optical resonators on the device substrate 22. The plane of polarization substantially accords with the longitudinal direction of the shape of the plane of each optical resonator. For example, when the optical resonator is in an elliptic shape, the direction of the major axis thereof becomes the plane of polarization. As described above, in the phase synchronizing type semiconductor laser array 21, one light emitting portion is composed of a plurality of phase synchronizing optical resonators. The number of optical resonators is for example four. At this point, the shape of the cross section of the laser beams emitted is a composite shape of laser beams emitted from all the optical resonators. Thus, in accordance with the arrangement of the optical resonators, the shape of the cross section of the laser beams emitted can be freely set. In this case, the orientation of the plane of polarization depends on the shape of the plane of each optical resonator. Thus, in the case where laser beams in a composite elliptic shape are obtained, the major axis and the direction of the plane of polarization can be independently set.

Figure 6A:
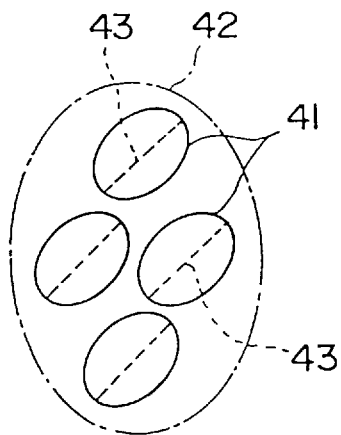
FIG. 6 comprises schematic diagrams showing an optical resonator of a light emitting portion of the phase-lock surface-light-emitting type semiconductor laser array.
Figure 6B:
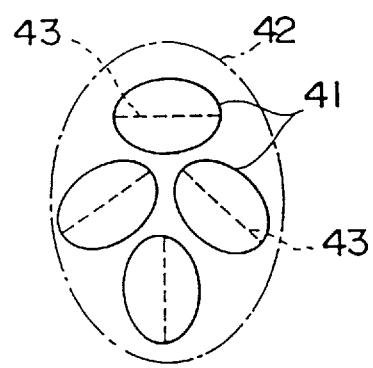

FIG. 6 (a) schematically shows this situation. This figure is a plan view of one light emitting portion 42 on a semiconductor laser array, the light emitting portion 42 being seen from the beam emitting side. As shown in FIG. 6 (a), one light emitting portion 42 is composed of four optical resonators 41 which phase-synchronously oscillate. The plane of polarization 43 of a laser beam emitted from each optical resonator 41 is inclined by 45 degrees as shown in FIG. 6 (a). The major axis of the composite elliptic laser beam accords with the vertical direction of the light emitting portion. In addition, as shown in FIG. 6 (b), when the planes of polarization 43 of the laser beams emitted from the optical resonators 41 are oriented at different angles, the composite laser beam nearly becomes circularly polarized light.

As described above, in the conventional laser beam printer, an image spot 6 on the image bearing member is often in an elliptic shape where the minor axis thereof accords with the scanning direction. When the semiconductor laser array 21 is disposed in such a way that the orientation of the plane of polarization of a laser beam from each optical resonator is inclined to the direction of the major axis of the elliptic cross section of the composite laser beam by 45 degrees and the major axis of the composite beam is matched with the scanning direction, the plane of polarization of the laser beam from each optical resonator is inclined to the beam scanning plane by 45 degrees. As a result, the plane of polarization is inclined to the rotating axis of the rotating polygon mirror 3 by 45 degrees. Thus, as shown in FIG. 10, the difference of reflectances of laser beams according to incident angles thereof to the rotating polygon mirror becomes small. This situation also applies to a laser beam with a cross section of an elliptic shape, the beam being nearly circularly polarized light. In some optical systems, the minor axis of a laser beam emitted from the semiconductor laser array 21 is matched with the scanning direction. In this situation, the same effects can be obtained.

It should be appreciated that the above-mentioned embodiment is an example of the present invention. For example, by using a Galvano mirror or a hologram disk instead of the rotating polygon mirror 3, the same effects can be obtained. In addition, regardless of whether the collimator lens, the tilt angle compensation lens, and/or the image forming lens is used or not, the same effects can be obtained. Moreover, even if the construction and/or relative positions of these lenses are changed, the same effects of the present invention can be likewise achieved.

Furthermore, the image forming apparatus of the present invention can be used for facsimile machines, display units, and so forth as well as printing units such as printers and copy machine.

1-3 Effects

As described above, in the image forming apparatus of the present invention, since the exposing technique using the semiconductor laser array which scans the image bearing member with a plurality of laser beams, a high-speed and high-resolution scanning unit can be accomplished with a low scanning frequency and a short length of the optical path. Thus, the size and cost of the apparatus can be reduced.

In addition, by using a surface light emitting type semiconductor laser array for the above-mentioned semiconductor laser array, the following results can be obtained.

(1) Since the spread angle of each leaser beam is small and the distance between the collimator lens and the semiconductor laser array is large, the adjustment allowance in the direction of the optical axis of the collimator lens is increased and thereby the producibility of the apparatus is improved. Moreover, without influences of aged deterioration and temperature fluctuation in operation, an image can be exposed with a predetermined spot diameter. As a result, the image quality is improved.

(2) When the light emitting portions are disposed in an array shape, the spread angle of a beam from each light emitting portion less deviates, so does the diameter of each image spot. In addition, the angle between each adjacent beam and the distance of each adjacent image spot can be decreased. As a result, the construction of the optical system can be simplified and the effective areas of each lens and deflecting unit can be decreased. Therefore, this feature contributes to reducing the cost of the apparatus.

(3) Since the light emitting portions of the surface light emitting type semiconductor laser array can be disposed two-dimensionally, the effective areas of each lens and deflecting unit can be further reduced.

(4) Since the distance of each adjacent image spot is not larger than that of each adjacent scanning line, the allowance of the mounting angle of the optical axis of the semiconductor laser array becomes large. Thus, this mounting angle can be easily adjusted. The deviation of the distance of each adjacent scanning line becomes small. As a result, the image quality can be improved.

(5) Since the astigmatic difference of the surface light emitting type semiconductor laser array is low as a characteristic thereof, the elliptic shape of the cross section of each beam (ratio of major axis and minor axis) can be freely set. Thus, without necessity of an optical system which compensates the astigmatic difference, each beam can be precisely shaped.

(6) Since a group II–VI compound semiconductor is used for the surface light emitting type semiconductor laser array as an embedded layer, the laser oscillation can be accomplished with a low threshold current value. Thus, the bad influence of heat generated by the device against the laser characteristics can be reduced. As a result, a large number of light emitting portions can be integrally disposed.

(7) When a phase-lock surface-light-emitting type semiconductor laser array with a plurality of optical resonators which emit phase-locked laser beams is used as the surface light emitting type semiconductor laser, the spread angle of each laser beam can be further decreased. In some cases, the collimator lens can be omitted. Thus, the construction of the optical system can be further simplified.

(8) Since one light emitting portion can be composed of a plurality of optical resonators whose plane of polarization can be freely set, when a composite laser beam with an elliptic cross section is used, the direction of the plane of polarization of each laser beam can be set freely and independent from the direction of the major axis of the cross section of the composite laser beam. As a result, the fluctuation of the amount of light according to the position in the scanning direction of the laser beam due to the difference of incident angle of the laser beam to the polygon mirror can be minimized.

Section 2 Second Embodiment of Image Forming Apparatus 2-1 Comparison with Related Art Before describing a second embodiment of the present invention, so as to easily understand the conception thereof, the related art thereof will be described.

Figure 17:
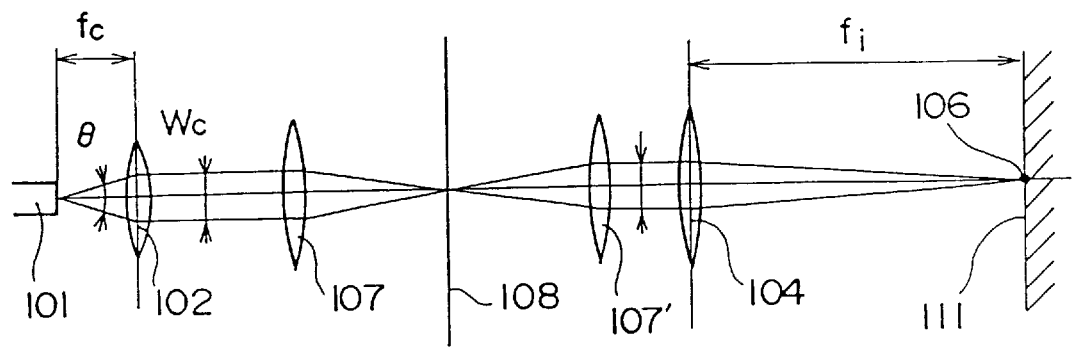
FIG. 17 is an optical side view showing a scanning line of a conventional laser scanning optical system and an optical axis perpendicular to the scanning line.

FIG. 17 is a sectional view showing an optical path of a conventional image forming apparatus. The figure shows a horizontal section of the optical path which is perpendicular to a scanning plane of a image bearing member of the image forming apparatus and which contains an optical axis of a laser beam. In the figure, the optical axis is folded back at a facet 108 of a rotating polygon mirror 8 of the image forming apparatus. In the figure, a laser beam radiated from a semiconductor laser 101 is emitted at a spread angle of θ. This beam is shaped to a nearly collimated beam by a collimator lens 102 of a focal length fc. Each beam is collected at the facet 108 of the rotating polygon mirror by a tilt angle compensation lens 107. The beam deflected by the rotating polygon mirror is collimated by a second tilt angle compensation lens 107'. Thereafter, the beam is imaged as a spot 106 on the image bearing member by an image forming lens 104 of a focal length fi. On a plane in parallel with the scanning plane, since the tilt angle compensation lenses 107 and 107' do not have optical powers. Thus on the plane, each beam is kept parallel. In other words, on the facet 108 of the rotating polygon mirror, each beam is imaged as a line image.

Figure 18:
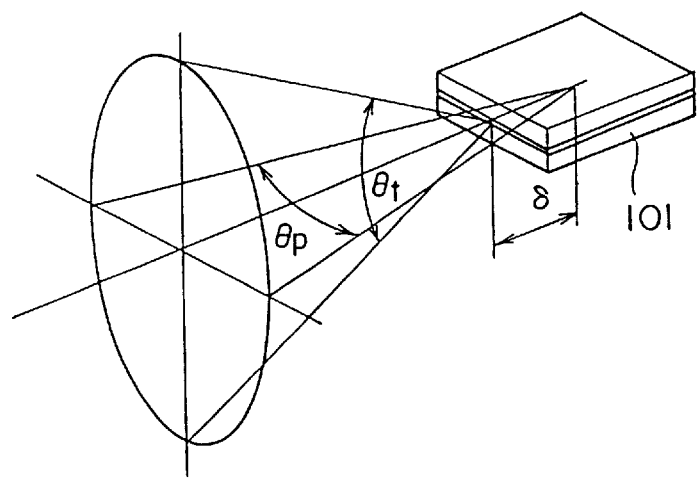
FIG. 18 is a schematic diagram showing a conventional semiconductor laser.

However, as shown with a conceptional schematic diagram of FIG. 18, in each laser beam from the semiconductor laser 101, the spread angle of a laser beam on a plane which includes the optical axis thereof and which is in parallel with the contact surface largely differs from that on a plane which contains the optical axis and which is perpendicular to the contact surface. In the figure, the spread angle θt of a conventional laser diode on the plane in parallel with the contact surface is approximately 10 degrees in full width at half maximum. On the other hand, the spread angle θt on the plane perpendicular to the contact surface is as large as 30 degrees in full width at half maximum due to an influence of diffraction. In addition, it is difficult to freely set the values of the spread angles θt and θp and the ratio thereof (in other words, the ratio of the longer diameter and the shorter diameter of the ellipse). As a result, the position of the beam waist on the parallel plane differs from that of the vertical plane by d. The value of d is generally referred to as an astigmatic difference.

Due to this astigmatic difference, the beam which leaves a collimator lens is not in parallel with either the scanning plane or the direction perpendicular thereof or both of them. Thus, the beam cannot be precisely spotted on a image bearing member, but it has an aberration.

Since the focal length of an image forming lens for use in a conventional image forming apparatus is long and the spot diameter thereof is large, this aberration does not lead to a considerable problem. However, as the need of high resolution printers strongly arises in recent years, the aberration is becoming a critical problem to solve. As one of the techniques for solving this problem, a beam shaping optical system which comprises a so-called anamorphic lens set where the power on the vertical plane differs from that on the horizontal plane is used to compensate the astigmatic difference. However, such a beam shaping optical system is liable to raise the cost of the final product and to increase the size thereof.

Next, a problem which arises due to a large spread angle of each beam will be described with reference to FIG. 17. When a spot 106 of 100 μm is imaged on the image plane 111, if fi is 200 mm, the diameter Wc of the beam entered into the image forming lens, that is, the collimate diameter, is approximately 2 mm. The spot diameter or the beam diameter is a diameter where the intensity of the cross section of a beam is the power of the peak intensity$\times(1/e^2)$. The tilt angle compensation lenses 107 and 107' are symmetrical with respect to the facet 108 of the rotating polygon mirror 108. The diameter of a beam emitted from the lens 107' is the same as the diameter of a beam entered into the lens 107. To obtain this diameter of a beam, the focal length fc of the collimator lens 102 should be approximately 3 mm.

Since the focal length of the collimator lens 102 is short, to obtain a beam which is completely collimated, the error of position in the direction of the optical axis of the collimator lens should be as small as possible. In addition, the spread angles θt and θp of the beam sometimes deviate due to problems in semiconductor's producing processes. As a result, the diameters of beams which are collimated deviate. Thus, it is necessary to dispose a slit or an aperture stop behind the collimator lens 102. In addition, even if the collimator lens has been precisely adjusted in the initial stage, the position of the collimator lens 102 deviates due to temperature rise of the peripheral portions of the optical system in operation and aged deterioration of constructional parts. Thus, the diameters of image spots deviate and thereby the image quality deteriorates.

Figure 19:
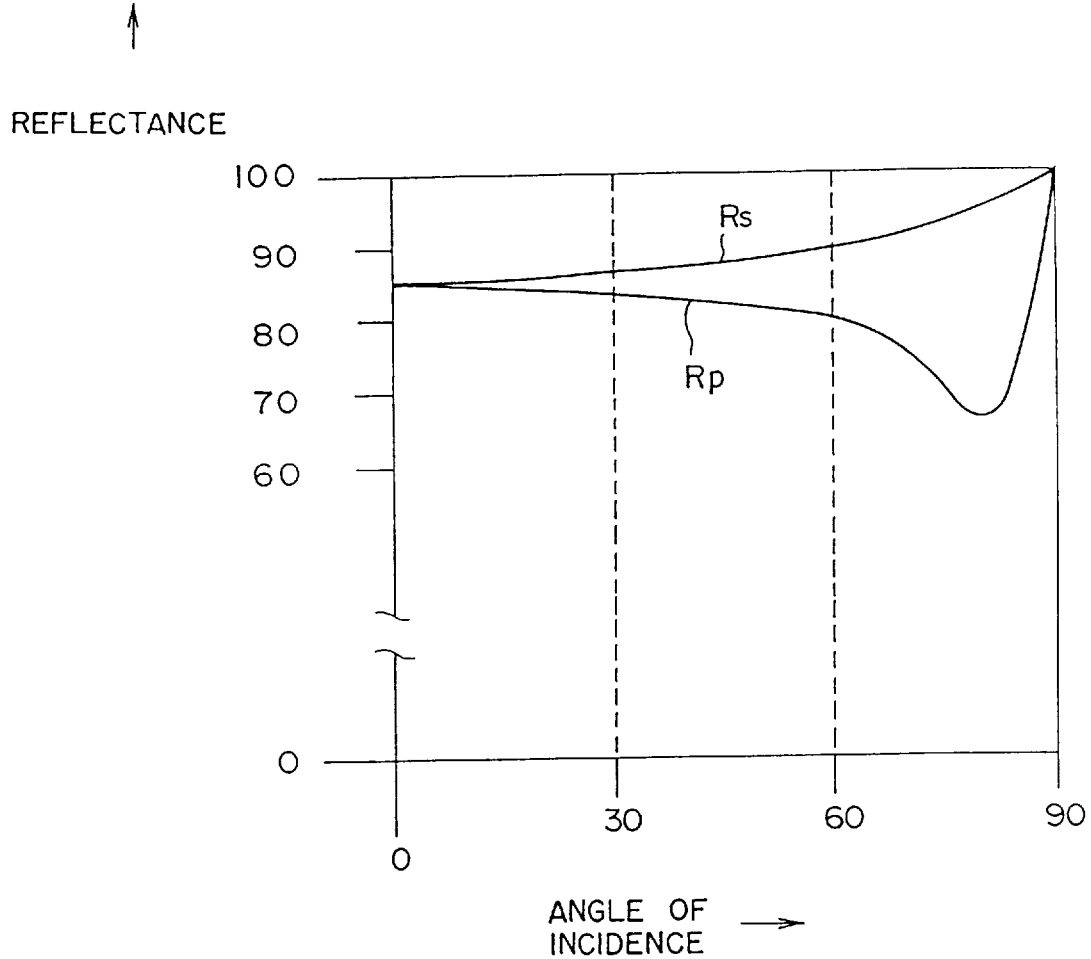
FIG. 19 is a graph indicating reflectances of P and S polarization of a metallic mirror.

Generally, a laser beam emitted from a semiconductor laser is linearly polarized. The direction of the plane of polarization of the laser beam just depends on the inclination of the contact surface of the semiconductor laser. However, the reflectance on a reflecting surface depends on the incident angle to the mirror surface. In addition, the reflectance of P polarized light differs from that of S polarized light. FIG. 19 shows respective reflectances Rp and Rs of P polarized light and S polarized light on a metallic mirror.

As the rotating polygon mirror rotates, the incident angle of the beam to the mirror surface varies. Thus, as shown in the figure, the amount of light of the laser beam represented as a composition of P polarized light and S polarized light also varies. In particular, when the deflection angle of the rotating polygon mirror is large, the amount of light of the laser beam remarkably varies. To prevent this problem, as disclosed in Japanese Patent Laid-Open Publication Serial No. SHO 58-42025, a technique for inclining the plane of polarization about the rotating axis of the rotating polygon mirror by 45 degrees has been proposed. However, in this technique, the direction of the major axis of the elliptic section of each beam is fixed. Thus, this technique cannot be used. Alternatively, the plane of polarization should be rotated with a ¼λ plate or the like.

Generally, in a conventional semiconductor laser, unless the current which flows in an optical resonator exceeds a predetermined value, the laser oscillation does not take place. This current value is referred to as a threshold current value. In the conventional semiconductor laser, the threshold current value is as high as several 10 mA. The heat generated by the current adversely affects the characteristics of the laser beams, such as shifting the oscillation wavelength. Thus, the heat generated by the semiconductor laser is a problem to solve.

2-2 Construction of the Present Invention

Figure 13:
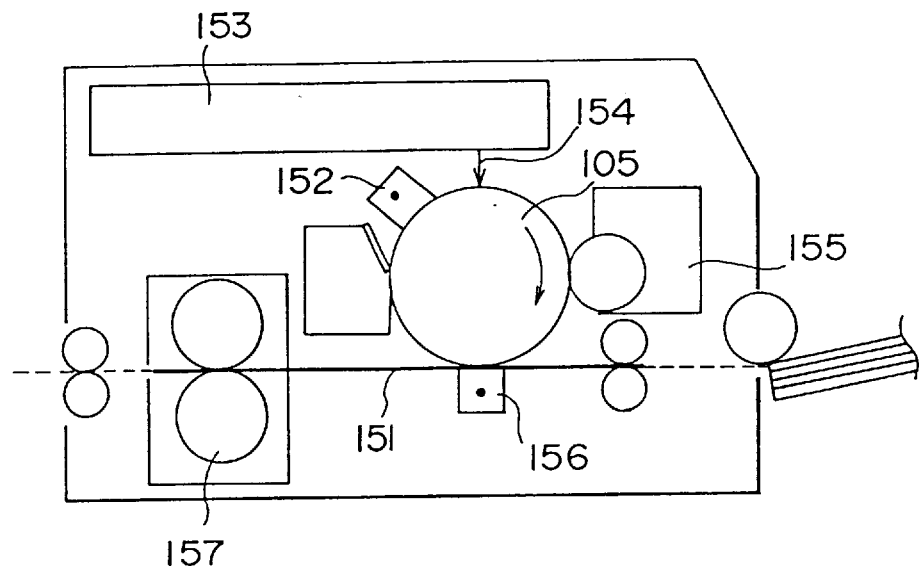
FIG. 13 is a side view showing the image forming apparatus.

Next, an embodiment of the present invention will be described. FIG. 13 is a schematic diagram showing the overall construction of an image forming apparatus in accordance with the present invention. The process for obtaining a print result on an image transfer material 151 accords with a so-called electrophotographic process. As a photoconductivelycoated drum 105 of an electrophotographic printer using asemiconductor laser as a light source, an organic-photoconductor (OPC) with an increased sensitivity in a longerwavelength region is widely used. This image bearing member 105 is charged to a predetermined surface potential by a charger 152. Thereafter, a laser beam scanning unit 153 performs a light writing process, that is, a light exposing process. In accordance with image information from the laser beam scanning unit 153, a plurality of laser beams 154 whose light intensities are individually modulated are scanned on image bearing member 105 in the axial direction thereof, thereby generating electric charges which neutralize the surface potential only for the exposed portion. Thus, the absolute value of the surface potential of this portion becomes low. As a result, on the image bearing member 105, a distribution of surface potentials in accordance with the image, that is, a static latent image is formed. A developing unit 155 selectively adheres a developing agent in accordance with the surface potentials to the image bearing member 105. Thus, the static latent image is developed. This developing agent is transferred to a transfer material 151 (normally, a paper) by a transferring unit 156. The developing agent on the transfer material 151 is fixed with a thermal pressure by a fixing unit 157. Thereafter, the transfer material 151 is unloaded from the apparatus.

Figure 12:
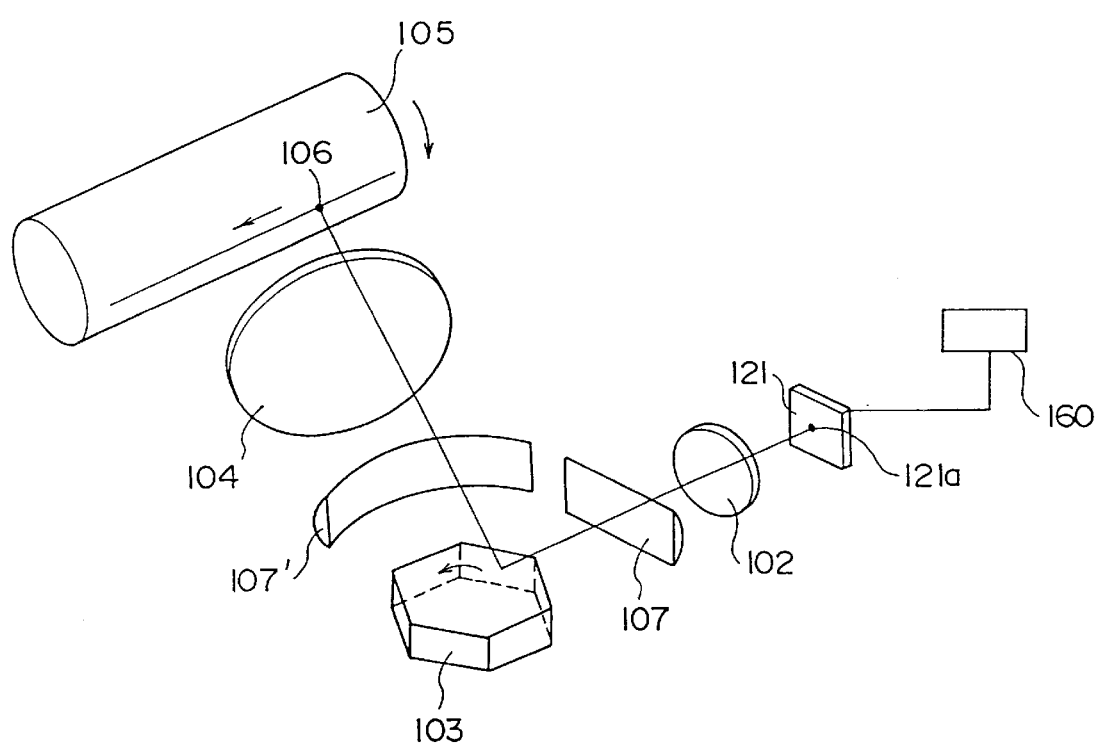
FIG. 12 is a schematic diagram showing a laser scanning optical system of a second embodiment of the image forming apparatus in accordance with the present invention.

Next, with reference to FIG. 12, a laser beam scanning unit will be described. In the laser beam scanning unit 153 shown in FIG. 13, the laser beam 154 is folded back and downwardly emitted. In FIG. 12, the optical path of a laser beam is simplified. In the figure, in a semiconductor laser 121, a laser beam is emitted from a light emitting portion 121a in the direction perpendicular to a contact surface. The lighting and the amount of light of the light emitting portion 121a are controlled by a control unit 160. The beam is collimated to a laser beam of a predetermined diameter by a collimator lens 102. The laser beam is entered into a facet of a rotating polygon mirror 103. As the rotating polygon mirror 103 rotates, the beam which passes through an image forming lens 104 is imaged at a spot on a image bearing member.

Figure 14:
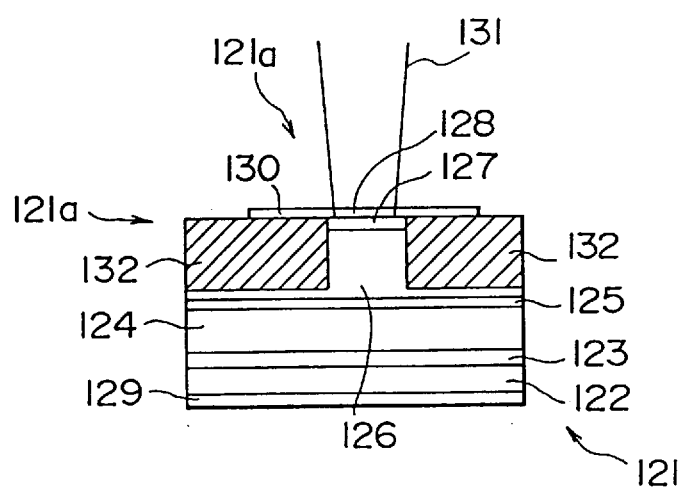
FIG. 14 is a sectional view showing an optical resonator of a surface light emitting type semiconductor laser.

As a semiconductor laser having such characteristics, it is preferable to use a so-called surface light emitting type semiconductor laser. It is more preferable to use a surface light emitting type semiconductor laser with a light emitting portion 121a in which a group II–VI compound semiconductor is embedded. FIG. 14 is a sectional view showing the light emitting portion 121a of the surface light emitting type semiconductor laser. In the figure, one optical resonator constructs one light emitting portion. As shown in FIG. 14, on the Ga—As device substrate 122, a clad layer 124, an active layer 125, a clad layer 126, and a contact layer 127 are disposed, each of which is composed of several ten layers of two types of Al—Ga—As compounds. On the contact layer 127, a SiO2 dielectric laminate reflecting layer 128 is formed. On the entire rear surface of the Ga—As substrate 122, a window-shaped electrode 129 is formed. In addition, in the periphery of the dielectric laminate reflecting layers 128, a window-shaped electrode 130 is formed. Thus, all the parts formed on the Ga—As substrate compose an optical resonator. A light beam which is generated on the active layer 125 reciprocatively travels between the upper reflecting layer 127 and the lower reflecting layer 123 in the direction perpendicular to the surface of the device substrate 122. As a result, the optical axis of the laser beam 31 is nearly perpendicular to the surface of the device substrate 122. In the periphery of the optical resonator, a group II–VI compound semiconductor is embedded as an embedded layer 132. As the group II–VI compound semiconductor, it is preferable to use a group II–VI compound which contains two, three, or four elements selected from both group II elements Zn, Cd, and Hg and group VI elements O, S, Se, and Te. In addition, it is preferable to match the lattice constant of the compound with that of the semiconductor layers composed of the clad layer 124, the active layer 125, and the clad layer 126. Since the electric resistance of the group II–VI compound semiconductor is very large, the current is effectively closed in the optical resonator. In addition, since the refractive index of the embedded layer 132 differs from that of the Al—Ga—As semiconductor layer, the beam which travels in the optical resonator in the direction just or nearly perpendicular to the surface of the device substrate 122 is totally reflected at the. interface with the embedded layer 132. Therefore, when such a semiconductor laser is used, the laser oscillation starts with a very small amount of current in comparison with the conventional laser. In other words, the threshold value of the semiconductor laser of the present invention is lower than that of the conventional one. In addition, the amount of lost heat is small.

In addition, since the sectional area (near field pattern) of the laser beam emitting portion of the surface light emitting type semiconductor laser is larger than that of the conventional edge emitting type semiconductor laser, the spread angle of the laser beam is small. Although the value of the spread angle just depends on the area of the light emitting window, the area can be precisely controlled by an etching process or the like. Thus, the spread angle can be kept constant. Moreover, the ratio of the length and width of the spread angle of a laser beam, namely, the ratio of the longer diameter and shorter diameter of a beam whose cross section is elliptic can be freely set with the shape of the light emitting window. For example, when the shape of the window is a perfect circle, a laser beam with a circular cross section or an isotropic spread angle can be obtained. Thus, the astigmatic difference on the cross section in the direction of the optical axis of a beam is small.

However, in a conventional laser beam printer, the image spot of a laser beam on the image bearing member is sometimes in an elliptic shape where the scanning direction of the laser beam accords with the minor axis thereof. Since the spot moves in the scanning direction for the lighting time of the laser beam and thereby the image is expanded, the image should be compensated. Thus, the shape of the cross section of the laser beam which enters the image forming optical system is preferably elliptic. In the surface light emitting type semiconductor laser, since the elliptic ratio of the laser beam can be freely controlled, the laser beam with a cross section whose major axis accords with the scanning plane and whose ratio of the major axis and the minor axis is appropriate can be entered into the image forming optical system.

As the sectional area of the optical resonator increases on the surface of the device substrate 122 of the surface light emitting type semiconductor laser 121 becomes large, laser oscillations of high order modes along with zero-th mode start. The distribution of the amount of light of the image spot has several peaks. Thus, this situation is not suitable for forming a static latent image on the image bearing member 105. To prevent this situation, a plurality of small optical resonators are closely disposed and the phase of each laser beam oscillated is synchronized. As a result, the light emitting portions 121*a* which are large in size and oscillated in the zero-th mode can be obtained.

FIG. 15 shows a partial sectional view of a light emitting portion 121*a* of the phase-lock surface-light-emitting type semiconductor laser 121. In this semiconductor laser 121, a plurality of optical resonators are disposed at very short intervals. The bottom of the embedded layer 132 does not reach the active layer 125. Thus, rays which leak out from the adjacent optical resonators adversely affect each other through the clad layer 126 below the embedded layer 132. Thus, laser beams are oscillated with the same phase. As a result, the plurality of adjacent optical resonators operate as if a single optical resonator works. Since the wave faces of beams emitted from the optical resonators are matched, these optical resonators work as a surface laser emitting source. Thus, the apparent area of the light emitting portion 121*a* becomes large. The spread angle of each laser beam is as small as 2 degrees or below in full width at half maximum.

In the phase-lock surface-light-emitting type semiconductor laser, the spread angles of laser beams are small in comparison with the conventional semiconductor laser. With respect to this characteristic, the relation between the embodiment of the present invention and the embodiment of the related art will be described. When the spread angle of a laser beam is 2 degrees in full width at half maximum and the laser beam is entered into an image forming optical system with a beam diameter of 2 mm, the focal length fc of a collimator lens 102 becomes approximately 35 mm. Since the focal length fc of the collimator lens 102 can become long, the adjustment allowance of the distance of the collimator lens 2 to the semiconductor laser 121 is increased.

Further, by excessively decreasing the spread angle of each laser beam, after the laser beam travels from the semiconductor laser to the rotating polygon mirror 103 to the image forming lens 104, the laser beams is not largely spread. Thus, even on the incident plane of the image forming lens 104, the size of the laser beam can be decreased enough to obtain a predetermined diameter of an image spot. In other words, the collimator lens which collimates a laser beam with a predetermined collimate diameter is not required as opposed to the conventional laser scanning optical system. However, depending on the defection angle of the rotating polygon mirror 103, the length of the optical path varies, so does the size of the laser beam entered into the image forming lens 104. Thus, there should be provided an optical system which compensates the size of the laser beam. Nevertheless, the image forming lens 104 can be easily provided with such an optical function. Thus, the number of constructional parts of the overall optical system can be decreased.

In the surface light emitting type semiconductor laser, generally an emitted laser beam is linearly polarized. The direction of the polarization depends on the shape of the plane of the optical resonator on the device substrate. The plane of polarization nearly accords with the longitudinal direction of the shape of the plane of the optical resonator. For example, when the optical resonator is in an elliptic shape, the direction of the major axis thereof becomes the plane of polarization. As described above, in the phase-lock type semiconductor laser, the light emitting portion is composed of a plurality of phase-lock optical resonators. The number of optical resonators is for example four. At this point, the shape of the cross section of the laser beams emitted is a composite shape thereof. Thus, in accordance with the arrangement of the optical resonators, the shape of the cross section of the composite laser beam can be freely set. In this case, the orientation of the plane of polarization depends on the shape of the plane of each optical resonator. Thus, in the case where a composite laser beam in a elliptic shape is obtained, the major axis and the direction of the plane of polarization can be independently set.

FIG. 16 (*a*) schematically shows this situation. This figure is a plan view of a light emitting portion 142 of a semiconductor laser, the light emitting portion 142 being seen from the beam emitting side. The light emitting portion 142 is composed of four optical resonators 41 which phase-synchronously oscillate. The plane of polarization 143 of a laser beam emitted from each optical resonator 41 is inclined by 45 degrees as shown in FIG. 16 (*a*). The major axis of the composite elliptic laser beam accords with the vertical direction of the light emitting portion. In addition, as shown in FIG. 16 (*b*), when the planes of polarization 43 of the laser beams emitted from the optical resonators 41 are oriented at different angles, the composite laser beam nearly becomes circularly polarized light.

As described above, in the conventional laser beam printer, an image spot on the image bearing member is often in an elliptic shape where the minor axis thereof accords with the scanning direction. When the semiconductor laser is disposed in such a way that the orientation of the plane of polarization of a laser beam from each optical resonator is inclined to the direction of the major axis of the elliptic cross section of the composite laser beam by 45 degrees and the major axis of the composite beam is matched with the scanning direction, the plane of polarization of the laser beam from each optical resonator is inclined to the beam scanning plane by 45 degrees. As a result, the plane of polarization is inclined to the rotating axis of the rotating polygon mirror 103 by 45 degrees. Thus, as shown in FIG. 19, the difference of reflectances of laser beams according to incident angles thereof to the rotating polygon mirror becomes small. This situation also applies to a laser beam with a cross section of an elliptic shape, the beam being circularly polarized light. In some optical systems, the minor axis of a laser beam emitted from the semiconductor laser is matched with the scanning direction. In this situation, the same effects can be obtained.

It should be appreciated that the above-mentioned embodiment is an example of the present invention. For example, by using a Galvano mirror or a hologram disk instead of the rotating polygon mirror, the same effects can be obtained. In addition, regardless of whether the collimator lens, the tilt angle compensation lens, and/or the image forming lens is used or not, the same effects can be obtained. Moreover, even if the construction and/or relative positions of these lenses are changed, the same effects of the present invention can be likewise achieved.

Furthermore, the image forming apparatus of the present invention can be used for facsimile machines, display units, and so forth as well as printing units such as printers and copy machine.

2-3 Effects

As described above, in the image forming apparatus of the present invention, since a surface light emitting type semiconductor laser is used, the following results can be obtained.

(1) Since the spread angle of each leaser beam is small and the distance between the collimator lens and the semiconductor laser is large, the adjustment allowance in the direction of the optical axis of the collimator lens is increased and thereby the producibility of the apparatus is improved. Moreover, without influences of aged deterioration and temperature fluctuation in operation, an image can be exposed with a predetermined spot diameter. As a result, the image quality is improved.

(2) Since the astigmatic difference of the surface light emitting type semiconductor laser is low as a characteristic thereof, the elliptic shape of the cross section of a beam (ratio of major axis and minor axis) can be freely set. Thus, without necessity of an optical system which compensates the astigmatic difference, the beam can be precisely shaped.

(3) Since a group II–VI compound semiconductor is used for the surface light emitting type semiconductor laser as an embedded layer, the laser oscillation can be accomplished with a low threshold current value. Thus, the bad influence of heat generated by the device against the laser characteristics can be reduced.

(4) When a phase-lock surface-light-emitting type semiconductor laser with a plurality of optical resonators which emit phase-locked laser beams is used as the surface light emitting type semiconductor laser, the spread angle of each laser beam can be further decreased. In some cases, the collimator lens can be omitted. Thus, the construction of the optical system can be further simplified.

(5) Since the light emitting portion can be composed of a plurality of optical resonators whose plane of polarization can be freely set, when a composite laser beam with an elliptic cross section is used, the direction of the plane of polarization of the laser beam can be set freely and independent from the direction of the major axis of the cross section of the composite laser beam. As a result, the fluctuation of the amount of light according to the position in the scanning direction of the laser beam due to the difference of incident angle of the laser beam to the polygon mirror can be minimized.

Section 3 Third Embodiment of Image Forming Apparatus 3-1 Comparison with Related Art Before describing a third embodiment of the present invention, so as to easily understand the conception thereof, the related art thereof will be described.

Figure 27:
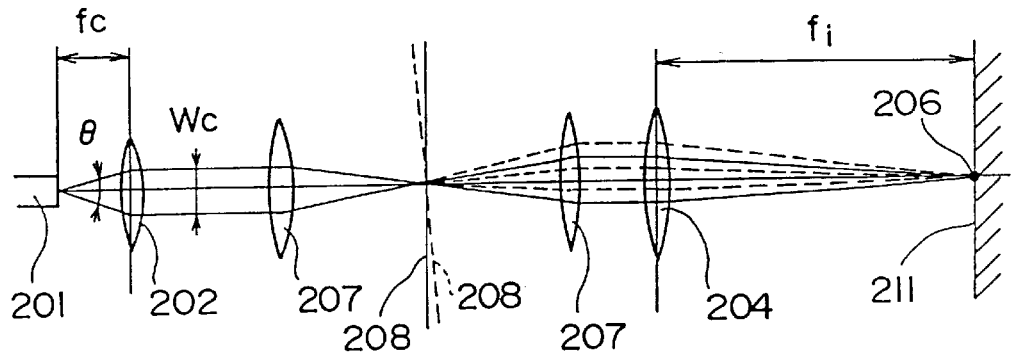
FIG. 27 is an optical side showing an optical path of a conventional laser beam scanning optical system.

FIG. 27 shows a sectional view of an optical path of a conventional image forming apparatus. The figure illustrates a plane which is perpendicular to a scanning plane of a image bearing member of an image forming apparatus and which contains an optical axis. That is, the figure shows a sectional view of the optical path on a sub scanning plane. In the figure, the optical axis is bolded back at a reflecting surface 208 of a rotating polygon mirror. In the figure, a laser beam which is emitted from a semiconductor laser 201 is radiated with a spread angle θ. This beam is shaped to a nearly parallel beam by a collimator lens 202 of a focal length fc. Each beam is collected on the reflecting surface 208 of the rotating polygon mirror by a tilt angle compensation lens 207. The beam which is deflected by the rotating polygon mirror 208 becomes a parallel beam after passing through a second tilt angle compensation lens 207'. Thereafter, the beam is imaged as a spot 206 on a image bearing member 211 by a scanning lens 204 of a focal length fi. On a plane in parallel with the scanning plane, since the tilt angle compensation lenses 207 and 207' do not have optical powers, the beam is kept parallel. In other words, the beam is imaged as a line images on the reflecting surface 208 of the rotating polygon mirror 208.

Next, the operations of the tilt angle compensation lenses 207 and 207' will be described. The inclination of each reflecting surface 208 of the rotating polygon mirror has an error of the order of several ten seconds in angles to the rotating axis. Thus, the image position of the beam reflected to this surface has a deviation in the sub scanning direction on the surface of the image bearing member due to the effect of "optical lever." This deviation is too large to ignore in comparison with pitches of scanning lines. To prevent this deviation, as disclosed in Japanese Patent Laid-Open Publication Serial No. SHO 48-49315, a tilt angle compensation lens 207' which allows each reflecting surface of the polygon mirror and the surface of the image bearing member 211 (the surface on which an image is formed) to be placed in optical conjugate positions. This tilt angle compensation lens 207' is normally a cylindrical lens or a toric lens which has an optical power only on a sub scanning plane. Even if the reflecting surface is inclined, the beam is always imaged in the same position on the image forming surface.

Figure 28:
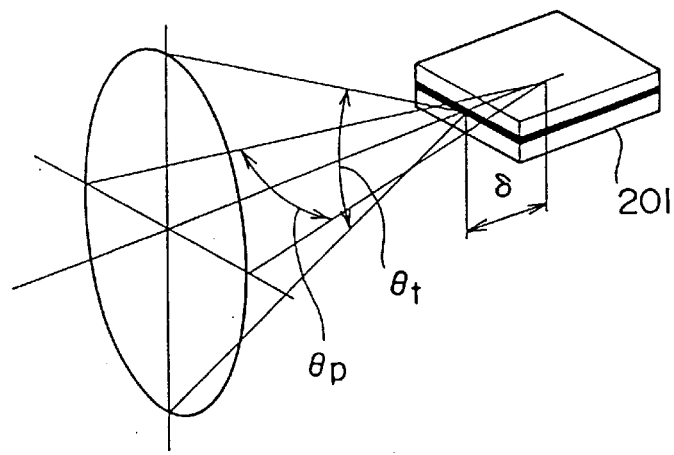
FIG. 28 is a schematic diagram showing a conventional edge emitting type semiconductor laser.

FIG. 28 is a schematic diagram showing the conception of a so-called edge emitting type semiconductor laser which has been widely used. As shown in the figure, the spread angle of a beam on the plane which has the optical axis and is in parallel with the contact surface largely differs from that on the plane which has the optical axis and is perpendicular to the contact surface. The spread angle θp on the plane in parallel with the contact surface of a conventional laser diode is approximately 10 degrees in full width at half maximum. On the other hand, the spread angle θt on the plane perpendicular to the contact surface is as large as approximately 30 degrees in full width at half maximum due to an influence of diffraction.

However, when there is a difference between the spread angle of a beam on the contact surface and that on the plane perpendicular thereto as described above, if the beam is collimated by the collimator lens 202, the cross section of the resultant laser beam becomes a largely compressed elliptic shape. When the parallel beam where the ratio of the longer diameter and shorter diameter is large is imaged on the image bearing member 211 by the scanning lens 204, the relation of ratio of the longer diameter and shorter diameter of the parallel beam becomes reverse.

On the other hand, as disclosed in Japanese Patent Laid-Open Publication Serial No. SHO 52-119331, on the image plane, that is, on the image bearing member, the image spot is preferably an ellipse with a comparatively shorter minor axis in the scanning direction. Since the laser is lit at predetermined intervals of pulses, the spot diameter in the scanning direction should be smaller than that in the sub scanning direction so as to compensate the traveling distance of the laser beam.

Thus, to image a beam of a large ratio of spread angles as a spot with a predetermined ratio of longer diameter and shorter diameter, an anamorphic optical system where the optical characteristics in the scanning direction differ from those in the direction perpendicular thereto should be disposed on the optical path somewhere from the semiconductor laser 201 to the image bearing member 211.

The technique for providing this characteristic to the above-mentioned tilt angle compensation optical system has been widely used. In FIG. 27, since the tilt angle compensation lenses 207 and 207' are afocal in the sub scanning direction, when the distance between the reflecting surface and one lens differs from that between the reflecting surface and another lens, a beam expander which works only in the sub scanning direction can be formed.

However, such a tilt angle compensation optical system is always a longitudinal cylindrical lens or a toric lens, it leads to a difficulty of production or rise of production cost. In addition, the optical axis of the tilt angle compensation lens 207 in front of the rotating polygon mirror should be accurately adjusted. These drawbacks prevent the producibility of the image forming apparatus and the reliability thereof from being improved.

As described above, a major factor which causes an angular error of a laser beam on the sub scanning plane is the machine accuracy of the angle of each reflecting surface of the rotating polygon mirror. In other words, the dynamic vibration of the rotating axis of the rotating polygon mirror is not a critical matter. Thus, by rotating a single mirror surface rather than the rotating polygon mirror, the major factor of this matter can be solved. Thus, in the conventional image forming apparatus, the tilt angle compensation lenses are not necessary.

In addition, since such a rotating mirror has only one reflecting surface, the machining work thereof is easy and the moment of inertia is small. Thus, this rotating mirror can have a resistance to the vibration thereof.

The concept of this rotating single-surface mirror is not novel. However, one rotation of this mirror allows only one line to be scanned. In other words, this mirror is not suitable for use in the so-called laser printer.

Now, consider the following situation. The pitch of scanning lines is 300 dpi (300 dots per inch (=25.4 mm), that is, the number of scanning lines is 300). The paper size is A4. Papers of this size are loaded in the longitudinal direction of the laser printer. 10 papers are printed per minute. In this situation, when a rotating polygon mirror with six surfaces is used, the number of rotations is approximately 7000 rpm (rotations per minute). It is said that the upper limit of the number of rotations of a rotating polygon mirror using a ball bearing is in the range from 12000 to 14000 rpm. When one reflection mirror which is rotated at 12000 rpm is used, the number of papers which can be printed is at most three.

On the other hand, when the tilt angle compensation lenses 207 and 207' are removed, as described above, the function as the anamorphic beam expander which images a laser beam with a large ratio of spread angles as a spot with a particular elliptic ratio on the image bearing member is lost.

3-2 Construction of the Present Invention

FIG. 21 is a schematic diagram showing an image forming apparatus according to the present invention.

In the process for obtaining a print result on an image transfer material 251, namely, in the electrophotographic process, an organic photoconductor (OPC) with an increased sensitivity in a longer wavelength region has been widely used. This image bearing member 205 is charged to a predetermined surface potential by a charger 252. Thereafter, a laser beam scanning unit 253 performs a light writing process, that is, a light exposing process. In accordance with image information from the laser beam scanning unit 253, a plurality of laser beams 254 whose light intensities are individually modulated are scanned on image bearing member 205 in the axial direction thereof, thereby generating electric charges which neutralize the surface potential only for the exposed portion. Thus, the absolute value of the surface potential of this portion becomes low. As a result, on the image bearing member 205, a distribution of surface potentials in accordance with the image, that is, a static latent image is formed. A developing unit 255 selectively adheres a developing agent in accordance with the surface potentials to the image bearing member 205. Thus, the static latent image is developed. This developing agent is transferred to a transfer material 251 (normally, a paper) by a transferring unit 256. The developing agent on the transfer material 251 is fixed with a thermal pressure by a fixing unit 257. Thereafter, the transfer material 251 is unloaded from the apparatus.

FIG. 20 is a schematic diagram showing the construction of a laser beam scanning unit of the present invention. In the laser beam scanning unit 253 shown in FIG. 21, the laser beams 254 are folded back and downwardly emitted. However, in this example, the illustration of the laser beams is simplified. The technique for scanning a image bearing member with a plurality of laser beams is referred to as a multi-beam laser scanning technique. A plurality of laser beams emitted from a plurality of light emitting portions 221a of a semiconductor laser array 221 are collimated to laser beams with predetermined diameters by a collimator lens 2. The laser beams are entered into a rotating mirror 218 with one reflecting surface. As the rotating mirror 218 rotates, these laser beams are deflected. The laser beams which pass through a scanning lens 204 are imaged as, spots 6 on the image bearing member 205. The lighting and the amount of light of each of the light emitting portions 221a are discretely controlled by a control unit 260.

The scanning lens 204 has two major functions. The first function of the scanning lens 204 is a so-called "fθ" function which converts the scanning motion of iso-angular velocity of a rotating mirror 218 into the scanning motion of iso-linear velocity on the image bearing member 205. The second function of the scanning lens 204 is the compensating function for curvature of field. With this function, the image point moves forward or backward in the direction of optical axis depending on the scanning angle so that the image plane becomes flat.

Each of the collimator lens 202 and the scanning lens 204 has an iso-tropic optical characteristic on the entire plane including the optical axis thereof. In other words, on the entire plane including the optical axis, the focal length and curvature of the collimator lens 202 are the same as those of the scanning lens 204. Thus, these lenses 202 and 204 are non-anamorphic lenses each other.

In this embodiment, since the number of laser beams is four, if the number of rotations of the rotating mirror 218 is not changed, four times the scanning speed can be obtained. As described above, when the rotating mirror which can be rotated at the maximum speed currently available is used, the print speed of 10 papers (in A4 size) per minute can be obtained. This speed is satisfactory for personal-use laser printers. When the number of laser beams is further increased, the speed suitable for business-use laser printers can be obtained.

Each light emitting portion 221a of the semiconductor laser array 221 is independently controlled in accordance with image data to be written to each scanning line. Each light emitting portion 221a emits a modulated laser beam. Thus, parallel data is transferred from an image data storage portion (not shown in the figure) to the semiconductor laser array 221.

As will be described later, the position in the scanning direction of each image spot differs one by one. Thus, the modulation timing of each laser beam is delayed in accordance with the amount of deviation of this position.

Figure 22:
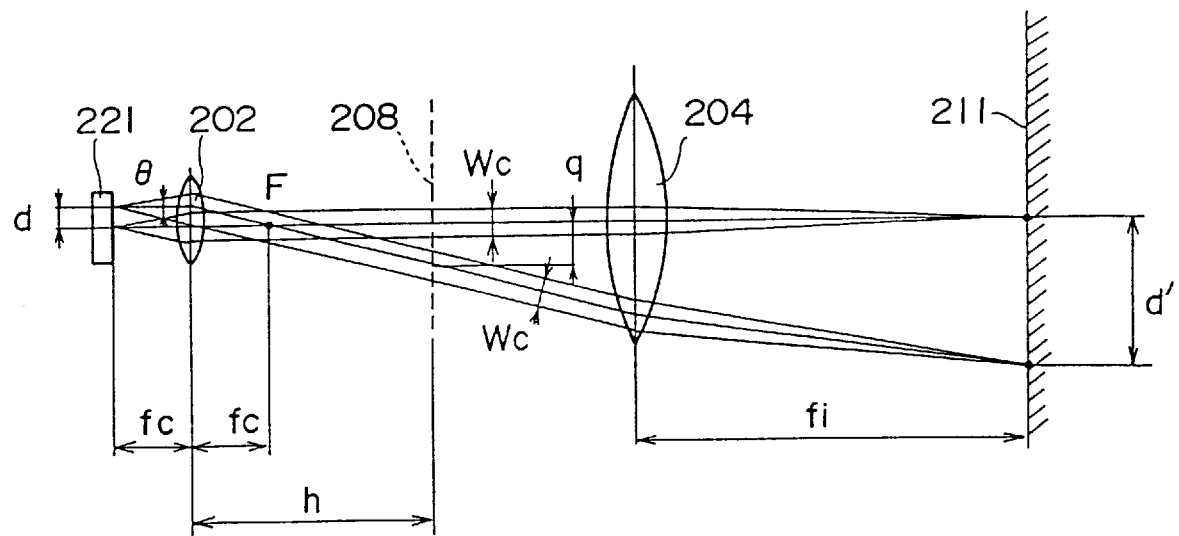
FIG. 22 is an optical side view showing an optical path on a scanning plane.

As shown in FIG. 22, now, for simplicity, consider a multi-beam laser scanning optical system using two laser beams, a convex collimator lens, and a convex image forming lens. The two laser beams spaced apart by d and emitted from the semiconductor laser array 221 are collimated by the collimator lens 202 of a focal length fc. Since the semiconductor laser array 221 is disposed at an object side focal point of the collimator lens 202, the two laser beams are intersected at an image side focal point F thereof. When a spot 206 of $d_0=100$ μm is formed on the image plane 211, if fi is 200 mm, the diameter Wc of the beam entered into the scanning lens, that is, the collimate diameter, is given by the formula (5). The spot diameter or the beam diameter is a diameter where the intensity of the cross section of a beam is the power of the peak intensity times $(1/e^2)$. The distribution of this intensity accords with a Gaussian distribution.

$$WC = d_0 \sqrt{1 + \left(\frac{4\lambda fi}{\pi d_0^2}\right)^2} \quad (5)$$

However, λ is the wavelength of the laser, which is 780 nm. On the other hand, the focal length fc of the collimator lens 202 depends on the spread angle of the laser beam emitted from the semiconductor laser array 221. The focal length fc is given by the following formula.

$$fc = \frac{WC}{\theta} \quad (6)$$

where θ is defined by 1/e2 in full width along with the diameter of the beam.

In addition, due to the arrangement of each element of the scanning unit, a particular distance h should be disposed between the collimator lens 202 and the reflecting surface of the deflecting unit. Moreover, when n laser beams are disposed in line, the distance q of each adjacent reflection position of n laser beams on the reflecting surface 208 is given by the following formula.

$$q = d \cdot \frac{h - fc}{fc} (n-1) \quad (7)$$

Next, an edge emitting type semiconductor laser where a laser beam is emitted from the edge of a device substrate has been widely used for a semiconductor laser array. As described in the paragraph of the related art shown in FIG. 28, a laser beam emitted is diffracted in the direction perpendicular to the substrate of the semiconductor laser array 201. Thus, the laser beam is spread with an angle of approximately 30 degrees in full width at half maximum. At this point, the focal length fc of the collimator lens 202 becomes approximately 3 mm. When the number n of laser beams is four and the distance h from the collimator lens 202 to the reflecting surface 208 is 100 mm, the distance q of each adjacent beam reflection position becomes 9.7 mm. Thus, the size of the reflecting surface should be increased by the distance q of each adjacent beam reflection position. In this situation, according to the present invention, since there is only one reflecting surface, the size of the reflecting surface can be more easily increased than the case where the rotating polygon mirror is used.

However, in the semiconductor laser array 221, it is preferable to use a so-called surface light emitting type semiconductor laser. In the surface light emitting type laser array 221, since the sectional area of the light emitting portions 221a is larger than that of the conventional edge emitting type semiconductor laser array, the spread angles of the laser beams are small. Although the value of the spread angle just depends on the area of the light emitting window, the area can be precisely controlled by an etching process or the like. Thus, the spread angle can be kept constant. For example, a laser beam with a spread angle of approximately 8 degrees in full width at half maximum can be satisfactorily obtained. In addition, with the surface light emitting type semiconductor laser, since current and light can be effectively closed in an optical resonator of the laser, the amount of heat generated by each light emitting portion can be decreased. Moreover, when a plurality of light emitting portions are adjacently disposed, mutual optical, electrical, and thermal interferences can be decreased. Thus, the distance of each adjacent light emitting portion can be decreased in comparison with the conventional semiconductor laser.

When the above-mentioned formula (6) is applied to the surface light emitting type semiconductor laser with a beam spread angle of 8 degrees, the focal length fc of the collimator lens becomes approximately 8 mm. In addition, since the distance d of each adjacent light emitting portion on the semiconductor laser array can be set to as narrow as 50 μm, when the number n of beams is 4 and the distance h from the collimator lens 202 to the reflecting surface 208 is 100 mm, by applying the above-mentioned formula (7), the distance q of each adjacent reflection position of the four beams on the reflecting surface becomes approximately 1.73 mm.

Thus, the distance q of each adjacent beam reflection position is not noticeable against the collimate diameter Wc of the beams.

In particular, consider the case where the spot diameter on the image bearing member is set to 50 μm so as to form an image with a much higher resolution. By applying the above-mentioned formula, the collimate diameter Wc is doubled (namely, approximately 4 mm). Thus, the focal length fc of the collimator lens is also doubled. The distance q of each adjacent beam reflection potion on the reflecting surface is halved.

When each beam is tracked, the distance of each adjacent beam in any position on the optical axis is much smaller than the collimate diameter. Thus, even if an optical system deals with a plurality of laser beams, it is possible to design the optical system by considering only one typical beam. Thus, the design work of the laser scanning optical system is very simplified.

In addition, since the focal length of the collimator lens of this embodiment is larger than that of the case where the conventional surface light emitting type semiconductor laser is used, the allowance of the distance between the semiconductor laser and the collimator lens in the optical direction can be increased.

In a surface light emitting type semiconductor laser array suitable for the multi-beam scanning technique, a surface light emitting type semiconductor laser array where a group II–VI compound semiconductor is embedded in the periphery of the light emitting portion is more preferable.

Figure 23:
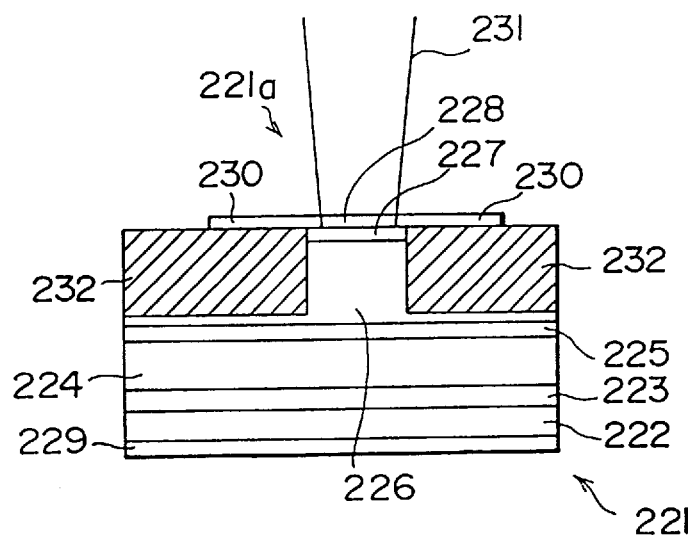
FIG. 23 is a sectional view showing an optical resonator of a surface light emitting type semiconductor laser.

FIG. 23 is a sectional view showing one of the light emitting portions 221a of the surface light emitting type semiconductor laser array 221. As shown in the figure, on the Ga—As device substrate 222, a semiconductor laminate reflecting layer 223 is formed. The reflecting layer 223 is composed of several ten layers of two types of Al—Ga—As compounds. On the reflecting layer 223, a clad layer 224, an active layer 225, a clad layer 226, and a contact layer 227 are disposed, each of which is composed of Al—Ga—As compounds. On the contact layer 227, a $SiO_2$ dielectric laminate reflecting layer 228 is formed. On the entire rear surface of the Ga—As substrate, a window-shaped electrode 229 is formed. In addition, in the periphery of the dielectric laminate reflecting layer 228, a window-shaped electrode 230 is formed. Thus, all the parts formed on the Ga—As substrate compose an optical resonator.

A light beam which is generated on the active layer 225 reciprocatively travels between the upper reflecting layer 227 and the lower reflecting layer 223 in the direction perpendicular to the surface of the device substrate 222. Thus, the light beam is oscillated. As a result, the optical axis of the laser beam 231 is nearly perpendicular to the surface of the device substrate 222.

In the periphery of the optical resonator, a group II–VI compound semiconductor is embedded as an embedded layer 232. As the group II–VI compound semiconductor, it is preferable to use a group II–VI compound which contains two, three, or four elements selected from both group II elements Zn, Cd, and Hg and group VI elements O, S, Se, and Te. In addition, it is preferable to match the lattice constant of the compound with that of the semiconductor layers composed of the clad layer 224, the active layer 225, and the clad layer 226. Since the electric resistance of the group II–VI compound semiconductor is very large, the current is effectively closed in the optical resonator. In addition, since the refractive index of the embedded layer 232 differs from that of the Al—Ga—As semiconductor layer, the beam which travels in the optical resonator in the direction just or nearly perpendicular to the surface of the device substrate 222 is totally reflected at the interface with the embedded layer 232. Thus, the beam is effectively closed in the optical resonator. Therefore, when such a semiconductor laser array 221 is used, the laser oscillation starts with a very small amount of current in comparison with the conventional laser array. In other words, the threshold value of the semiconductor laser array 221 is lower than that of the conventional one. Thus, the amount of lost heat on the device substrate is small. In FIG. 23, a diode is formed on the Ga—As substrate 222. The light generated in the active layer 225 reciprocally travels between the reflection layers 223 and 228. Thus, a laser oscillation takes place. A laser beam 231 is emitted from the reflection layer 228 whose reflectance is smaller than that of the reflection layer 228 in the direction perpendicular to the surface of the device substrate.

As described in the paragraph of the related art, in the conventional laser beam printer, since an image spot of a laser beam formed on a image bearing member is in an elliptic shape where the minor axis thereof accords with the scanning direction, the cross section of the laser beam entered into the scanning lens is preferably an elliptic shape where the major axis thereof accords with the scanning direction.

However, according to the present invention, the tilt angle compensation optical system is not used. As described above, when the edge emitting type semiconductor laser array is used, by using a collimator lens with an anamorphic characteristic, it is necessary to correct the ratio of the major diameter and minor diameter of the elliptic cross section of a laser beam which is entered into the scanning lens. Such a collimator lens is not difficult to produce. Thus, this lens does not decrease the advantages of the present invention.

However, in the surface light emitting type semiconductor array, the elliptic ratio of the cross section of a laser beam emitted can be freely controlled without necessity of a special optical system. Thus, a laser beam in an elliptic shape whose major axis accords with the scanning plane and which has a proper elliptic ratio of major axis and minor axis can be entered into the scanning lens. In other words, to obtain an ideal elliptic ratio of an image spot, the surface light emitting type semiconductor laser array is most suitable.

Figure 24A:
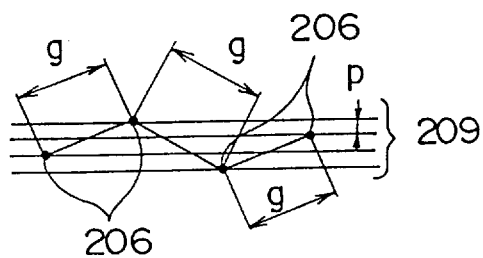
FIG. 24 comprises schematic diagrams showing the relation of scanning lines and spot positions.
Figure 24B:
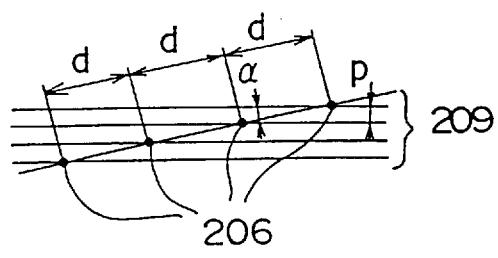
Figure 24C:
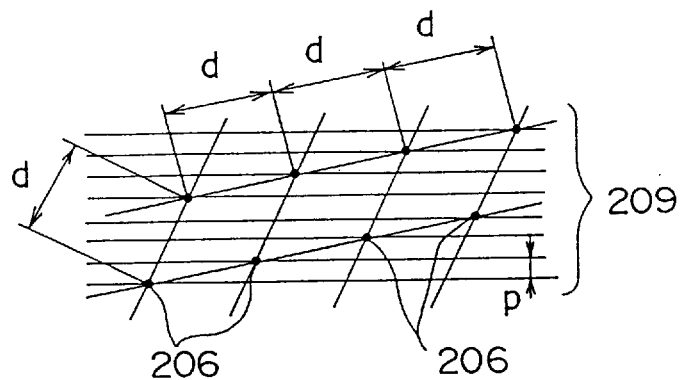

In addition, in the surface light emitting type semiconductor laser, since the light emitting portions can be disposed at any positions where they do not interfere each other, they can be two-dimensionally disposed on the device. Now, in an exposing system which scans the image bearing member with four laser beams, consider the relation between scanning lines and image spots. In addition, assume the case where four adjacent scanning lines are drawn with one scanning sequence. When the image spots 206 are disposed as shown in FIG. 24 (a), the angle and the distance of each adjacent laser beam can be decreased in comparison with the case where they are disposed in line as shown in FIG. 24 (b). Thus, the size of the reflecting surface of the reflector and the sizes of other optical systems can be according decreased.

In the above example, the case where four laser beams are used was considered. When the number of laser beams is further increased, the light emitting portions can be freely disposed on the semiconductor laser array so that the spots are disposed at the closest positions on the image bearing member. As a result, more significant effects can be obtained than the above-mentioned construction. In FIG. 24 (c), an example of the arrangement of image spots according to scanning lines in the case where eight laser beams are used is shown. In other words, even if there is provided one reflecting surface of the rotating mirror, by increasing the number of beams, a satisfactorily high print speed can be obtained.

According to this embodiment, in the scanning optical system, the optical characteristics in the main scanning direction are the same as those in the sub scanning direction. Thus, the positions of image spots on the image bearing member are similar to those on light emitting portions of the semiconductor laser array.

Next, with reference to a plan view of FIG. 25, a deflecting unit used in the present invention will be described. The deflecting unit is provided with one reflecting surface 215. The reflecting surface 215 is mounted on a rotating portion of a motor 216. The reflecting surface 215 is rotated at a constant speed. As described above, so far, the conventional polygon mirror has had restrictions in the machining method and construction so as to maintain the mutual angular accuracy of each reflecting surface. Generally, the rotating polygon mirror is composed of a single metal rod which is ground in a polygon shape. Each surface is mirror-finished and then coated. However, in the case of the deflecting unit having a single reflecting surface, without necessity of the above-mentioned grinding process, by adhering a flat glass plate with an evaporated mirror film to the rotating portion, the deflecting unit can be produced. Thus, the production cost is very low.

The rotating portion including the reflecting surface is lighter than the conventional polygon mirror. Thus, the rotating portion has a large resistance to vibrations caused by the rotations thereof. This rotating portion is designed to have a dynamic balance to the rotating axis. Alternatively, if necessary, the dynamic balancing means is added to the rotating portion.

In addition, the rotating portion is designed to allow the center of the reflecting surface 215 to accord with the rotating shaft A. When a laser beam 217 is entered in the vicinity of the rotating axis A on the reflecting surface 15, even if the reflecting surface 215 is rotated, the laser beam 217 is positioned almost at one point on the reflecting surface 215. Thus, the size of the reflecting surface becomes very small in comparison with the conventional rotating polygon mirror.

Figure 26:
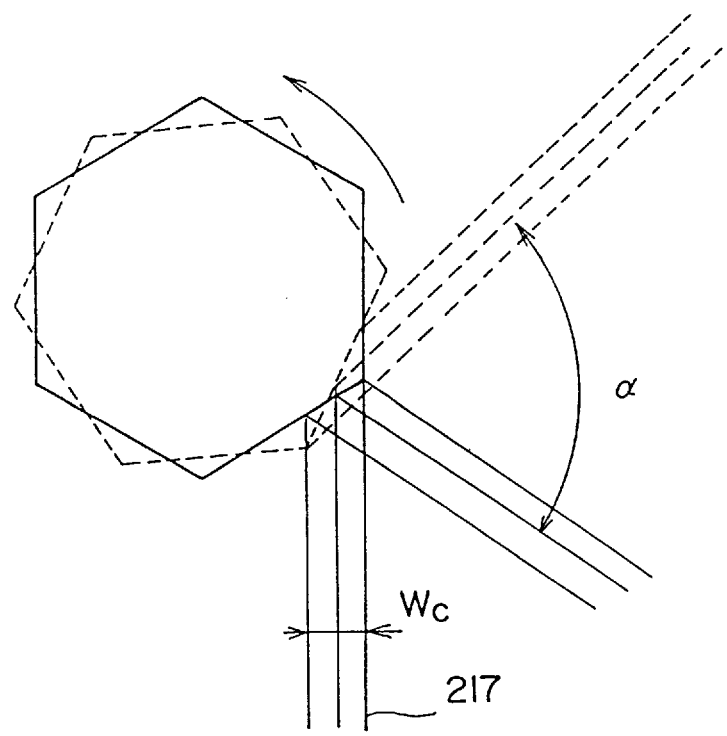
FIG. 26 is a schematic diagram indicating the operation of a beam deflecting unit using a rotating polygon mirror.

Moreover, in the case where there is provided only one reflecting surface, angles at which beams can be deflected are much wider than the case where the polygon mirror is used. For example, in the case where a mirror with six reflecting surfaces as shown in FIG. 26 is used, provided that the collimate diameter Wc of the laser beam 217 is 0, the limit of the scanning angle α is 120 degrees regardless of the size of the reflecting surface. On the other hand, the effective scanning angle of a scanning optical system which can be conventionally designed is at most approximately 90 degrees. Moreover, in consideration of the collimate diameter Wc of, a laser beam entered into the reflecting surface and the space of a detecting unit which detects the scanning start position of the beam, the above-mentioned mirror with six reflecting surfaces does not provide a sufficient scanning angle of the deflecting unit. Thus, the effective scanning angle of the scanning lens is narrowed.

On the other hand, in the case of single reflecting surface, if the rotating axis is placed on the reflecting surface or the size of the reflecting surface is infinite, the effective scanning angle logically becomes 360 degrees. Thus, in this case, a scanning lens with a large scanning angle can be used and the size of the scanning optical system can be decreased.

Further, in the case of single reflecting surface, the period for which the reflecting surface is actually used for one scanning sequence is approximately 10% of the period of one rotation thereof. The remaining period is not involved in the scanning sequence. If a laser beam is radiated in the remaining period, it is emitted to the rear of the reflecting surface. Thus, unexpected reflection light is imaged on the image bearing member. Thus, a circuit which stops the laser oscillation in the unnecessary period is provided.

Alternatively, by using the period which is not involved in the scanning sequence, after the laser oscillation is started, the amount of light is detected and thereby the laser drive current is set so that a predetermined amount of light is obtained. To prevent a laser beam of an unnecessary reflection from reaching the image bearing member, it is preferable to properly design the angle of peripheral members of the deflecting unit or perform a surface treatment which prevents unnecessary light from reflecting.

The above-mentioned embodiment is only one embodiment of the present invention. Even if the constructions of the collimator lens and the scanning lens and the relation of the relative positions thereof are changed, the same effects of the present invention can be obtained. In addition, it should be noted that even if the rotating mirror is constructed and/or produced by using a different method such as a plastic injection molding method, the similar effects of the present invention can be attained. Moreover, besides the rotating mirror which rotates in one direction at a constant speed, with a so-called galvano mirror which rotatably vibrates, the effects of the present invention can be similarly acquired.

Further, the construction of the device of the surface light emitting type laser described in the above-mentioned embodiment is only an example which can be accomplished. In the condition where the characteristics of the spread angle of each emitted beam, the distance of each light emitting portion, and so forth are the same as those of the above-mentioned embodiment, the same effects of the present invention can be obtained regardless of the construction thereof.

It is obvious that the scope of the applications of the image forming apparatus of the present invention includes facsimile machines and display units as well as printing apparatus such as the printers and copy machines. In these apparatuses and units, the same effects of the present invention can be attained.

3-3 Effects

As described above, in the image forming apparatus of the present invention, since the rotating mirror with one flat reflecting surface is used as a deflecting unit, the rotating portion of the deflecting unit becomes small in size and light in weight. Thus, the deflecting unit can be easily produced. In addition, the dynamic vibration characteristics the deflecting unit is improved. Furthermore, since the tilt angle compensation optical system and the anamorphic optical system are omitted, a scanning optical system in a very simple construction which is easy to assemble and adjust can be accomplished. Moreover, since the multi-beam system is used, the scanning speed which is the same as that of the conventional apparatus can be maintained.

According to the present invention, in particular, when the surface light emitting type semiconductor laser array is used, with the collimator lens and the scanning lens other than a new additional optical system, the size of the reflecting surface can be decreased. In addition, the elliptic ratio of the image spot on the image plane can be freely set.

Section 4 Fourth Embodiment of Image Forming Apparatus 4-1 Comparison with Related Art Before describing a fourth embodiment of the present invention, so as to easily understand the conception thereof, the related art thereof will be described.

Figure 33:
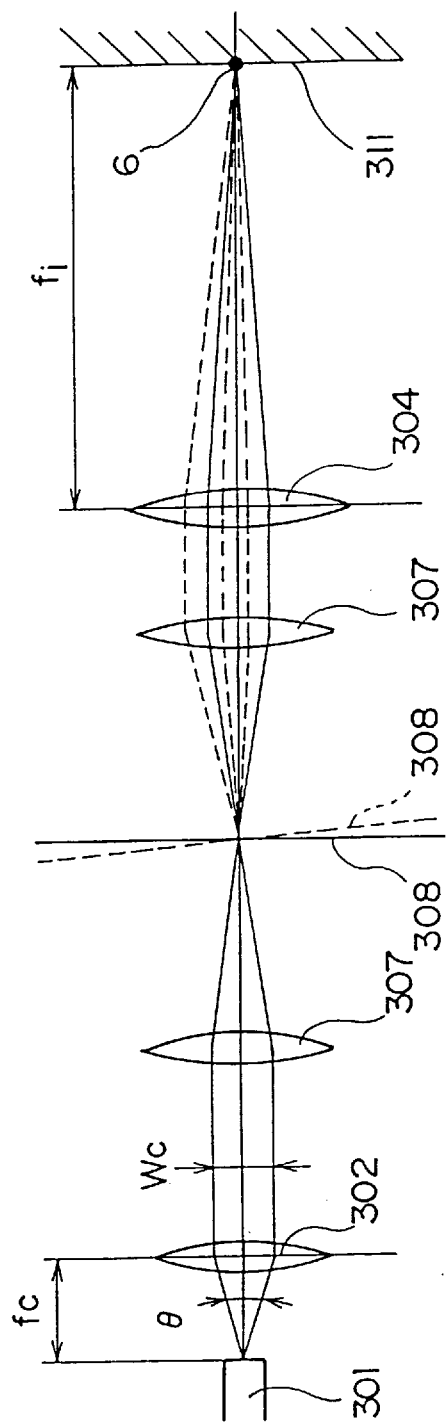
FIG. 33 is an optical side view showing an optical path of a conventional laser beam scanning optical system.

FIG. 33 shows a sectional view of an optical path of a conventional image forming apparatus. In the figure, a laser beam which is emitted from a semiconductor laser 301 is radiated with a spread angle θ. This beam is shaped to a nearly parallel beam by a collimator lens 302 of a focal length fc. Each beam is collected on the reflecting surface 308 of the rotating polygon mirror by a tilt angle compensation lens 307. The beam which is deflected by the rotating polygon mirror 308 becomes a parallel beam after passing through a second tilt angle compensation lens 307'. Thereafter, the beam is imaged as a spot on a image bearing member by a scanning lens 304 of a focal length fi. On a plane in parallel with the scanning plane, since the tilt angle compensation lenses 307 and 307' do not have optical powers, the beam is kept parallel. In other words, the beam is imaged as a line image on the reflecting surface 308 of the rotating polygon mirror.

Next, the operations of the tilt angle compensation lenses 307 and 307' will be described. The inclination of each reflecting surface 308 of the rotating polygon mirror has an error of the order of several ten seconds in angles to the rotating axis. Thus, the image position of the beam reflected to this surface has a deviation in the sub scanning direction on the surface of the image bearing member due to the effect of "optical lever". This deviation is too large to ignore in comparison with pitches of scanning lines. To prevent this deviation, as disclosed in Japanese Patent Laid-Open Publication Serial No. SHO 48-49315, a tilt angle compensation lens 307' which allows each reflecting surface of the polygon mirror and the surface of the image bearing member (the surface on which an image is formed) to be placed in optical conjugate positions. This tilt angle compensation lens 207' is normally a cylindrical lens or a toric lens which has an optical power only on a sub scanning plane. Even if the reflecting surface is inclined as shown with 308' of FIG. 33, the beam is always imaged in the same position on the image forming surface.

However, in recent years, as the skills for using computers are improved, the needs of high output speeds of image forming apparatuses are becoming strong. Accordingly, the modification of the apparatuses is actively performed. However, a deflecting unit using a rotating polygon mirror deflects one laser beam per facet and draws one scanning line. Thus, when the number of scanning lines in a predetermined time period is increased, provided that the number of surfaces of the rotating polygon mirror is not changed, the number of rotations thereof increases. On the other hand, provided that the number of rotations is not changed, the number of surfaces of the rotating polygon mirror increases. When the number of rotations of the rotating polygon mirror is increased one of bearings using dynamic or static pressure of gas or liquid should be used. However, these bearings are expensive in cost and difficult to handle. Thus, so far, these bearings could not be used for laser beam printers. On the other hand, when the number of surfaces of the rotating polygon mirror is increased, the deflection angle becomes small. Thus, the length of the optical path following the deflecting unit becomes long and the collimate diameter of the laser beam entered into the image forming optical system proportionally becomes large. Thus, the sizes of the lens and the rotating polygon mirror become large. In particular, when a high resolution of the image forming apparatus is also required along with a high output speed thereof, since the number of scanning lines also increases, a larger number of rotations and a longer optical path are further required. This situation also applies to an deflecting unit which is other than the rotating polygon mirror. In this situation, the scanning frequency becomes high and the length of the optical path following the deflecting unit becomes long. To solve this problem, a new exposing technique where a plurality of scanning lines are written with a plurality of laser beams in one scanning sequence was developed. This exposing technique is referred to as a multi-beam exposing technique.

To obtain a plurality of laser beams, a plurality of gas laser (for example, He—Ne) oscillators are used as light sources. Alternatively, a technique where a laser beam generated by one oscillator is time-divided into a plurality of portions by an acousto-optical modulator (AOM) or the like was developed. However, as a technique for simplifying the apparatus and for reducing the size thereof, as disclosed in Japanese Patent Laid-Open Publication Serial No. SHO 54-7328, a technique where a semiconductor laser array integrally having a plurality of light emitting portions on one device is used as a light source has been proposed. This technique is referred to as a multi-beam laser scanning technique.

However, when a plurality of laser beams with parallel optical axes are entered into a collimator lens, the optical axes tend to spread out with large angles. Thus, the size of the reflecting surface of the deflecting unit and the size of the lens constructing the optical system become very large in comparison with the technique where only one laser beam is used.

Figure 34:
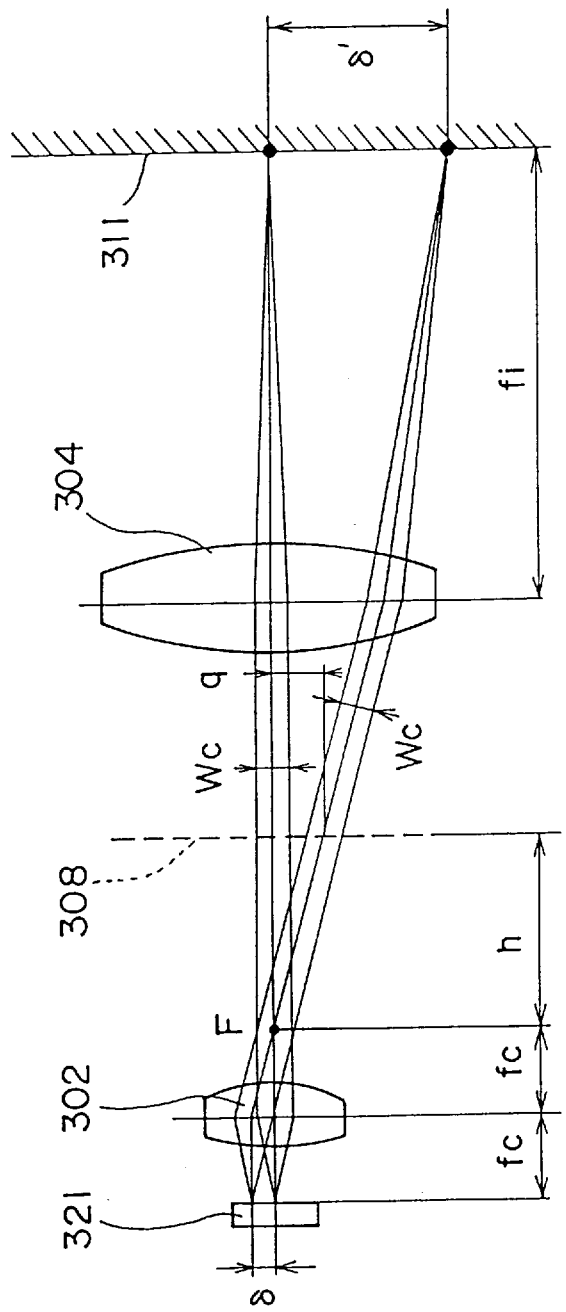
FIG. 34 is an optical side view showing an optical path of a multi-beam scanning system.

FIG. 34 is a sectional view showing an optical path from a semiconductor laser array to a image bearing member according to the multi-beam laser scanning technique. Now, for simplicity, consider a multi-beam laser scanning optical system using two laser beams, a convex collimator lens, and a convex image forming lens. The two laser beams spaced apart by δ and emitted from a semiconductor laser array 321 are collimated by a collimator lens 302 of a focal length fc. Since the semiconductor laser array 321 is disposed at an object side focal point of the collimator lens 302, the two laser beams are intersected at an image side focal point F thereof. When a spot 306 of $d_0 = 100$ μm is formed on an image plane 311, if fi is 200 mm, the diameter Wc of the beam entered into the scanning lens, that is, the collimate diameter, is given by the formula (8). The spot diameter or the beam diameter is a diameter where the intensity of the cross section of a beam is the power of the peak intensity times $(1/e^2)$. The distribution of this intensity accords with the Gaussian distribution.

$$WC = d_0 \sqrt{1 + \left(\frac{4\lambda fi}{\pi d_0^2}\right)^2} \tag{8}$$

However, λ is the wavelength of the laser, which is 780 nm. Thus, in this example, the collimate diameter Wc is approximately 2 mm.

Figure 35:
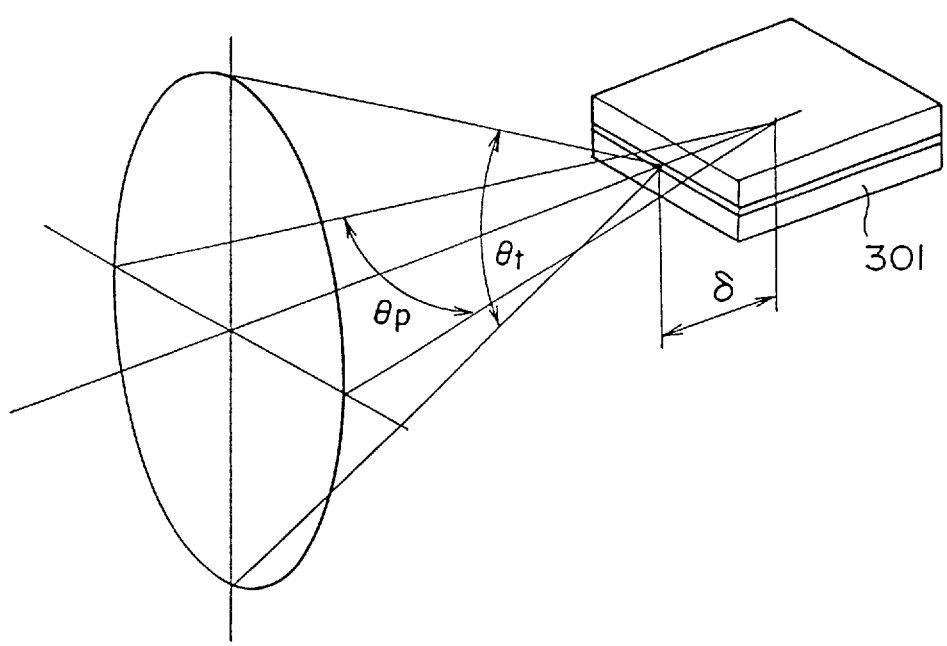
FIG. 35 is a schematic diagram showing a conventional edge emitting type semiconductor laser.

In the so-called edge emitting type laser diode which has been conventionally used, as shown in a conceptual schematic diagram of FIG. 35, the beam spread angle of a plane which includes the optical axis and which is in parallel with the contact surface largely differs from that of a plane which includes the optical axis and which is perpendicular to the contact surface. In the case of the conventional semiconductor laser, the spread angle θp on a plane in parallel with the contact surface is approximately 10 degrees in full width at half maximum. However, on a plane perpendicular to the contact surface, due to an influence of diffraction, the spread angle θt becomes approximately 30 degrees in full width at half maximum. In addition, it is difficult to freely set the spread angles θt and θp and the ratio thereof (namely, the ratio of longer diameter and shorter diameter of the ellipse of the beam). To effectively use most of the radiated beam, it is necessary to raise the coupling efficiency of the semiconductor laser array and the collimator lens. To obtain the collimate diameter of 2 mm, the focal length fc of the collimator lens 2 should be approximately 3 mm. On the other hand, in the conventional semiconductor laser array, the distance δ of each adjacent light emitting portion cannot be set to 100 μm or less due to the mutual interference thereof.

The distance from the image side focal point F of the collimator lens 302 to the reflecting surface 308 of the deflecting unit should be spaced apart by h due to the presence of each element of the scanning unit. On the other hand, when the distance between most spaced two of a plurality of light emitting portions on the semiconductor laser array 321 is δmax, the distance q of these two beams on the reflecting surface 308 of the deflecting unit can be expressed by the following formula.

$$q = \delta\max \cdot \frac{h}{fc} \qquad (9)$$

For example, when the number of beams is four and the distance of each adjacent light emitting portion disposed in line on the semiconductor laser array is 0.1 mm, δmax becomes 3×δ=0.3 mm. When the distance h from the image side focal point F of the collimator lens 302 to the reflecting surface 308 is 50 mm, q becomes 5 mm. Thus, the size of the reflecting surface should be at least the value where the distance q and the laser beam collimator diameter are added. In other words, the size of the rotating portion of the deflecting unit becomes large and thereby the bearing is exposed to a large load. In addition, the deflecting unit is unbalancedly rotated. According to the formula (9), as the value of fc/δmax decreases, the value of q increases.

Figure 36:
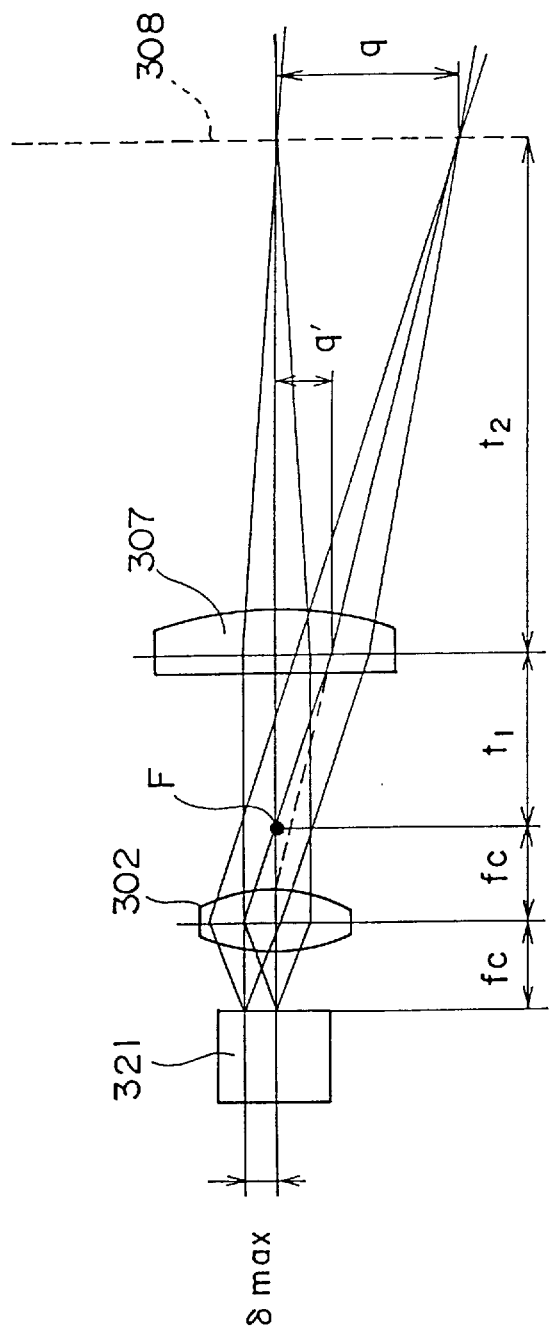
FIG. 36 is an optical side of an optical path including a tilt angle compensation lens.

Next, the case where the above-mentioned tilt angle compensation lenses 307 and 307' are added in the scanning optical system will be considered. Since the tilt angle compensation lenses are anamorphic optical elements, the optical characteristics on the scanning plane differ from those on the sub scanning plane. As described above, since the tilt angle compensation lenses do not have optical powers on the scanning plane, by applying the above-mentioned formula (9), the distance q of most spaced two beams on the reflecting surface can be obtained on the scanning plane. Thus, it is enough to consider only the sub scanning plane. FIG. 36 is a sectional view showing an optical path on the sub scanning plane including the tilt angle compensation lens 307. The figure shows elements disposed from the semiconductor laser array 321 to the reflecting surface 308 of the deflecting unit.

As described above, on the sub scanning plane, each beam is imaged as a line image on the reflecting surface 308 of the deflecting unit. Each line image is formed with a distance q on the right of the reflecting surface in the sub scanning direction. When the focal length of the tilt angle compensation lens 307 on the left of the beam deflecting unit is ft, the distance from the image side focal point F of the collimator lens 302 to the tilt angle compensation lens 307 is t1, and the distance from the tilt angle compensation lens 307 to the reflecting surface 308 of the deflecting unit is t2, provided that symbols in FIG. 34 are used, the mutual distance q' of most spaced two of laser beams entered into the tilt angle compensation lens 307 and the mutual distance q of these beams which are entered into the reflecting surface 308 are given by the following formulas (10) and (11), respectively.

$$q' = \delta\max \cdot \frac{t1}{fc} \qquad (10)$$

$$q = -q' \cdot \frac{-ft \cdot t1 + t2 \cdot t1 - fc \cdot t2}{ft \cdot t2} \qquad (11)$$

Generally, to allow a collimated laser beam to have a beam waist on the scanning plane, the relation of ft=t2 should be satisfied.

When t1<ft, two beams are not intersected on the image-eside. Thus, the relation of q>q' takes place. As the value of t1 decreases, the value of q increases. For example, when t1 is 20 mm, ft is 30 mm, and t2 is 30 mm, then q' becomes 2 mm and q becomes 3 mm. The formula (11) contains q'. By applying the formula (10), as the value of fc/δmax becomes larger the value of q' becomes small. At this point, since the relation of t1+t2=h is satisfied, the above-mentioned calculations can be applied on the scanning plane. In other words, in this example, the distance of most spaced two of beams in the sub scanning direction is small.

This situation can also apply to the mutual distance of each of plurality of laser beams which are entered into the scanning lens 4. In other words, when the incident position of the above-mentioned tilt angle compensation lens is the incident position of the scanning lens, the formula (10) can be applied. The distance from the collimator lens to the scanning lens is larger than that of the above-mentioned example. Thus, the size of the scanning lens should be further increased.

Generally, the collimator lens has the highest optical power in the optical elements which constructs the laser beam scanning optical system. In other words, the focal length of the collimator lens is the shortest in the other constructional elements of the laser beam scanning optical system. Thus, on the path where a plurality of laser beams radiated from a semiconductor laser array reach a image bearing member through an optical system, when the laser beams pass through the collimator lens, the mutual angle of each laser beam is most largely changed.

To prevent this problem, a technique for adding various optical elements which cause the positions of a plurality of laser beams reflected to be narrowed has been proposed. For example, in Japanese Patent Laid-Open Publication Serial No. SHO 56-69611, an afocal optical system is disposed behind a collimator lens so as to collect each beam on a reflecting surface. However, the addition of such an optical system results in complicating the construction of the scanning optical system. Thus, it is not suitable from standpoints of cost, adjustment, and reliability.

In addition, as described above, when a plurality of laser beams travel on different optical paths, the optical system should be designed so that the aberration and size of each image spot meet predetermined values for each laser beam. Thus, the number of design steps increases and the development period of the image forming apparatus becomes long. In addition, it is difficult to obtain designed solutions where all the laser beams in any positions of the scanning region satisfy the designed specifications. In other words, such requirements lead to a critical problem of an image forming apparatus with a high resolution or small diameter of image spots which requires advanced designing techniques.

Moreover, the laser scanning optical system which satisfies such difficult requirements should have larger reflecting surfaces of the scanning unit and larger effective diameters of the constructional lenses than those of the conventional laser beam scanning optical system using one laser beam. In addition, the construction of the former is more complicated than that of the latter. In other words, the former apparatus requires a large number of lenses and accurate adjustments of lens positions. Thus, the conventional production facilities cannot be commonly used.

4-2 Construction of Present Invention

Figure 30:
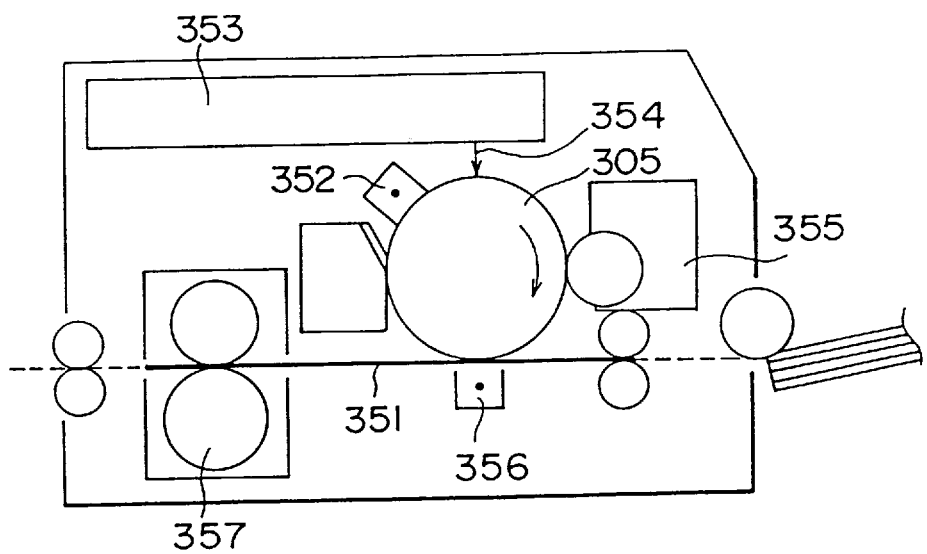
FIG. 30 is a side view showing the image forming apparatus.

FIG. 30 is a schematic diagram showing the overall construction of an image forming apparatus in accordance with the present invention. The process for obtaining a print result on an image transfer material 351 accords with a so-called electrophotographic process. As a image bearing member 305 of an electrophotographic printer using a semiconductor laser as a light source, an organic photoconductor (OPC) with an increased sensitivity in a longer wavelength region has been widely used. This image bearing member 305 is charged to a predetermined surface potential by a charger 352. Thereafter, a laser beam scanning unit 353 performs a light writing process, that is, a light exposing process. In accordance with image information from the laser beam scanning unit 353, a plurality of laser beams 354 whose light intensities are individually modulated are scanned on image bearing member 305 in the axial direction thereof, thereby generating electric charges which neutralize the surface potential only for the exposed portion. Thus, the absolute value of the surface potential of this portion becomes low. As a result, on the image bearing member 305, a distribution of surface potentials in accordance with the image, that is, a static latent image is formed. A developing unit 355 selectively adheres a developing agent in accordance with the surface potentials to the image bearing member 305. Thus, the static latent image is developed. This developing agent is transferred to a transfer material 351 (normally, a paper) by a transferring unit 356. The developing agent on the transfer material 351 is fixed with a thermal pressure by a fixing unit 357. Thereafter, the transfer material 351 is unloaded from the apparatus.

Figure 29:
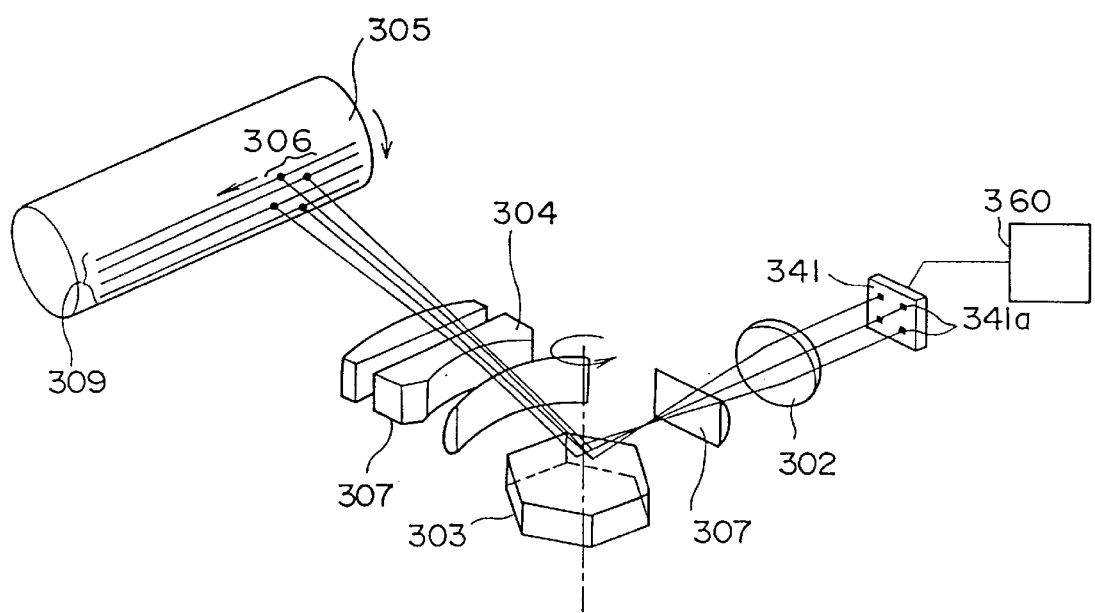
FIG. 29 is a schematic diagram showing a laser scanning optical system of a fourth embodiment of the image forming apparatus in accordance with the present invention.

FIG. 29 is a schematic diagram showing the construction of a laser beam scanning optical system in accordance with the present invention. In the laser beam scanning unit 353 shown in FIG. 30, the laser beams 354 are folded back and downwardly emitted. However, in this example, the illustration of the laser beams is simplified. In the figure, laser beams emitted from a plurality of light emitting portions 341a of a monolithic semiconductor laser array 341 are collimated to laser beams with a predetermined beam diameter by a collimator lens 302. The laser beams are entered into a rotating polygon mirror 303. As the polygon mirror 303 rotates, these laser beams are deflected. The laser beams which pass through an image forming lens 304 are imaged at spots 306 on the image bearing member 305. The lighting and the amount of light of each of the light emitting portions 341a is discretely controlled by a control unit 360.

As a semiconductor laser array having such characteristics, it is preferable to use a so-called surface light emitting type semiconductor laser array. It is more preferable to use a surface light emitting type semiconductor laser array with light emitting portions in which a group II–VI compound semiconductor is embedded.

Figure 31:
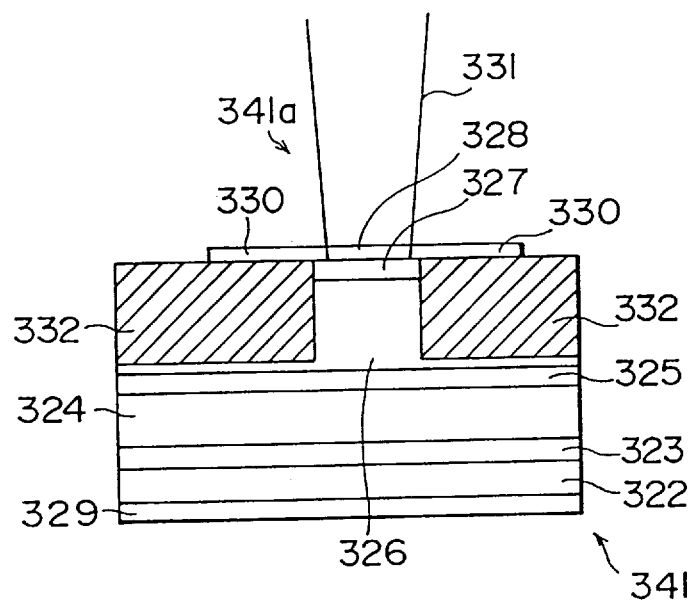
FIG. 31 is a sectional view showing an optical resonator of a surface light emitting type semiconductor laser.

FIG. 31 is a sectional view showing one of the light emitting portions two-dimensionally disposed on a device substrate of the surface light emitting type semiconductor laser array. As shown in the figure, on the Ga—As device substrate 322, a semiconductor laminate reflecting layer 322 is formed. The reflecting layer 322 is composed of several ten layers of two types of Al—Ga—As compounds. On the reflecting layer 322, a clad layer 324, an active layer 325, a clad layer 326, and a contact layer 327 are disposed, each of which is composed of Al—Ga—As compounds. On the contact layer 327, a SiO2 dielectric laminate reflecting layer 328 is formed. On the entire rear surface of the Ga—As substrate, a window-shaped electrode 329 is formed. In addition, in the periphery of the dielectric laminate reflecting layer 328, a window-shaped electrode 330 is formed. Thus, all the parts formed on the Ga—As substrate compose an optical resonator. A light beam which is generated on the active layer 325 reciprocatively travels between the upper reflecting layer 327 and the lower reflecting layer 323 in the direction perpendicular to the surface of the device substrate. Thus, the light beam is oscillated. As a result, the optical axis of the laser beam 331 is nearly perpendicular to the surface of the device substrate. In the periphery of the optical resonator, a group II–VI compound semiconductor is embedded as an embedded layer 332. As a group II–VI compound semiconductor, it is preferable to use a group II–VI compound which contains two, three, or four elements selected from both group II elements Zn, Cd, and Hg and group VI elements O, S, Se, and Te. In addition, it is preferable to match the lattice constant of the compound with that of the semiconductor layers composed of the clad layer 324, the active layer 325, and the clad layer 326. Since the electric resistance of the group II–VI compound semiconductor is very large, the current is effectively closed in the optical resonator. In addition, since the refractive index of the embedded layer 332 differs from that of the Al—Ga—As semiconductor layer, the beam which travels in the optical resonator in the direction just or nearly perpendicular to the surface of the device substrate is totally reflected at the interface with the embedded layer 332. Thus, the beam is effectively closed in the optical resonator.

Therefore, when such a semiconductor laser array is used, the laser oscillation starts with a very small amount of current in comparison with the conventional laser. In other words, the threshold value of the semiconductor laser array is lower than that of the conventional semiconductor laser. Thus, the amount of lost heat is small. In FIG. 31, a diode is formed on the Ga—As device substrate 322. The light generated in the active layer 325 reciprocally travels between the reflection layers 323 and 328. Thus, a laser oscillation takes place. A laser beam 331 is emitted from the reflection layer 328 whose reflectance is smaller than that of the reflection layer 328 in the direction perpendicular to the surface of the device substrate.

In addition, since the sectional area (near field pattern) of the laser beam emitting portions of the surface light emitting type semiconductor laser array is larger than that of the conventional edge emitting type semiconductor laser, the spread angles of the laser beams are small. Although the value of the spread angle just depends on the area of the light emitting window, the area can be precisely controlled by an etching process or the like. Thus, the spread angle can be kept constant. For example, a laser beam with a spread angle of approximately 8 degrees in full width at half maximum can be satisfactorily obtained. Moreover, in the surface light emitting type semiconductor laser, since current and light can be effectively closed in an optical resonator of the laser, the amount of heat generated by each light emitting portion can be decreased. Moreover, when a plurality of light emitting portions are adjacently disposed, mutual optical, electrical, and thermal interferences can be remarkably decreased in comparison with the conventional edge emitting type semiconductor laser array. Thus, the distance of each adjacent light emitting portion can be decreased in comparison with the conventional semiconductor laser. In other words, the order of 50 μm can be accomplished.

As described in the paragraph of the related art, to obtain collimated beams with a diameter of 2 mm by using the above-mentioned surface light emitting type semiconductor laser, the focal length fc of the collimator lens should be approximately 8 mm. In addition, since the distance δ of each adjacent light emitting portion on the semiconductor laser array 341 can be set to as narrow as 50 μm, in the case where four beams are disposed in line, δmax becomes 150 μm. When the reflecting surface of the deflecting unit is disposed in the same position (against the collimator lens) as the embodiment of the related art, the distance q of each adjacent beam reflection position on the reflecting surface becomes ⅕ times the value of the embodiment of the related art. The value of fc/δmax of the embodiment of the related art is approximately 10. On the other hand, according to the present invention, the value of fc/δmax becomes approximately 53. Like the embodiment of the related art, when the distance h from the collimator lens to the reflecting surface is 50 mm, the distance q of each adjacent beam reflection position becomes approximately 0.94 mm. This value is not large in comparison with the collimate diameter Wc of the beams.

In particular, consider the case where the spot diameter on the image bearing member is set to 50 μm so as to form an image with a much higher resolution. By applying the above-mentioned formula, the collimate diameter Wc is doubled (namely, approximately 4 mm). Thus, the focal length fc of the collimator lens is also doubled. The distance q of each adjacent beam reflection position on the reflecting surface is halved.

When each beam is tracked, the distance of each adjacent beam in any position on the optical axis is much smaller than the collimate diameter. Thus, even if an optical system deals with a plurality of laser beams, it is possible to design the optical system by considering only one typical beam. Thus, the design work of the laser scanning optical system is very simplified. When the accuracy of the image spots is not important, the conventional laser beam scanning optical system with one laser beam can be used as it is.

In addition, in the surface light emitting type semiconductor laser, since the light emitting portions can be disposed at any positions where they do not interfere each other, they can be two-dimensionally disposed on the device. The laser beams radiated from the light emitting portions disposed on the device substrate are magnified by the optical magnification M of the scanning optical system, the distance of each adjacent light emitting portion being δ. Thereafter, the resultant beams are imaged at spots on the image bearing member, the distance of each adjacent spot being δ'. The value of M is nearly equal to the ratio of the focal length of the collimator lens and that of the scanning lens.

Now, in an exposing system which scans the image bearing member with four laser beams, consider the relation between scanning lines and image spots. In addition, assume the case where four adjacent scanning lines are drawn with one scanning sequence. Now, the distance of most spaced two of image spots is represented with δ'max. When the image spots are disposed as shown in FIG. 32 (a), the value of δ'max can be decreased in comparison with the case where they are disposed in line as shown in FIG. 32 (b). The positions of the image spots on the image bearing member are similar to those of the light emitting portions on the semiconductor array. Alternatively, when the tilt angle compensation optical system is used, a mapping relation where the sub scanning direction is multiplied by a particular magnification takes place. Thus, in the same optical system, when the value of δ'max is small, the value of δmax is also small. Thus, in the arrangement shown in FIG. 32 (b), the value of q in the formula (9), (10), or (11) becomes small.

Thus, the size of the reflecting surface of the deflecting unit can be accordingly decreased. As a result, the effect of the present invention can be further improved.

In the above example, the case where four laser beams are used was considered. When the number of laser beams is further increased, the light emitting portions can be freely disposed on the semiconductor laser array so that the spots are disposed at the closest positions on the image bearing member. As a result, more significant effects can be obtained than the above-mentioned construction. In FIG. 32 (c), an example of the arrangement of image spots according to scanning line in the case where eight laser beams are used is shown. In other words, by applying the formula (9), when the light emitting portions are disposed in line, δmax=7×δ. However, in the arrangement shown in FIG. 32 (c), the value of q can be calculated substantially as δmax=3×δ in designing the optical system. Thus, the effects of the present invention can be further improved. In addition, since the scanning direction of the image spot 306a is the same as that of the image spot 306e, the corresponding light emitting portions can be driven in the same timing.

The focal length of a collimator lens in the case where a surface light emitting type semiconductor laser array is used is larger than that in the case where the conventional edge emitting type semiconductor laser is used. Thus, the allowance of the distance between the semiconductor laser array and the collimator lens in the direction of the optical axis can becomes large. As a result, the adjustment work in the production stage can be simplified. In addition, the collimator lens can have a resistance to the deviation of its position due to temperature variation and aged tolerance.

As described above, according to the image forming apparatus of the present invention, a plurality of laser beams radiated from a semiconductor laser array are collimated by a collimator lens. The resultant laser beams are deflected by a beam deflecting unit. The resultant laser beams are imaged as spots on a image bearing member through a scanning lens. Thus, an optical writing operation is performed. The focal length fc of the collimator lens of the present invention is larger than that of the embodiment of the related art. In addition, the distance δ of each adjacent light emitting portion on the semiconductor laser array is small. In particular, when the surface light emitting type semiconductor laser array is used, since the spread angles of radiated laser beams are small, the focal length fc of the collimator lens becomes long. Moreover, since the amount of heat generated in each light emitting portion is small and the electric and optical interferences of thereof are small, the distance thereof can be further decreased.

In the case where a tilt angle compensating lens is not used, the distance q of most spaced laser beams disposed in line on the reflecting surface of the deflecting unit is given by the above-mentioned formula (9).

In the case where the tilt angle compensating lens is used, the distance q' of most spaced beams on the tilt angle compensating lens and the distance q of that on the reflecting surface of the deflecting unit are given by the formulas (10) and (11), respectively. By applying the formulas (9) and (10), it is found that q and q' are reversely proportional to fc/δmax. Moreover, by applying the formula (11), since q is proportional to q', they are also reversely proportional to fc/δmax. In this case, on the scanning plane, the formula (9) can be applied.

In other words, when the inverse number of fc/δmax is multiplied by the value equivalent to the size in the direction of the optical axis, the distance of each beam in the direction perpendicular to the optical axis can be obtained. Generally, in a small image forming apparatus which can print data on papers in A4 or similar size, the distance of each adjacent optical element in the direction of the optical axis and the focal length thereof are approximately 50 mm. This value is represented with Z. On the other hand, when converted from the resolution, the collimate diameter of the laser beams is approximately 2 mm. When the maximum distance of most spaced two of beams on each lens surface and the reflecting surface is limited to the collimate diameter, the value of δmax/fc×Z is preferably 2 mm or less. Thus, the value of fc/δmax is preferably 25 or more.

In addition, when a plurality of laser beams are entered into the scanning lens and the distance of most spaced two of beams is 2 mm, the value of Z should be approximately 100 mm. Thus, according to the above-mentioned calculation, the value of fc/δmax is preferably 50 or more.

As described above, when the maximum value of the distance of each adjacent beam on each lens and the reflecting surface is nearly the same as the value of the collimate diameter of the laser beams, the sizes of each lens and the reflecting surface are not remarkably larger than the size of an optical system which scans one laser beam. In addition, when the distance of each adjacent laser beam is smaller than the collimate diameter, a plurality of laser beams can be substantially treated as one laser beam in designing the optical system.

The above-mentioned embodiment is only one embodiment of the present invention. When the spread angle of each beam is small and the distance of each adjacent light emitting portion is small, the same effects can be obtained. In addition, it should be noted that even if the rotating mirror is constructed and/or produced by using a different method such as a plastic injection molding method, the similar effects of the present invention can be attained. Moreover, besides the rotating polygon mirror as the deflecting unit, with a galvano mirror or the like, the same effects can be similarly acquired.

Further, the construction of the surface light emitting type laser described in the above-mentioned embodiment is only an example which can be accomplished. When the above-mentioned relation of the focal distance of the collimate lens and the distance of each adjacent light emitting portion is satisfied, the same effects of the present invention can be obtained regardless of the construction thereof.

It is obvious that the scope of the applications of the image forming apparatus of the present invention includes facsimile machines and display units as well as printing apparatus such as the printers and copy machines. In these apparatuses and units, the same effects of the present invention can be attained.

4-3 Effects

As described above, according to the image forming apparatus of the present invention, in an exposing technique using a plurality of laser beams, with a semiconductor laser array which satisfies predetermined conditions with respect to the focal length of a collimator lens and the distance of each adjacent light emitting portion, the size of the reflecting surface of a scanning unit and the effective diameter of each lens can be decreased without necessity of adding auxiliary optical elements. Thus, the size of the scanning optical system or the image forming apparatus can be reduced and thereby the cost thereof can be decreased.

In addition, since a plurality of laser beams travel on almost the same optical path, a scanning optical system can be designed in the same manner as that with one laser beam. Thus, the number of designing steps of the system can be remarkably reduced and the developing period thereof can be shortened. Moreover, the scanning optical system with one laser beam can be used. Thus, the producibility is remarkably improved.

Further, when a plurality of laser beams enter each optical system which constructs the scanning optical system, provided that the distance of most spaced two of beams is shorter than the collimate diameter of the laser beams, the conventional scanning optical system with one laser beam can be used as it is. In other words, without any modification of the scanning optical system of the image forming apparatus using one laser beam, by increasing the number of laser beams, an image forming apparatus with a high speed can be produced. Thus, unexpected benefits can be obtained in producing the products.

Moreover, since the spread angles of laser beams are small, the distance between the collimator lens and the semiconductor laser array can be increased. The adjustment allowance in the direction of the optical axis of the collimator lens is increased. Thus, as well as the increase of producibility, without influences of aged deterioration and temperature change, images with a predetermined spot diameter can be exposed. As a result, the image quality is improved.

Section 5 Fifth Embodiment of Image Forming Apparatus 5-1 Comparison with Related Art Before describing a fifth embodiment of the present invention, so as to easily understand the conception thereof, the related art thereof will be described.

Figure 41:
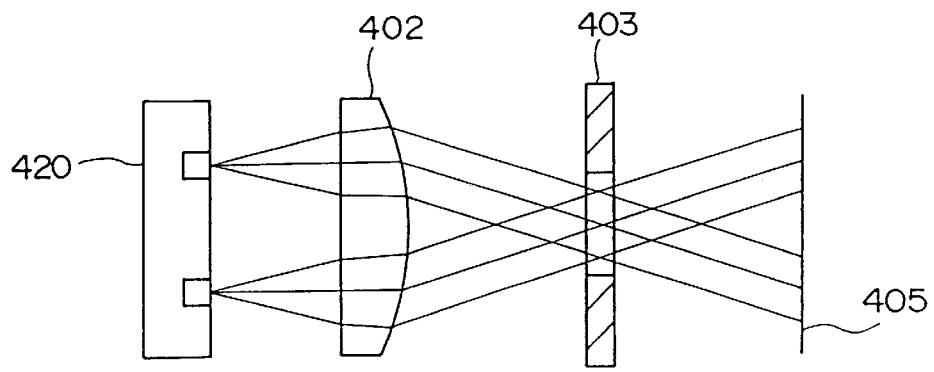
FIG. 41 is an optical side view showing the construction of portions adjacent to a light source of a conventional scanning optical system.
Figure 43:
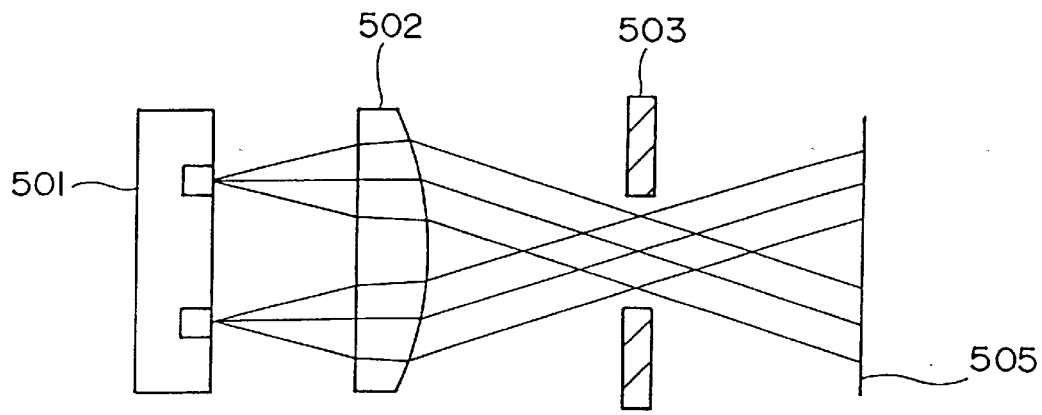
FIG. 43 is an optical side view showing the construction of portions adjacent to a light source of a conventional optical system.

A scanning optical system of a conventional image forming apparatus is disclosed in for example Japanese Patent Laid-Open Publication HEI 3-248114 (see FIG. 41). In the figure, as a light source, an edge emitting type semiconductor laser array 420 where the center axis of emitted beams is nearly in parallel with the surface of a device substrate is used. The edge emitting type semiconductor laser array 420 is disposed on the object side focal plane of a collimator lens 402. At the image side focal position of the collimator lens 402, an aperture stop 403 is disposed.

However, in the above-mentioned related art, since the beam spread angles of beams of the edge emitting type semiconductor laser and the distance of each adjacent light emitting portion thereof are large, the position at which the cross sections of a plurality of beams are matched is limited to a very near position of the image side focal position of the collimator lens. In particular, a large number of beams are disposed in line, the position at which the cross sections of the most spaced beams are matched is further limited to a narrow region. Thus, the position of the aperture stop is limited to a much narrow region. In other words, the degree of freedom of designing a scanning optical system becomes low.

In addition, since the optical system generally uses the holding frame of a lens as an aperture stop. In this case, it is not necessary to provide an independent aperture stop. However, in the above-mentioned related art, since the cross sections of the plurality of beams are not matched at the position of the collimator lens, the holding frame of the collimator lens cannot be used as the aperture stop.

5-2 Construction of the Present Invention

Figure 38:
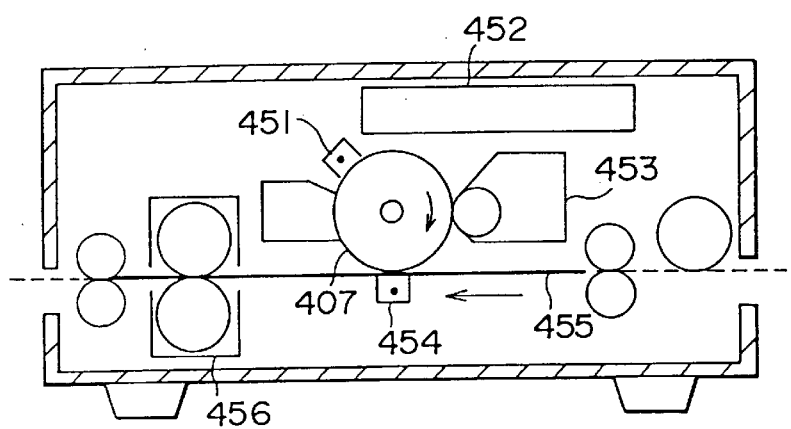
FIG. 38 is a side view showing the image forming apparatus.

FIG. 38 is a schematic diagram showing the construction of an image forming apparatus of the present invention. Next, an image forming process of an electrophotographic printer will be described. A charger 451 applies an equal electric charge to a image bearing member 407. A scanning optical system 452 exposes and scans the image bearing member 407, thereby forming a latent image thereon. Thereafter, a developing unit 453 adheres a developing agent on the latent image so as to form a visible image. An image transferring unit 454 transfers the developing agent, which constructs the visible image, on a transfer material 455 such as a paper. Thereafter, a fixing unit 456 heats and melts the developing agent and fixes it on the transfer material 455.

Figure 37:
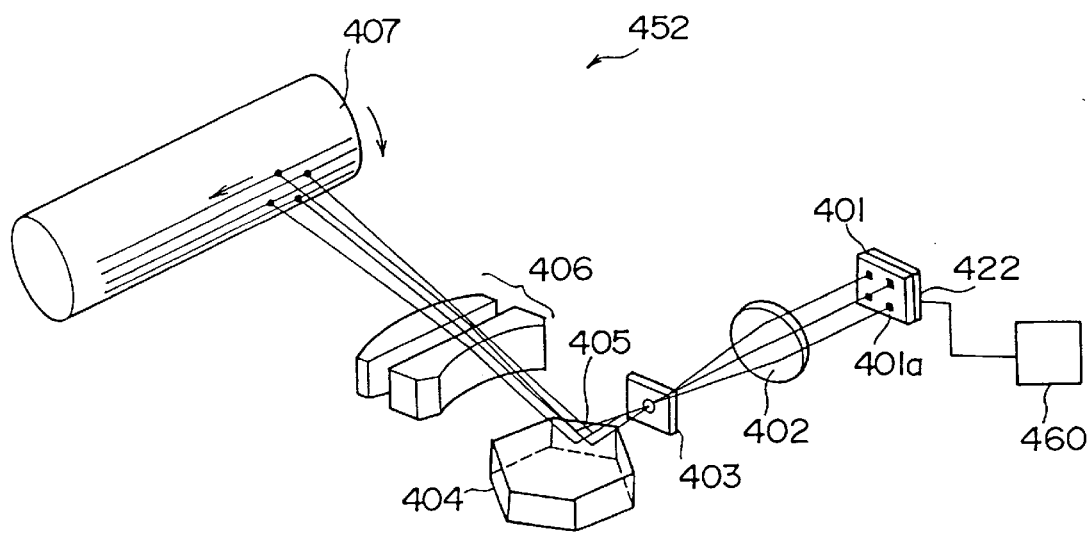
FIG. 37 is a schematic diagram showing a laser scanning optical system of a fifth embodiment of the image forming apparatus in accordance with the present invention.

FIG. 37 is a schematic diagram showing the construction of a scanning optical system of the embodiment of the present invention. The light source of the scanning optical system is a surface light emitting type semiconductor laser array 401 where the center axis of emitted beams is nearly perpendicular to the surface of a device substrate 422. A plurality of beams emitted from light emitting portions 401a on the surface light emitting type semiconductor laser array 401 are collimated by a collimator lens 402. The resultant beams enter a deflecting surface 405 of a rotating polygon mirror 404 which is a deflecting unit through an aperture stop 403. As the polygon mirror 404 rotates, reflected beams are deflected and scanned. The resultant beams are imaged on the image bearing member 407 through an image forming lens 406.

The lighting and the amount of light of each light emitting portion 401a are individually controlled by a control unit 460.

Regardless of the edge emitting type and the surface light emitting type, the spread angles of output beams of a semiconductor laser deviate to some extent depending on a light emitting portion for use. In addition, the diameters of beams collimated by the collimator lens 402 also deviate. However, when the aperture stop 403 is disposed at the position where the cross sections of the beams are nearly matched and the diameter of the aperture stop 403 is almost the same as or slightly smaller than the diameter of each collimated beam, the diameter of each collimated beam which passed through the aperture stop 403 becomes equal. As a result, the diameter of each spot imaged on the image bearing member 407 becomes equal. Thus, a stable and high printing quality can be obtained. The printing quality does not deviate from product to product. The beam spread angles and the diameters of beams are represented as an intensity distribution of cross sections of beams. The intensity distribution accords with a Gaussian distribution. The beam spread angle represents a full width of the angle at which the center intensity is halved. On the other hand, the spot diameter represents a position where the intensity becomes $1/e^2$ times the center intensity.

Next, an effect where the beam diameters are equalized by an aperture stop will be described. When laser beams are limited by an aperture stop, they are diffracted as a characteristic of wave optics. When the center of the aperture stop accords with the center of an incident beam and the effect of diffraction is considered, the diameter d0 of an image spot on the image bearing member can be expressed by the following formula.

$$d_0 = \frac{k\lambda f}{D} \quad (12)$$

where k is a constant; $\lambda$ is the wavelength of a laser beam; f is the focal length of the image forming lens; and D is the diameter of the aperture stop. When the ratio of the diameter d of a beam entered into the aperture stop and the diameter D of the aperture stop is represented as a cutting ratio T=d/D, the constant k can be calculated by the following formula (refer to "LASER & OPTICS GUIDE II", JAPAN Melles Griot K.K).

$$k = 1.6449 + \frac{0.6460}{(T-0.2816)^{1.821}} - \frac{0.5320}{(T-0.2816)^{1.891}} \quad (13)$$

As an example, when the diameter D of the aperture stop is 1 and the diameter d of each incident beam deviates in the range of 1±20%, the deviation of the diameter of each image spot is limited in the range from −3.1% to +5.9%. Thus, the aperture stop has an effect for decreasing the deviation of the diameter of each image spot.

When the aperture stop is disposed at a position where cross sections of a plurality of beams on the optical path are matched at least partially and where powers of all beams except for a beam with the highest power which passed through the aperture stop become 90% or more of the beam with the highest power, the deviation of powers of the beams can be limited to 10% or lower. With this deviation, a high printing quality free of uneven density can be obtained.

Figure 39A:
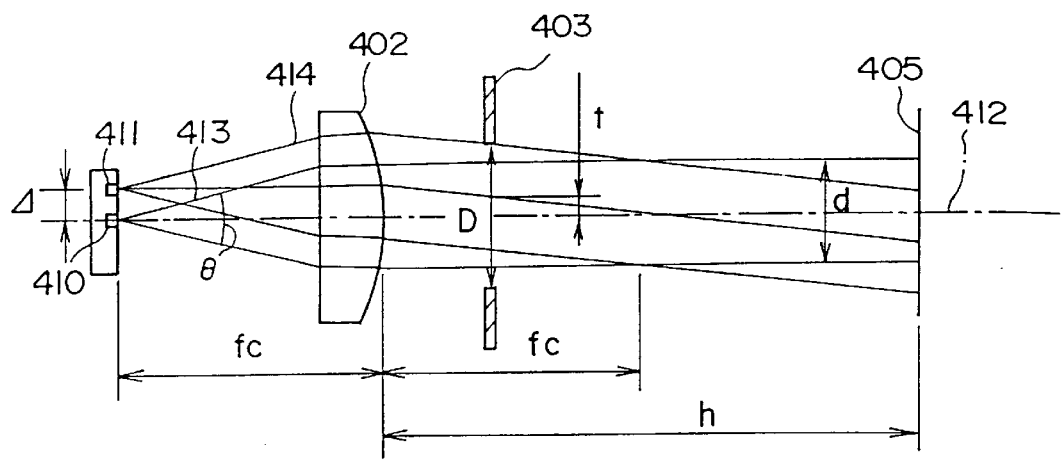
FIG. 39 comprises an optical side view and a diagrams showing the construction of portions adjacent to a light source of the scanning optical system.
Figure 39B:
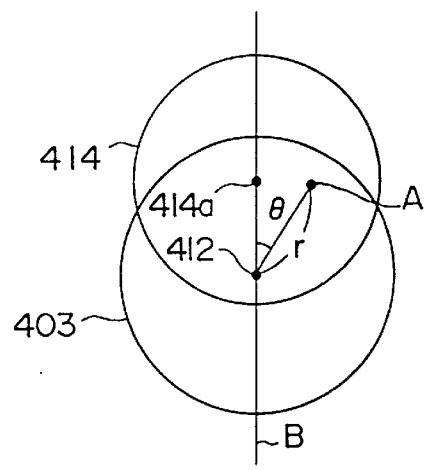

Next, a position of the aperture stop 403 which satisfies the above-mentioned conditions will be specifically described with a system shown in FIG. 39. FIG. 39 (a) is a side view showing a scanning optical system. FIG. 39 (b) is a sectional view at the position of the aperture stop 403. In the surface light emitting type semiconductor laser array 401, the spread angles of laser beams emitted therefrom can be set to 10 degrees of less and the distance of each adjacent light emitting portion can be set to 0.05 mm or less. In FIG. 39, the distance Δ between light emitting portions A410 and B411 is set to 0.05 mm and the light emitting portion A410 is disposed on an optical axis 412 of the optical system. Beams emitted from the light emitting portions A410 and A411 are referred to as beams A413 and B414, respectively. When the spread angle θ of each radiated beam is 10 degrees; the focal length fc of the collimator lens 402 is 10 mm; and the distance h from the collimator lens 402 to the deflecting surface 405 of the rotating polygon mirror is 100 mm, then the diameter d of the beams becomes 3.0 mm. Now, assume that the center of the aperture stop 403 is present on the optical axis 412 and that the diameter D of the aperture stop 403 is equal to the beam diameter d.

When the intensity distribution of the cross section of a laser beam accords with a Gaussian distribution, the intensity I of the laser beam can be expressed by the following formula.

$$I = \frac{2P}{\pi w^2} \exp\left\{-2\left(\frac{x}{w}\right)^2\right\} \quad (14)$$

where P is the entire power of a beam; w is the radius of the beam; and x is the distance from the center of the beam. The power of the beam A413 which passed through the aperture stop 403 can be obtained by integrating the above formula as the formula (15).

$$\int_0^W 2\pi x I\, dx \quad (15)$$

The resultant value is 86.5% of the power P of which the beam does not pass through the aperture stop 403. Thus, the power of the beam B414 should be 77.9% or more of the power where the beam passed through the aperture stop 403 because of 86.5×0.9=77.9 (%). Next, the power of the beam B414 which passed through the aperture stop 403 will be obtained. When the distance between the center axis of the beam B414 and the optical axis 412 on the plane of the aperture stop 403 is t, the cross sectional intensity I of the beam B414 which has not yet passed through the aperture stop 403 can be expressed with a cylindrical coordinate system by the following formula.

$$I = \frac{2P}{\pi w^2} \exp\left[-\frac{2}{w^2}\{(r\cos\phi - t)^2 + (r\sin\phi)^2\}\right] \quad (16)$$

where r is the distance from the optical axis 412 to any point A on the aperture stop 403; and φ is the angle made of a plane B, which is produced by the optical axis 412 and the center axis 414a of the beam B414, and the line where the optical axis 412 and the point A are connected. The power of the beam B414 which passed through the aperture stop 403 can be obtained by integrating the above formula by the following formula.

$$\int_0^{2\pi}\int_0^W I\,dx\,d\phi \quad (17)$$

When the ratio of t and the beam diameter d is 0.200, the power of the beam which passed through the aperture stop 403 becomes 77.9% of the power P which has not yet passed through the aperture stop 403. Thus, the same result is obtained. In other words, when the aperture stop 403 is disposed at a position where t/d becomes 0.200 or less, the difference of the powers of the beams A413 and B414 which passed through the aperture stop 403 becomes 10% or less. When the aperture stop 403 is disposed at the position of the collimator lens 402 or at the position of the deflecting surface 405 of the rotating polygon mirror, the respective distances t are 0.05 mm and 0.45 mm and the respective values of t/d are 0.017 and 0.15. In each case, t/d is less than 0.200. Thus, the aperture stop 403 can be disposed at any position midway between the collimator lens 402 and the deflecting surface 405 of the rotating polygon mirror. As a result, the degree of freedom of designing the optical system can be increased. In addition, even if the number of beams which are disposed in line is increased, the aperture stop 403 can be disposed at the position of the collimator lens 402. Thus, the holding frame of the collimator lens 402 can be used as the aperture stop. Since an independent aperture stop is not necessary, the number of constructional elements can be decreased.

Although in the embodiment the aperture stop was disposed midway between the collimator lens and the rotating polygon mirror, provided that the above-mentioned conditions are satisfied, the aperture stop can be disposed midway between the surface light emitting type semiconductor laser array and the collimator lens. In addition, the optical system disposed midway between the light source and the rotating polygon mirror is not limited to the collimator lens which collimates beams.

Figure 40:
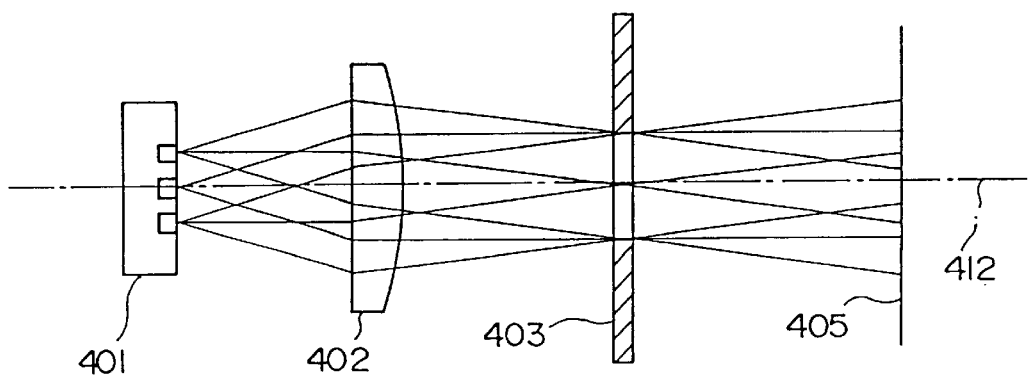
FIG. 40 is an optical side view showing the construction of portions adjacent to a light source of a scanning optical system of another embodiment.

FIG. 40 is a schematic diagram showing the construction of elements disposed from a semiconductor laser to a rotating polygon mirror as another embodiment. An aperture stop 403 is disposed at a position where the center axes of a plurality of beams are intersected with an optical axis 412.

In this construction, on the plane of the aperture stop 403, the center axes of the beams are completely matched each other. Thus, the regularity of the diameters of image spots and that of powers thereof are improved in comparison with the above-mentioned embodiment. When higher characteristics are required for image spots, this construction can be also used. In this embodiment, the optical system disposed midway between the light source and the rotating polygon mirror is not limited to the collimator lens which collimates beams.

5-3 Effects

As described above, according to the present invention, since the aperture stop is disposed at the position where the cross sections of a plurality of beams are nearly matched on the optical path midway between the surface light emitting type semiconductor laser array and the deflecting unit, even if the spread angles of the beams deviate, the diameters of the image spots can be kept equal. Thus, a stable and high printing quality can be obtained. In addition, since the aperture stop can be disposed at any position in a wide range on the optical path midway between the semiconductor laser array and the deflecting unit or since the holding frame of the collimator lens can be used as the aperture stop, the degree of freedom of designing the optical system can be increased.

Section 6 Sixth Embodiment of Image Forming Apparatus 6-1 Comparison with Related Art Before describing a sixth embodiment of the present invention, so as to easily understand the conception thereof, the related art thereof will be described.

A scanning optical system of an image forming apparatus using a semiconductor laser array which has been conventionally used is disclosed in for example Japanese Patent Laid-Open Publication Serial No. HEI 3-248114. A semiconductor laser array 501 is disposed on an object side focal position of a collimator lens 502. At the image side focal position of the collimator lens 502, an aperture stop 503 is disposed.

However, in this related art, since the position of the aperture stop is limited to the image side focal position of the collimator lens, the degree of freedom of designing an optical system is low. Moreover, in a conventional optical system, a holding frame of a lens is sometimes used for an aperture stop. However, according to the related art, such a construction cannot be accomplished.

6-2 Construction of the Present Invention

FIG. 48 is a schematic diagram showing the construction of an image forming apparatus of the present invention. Next, this image forming process will be described. A charger 551 applies an equal electric charge to a image bearing member 507. A scanning optical system 552 exposes and scans the image bearing member 507, thereby forming a latent image thereon. Thereafter, a developing unit 553 adheres a developing agent on the latent image so as to form a visible image. An image transferring unit 554 transfers the developing agent, which constructs the visible image, on a transfer material 555 such as a paper. Thereafter, a fixing unit 556 heats and melts the developing agent and fixes it on the transfer material 555.

FIG. 42 is a schematic diagram showing the construction of a scanning optical system of the embodiment of the present invention. A plurality of beams emitted from a semiconductor laser array 501 are collimated by a collimator lens 502. The resultant beams enter one of deflecting surfaces 505 of a rotating polygon mirror 504 which is a deflecting unit through an aperture stop 503. As the polygon mirror 504 rotates, emitted beams are deflected and scanned. The resultant beams are imaged on the image bearing member 507 through an image forming lens 506.

In FIGS. 42 and 49, the aperture stop 503 is disposed on the optical path midway between the semiconductor laser array 501 and the deflecting unit 504. When the focal length of the collimator lens 502 is f; the distance from the deflecting unit 504 side focal point of the collimator lens 502 to the aperture stop 503 is s; the distance from the optical axis of the collimator lens 502 to the optical axis of a light emitting portion which is most spaced from the optical axis of the collimator lens 502 is t; the diameter of the aperture stop 503 is D; and the diameter of a collimated beam is d, then the relations given by the following formulas can be obtained.

$$\frac{st}{f} \leq 0.12 \left(\frac{D}{d}\right)^{2.3} + 0.17 \quad (18)$$

$$\frac{D}{d} \leq 2 \quad (19)$$

Alternatively, instead of the formulas (18) and (19), the relations given by the following formulas can be obtained.

$$\frac{st}{f} \leq 0.06 \left(\frac{D}{d}\right)^{2.9} + 0.08 \quad (20)$$

$$\frac{D}{d} \leq 2 \quad (21)$$

Generally, the spread angles of output beams of a semiconductor laser 501 deviate to some extent depending on a light emitting portion for use. In addition, the diameters of beams collimated by the collimator lens 502 also deviate. However, when the aperture stop 503 is disposed at the position where the cross sections of the beams are nearly matched and the diameter of the aperture stop 503 is almost the same as or slightly smaller than the diameter of each collimated beam, the diameter of each collimated beam which passed through the aperture stop 403 becomes equal. As a result, the diameter of each spot imaged on the image bearing member 505 becomes equal. Thus, a stable and high printing quality can be obtained. The printing quality does not deviate from product to product. The beam spread angles and the diameters of beams are represented as an intensity distribution of cross sections of beams. The intensity distribution accords with a Gaussian distribution. The beam spread angle represents a full width of the angle at which the center intensity is halved. On the other hand, the spot diameter represents a position where the intensity becomes $1/e^2$ times the center intensity.

Next, an effect where the beam diameters are equalized by an aperture stop 503 will be described. When laser beams are limited by the aperture stop 503, they are diffracted as a characteristic of wave optics. When the center of the aperture stop accords with the center of an incident beam and the effect of diffraction is considered, the diameter d0 of an image spot on the image bearing member 505 can be expressed by the following formula.

$$d_0 = \frac{k\lambda f}{D} \quad (22)$$

where k is a constant; $\lambda$ is the wavelength of a laser beam; f is the focal length of the image forming lens; and D is the diameter of the aperture stop. When the ratio of the diameter d of a beam entered into the aperture stop and the diameter D of the aperture stop is represented as a cutting ratio T=d/D, the constant k can be calculated by the following formula (refer to "LASER & OPTICS GUIDE II", JAPAN Melles Griot K.K).

$$k = 1.6449 + \frac{0.6460}{(T - 0.2816)^{1.821}} - \frac{0.5320}{(T - 0.2816)^{1.891}} \quad (23)$$

As an example, when the diameter D of the aperture stop is 1 and the diameter d of each incident beam deviates in the range of 1±20%, the deviation of the diameter of each image spot is limited in the range from −3.1% to +5.9%. Thus, the aperture stop has an effect for decreasing the deviation of the diameter of each image spot.

Figure 45:
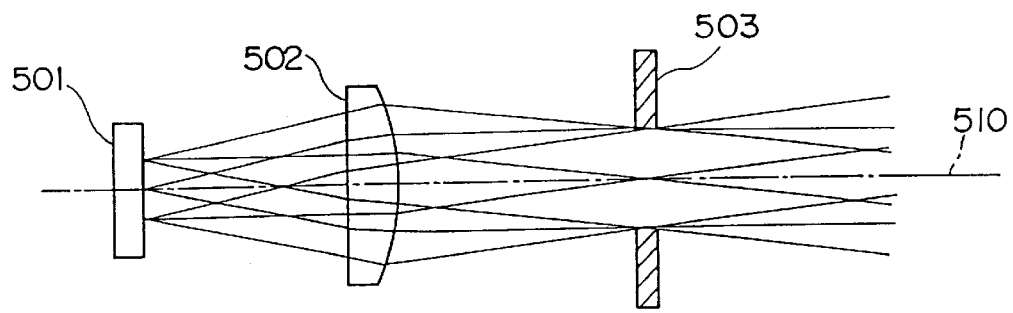
FIG. 45 is an optical side view showing a beam which passes through an aperture stop disposed at a focal point of a collimator lens.

The distribution of intensity of the cross sections of beams collimated by the collimator lens 502 nearly accords with a Gaussian distribution. As shown in FIG. 44, when a collimated beam passes through the aperture stop 503, the periphery of the beam is vignetted. Thus, the power of the beam which passed through the aperture stop 503 decreases. As shown in FIG. 45, when the aperture stop 503 is disposed at the position of the deflecting unit side focal point of the collimator lens 502, since all the center axes of the beams which passed through the aperture stop 503 are matched, the power decrease of each beam which passed through the aperture stop 503 is equal. However, when the position of the aperture stop 503 is limited to the position of the deflecting unit side focal point of the collimator lens 502, the degree of freedom of designing the optical system decreases.

Figure 46:
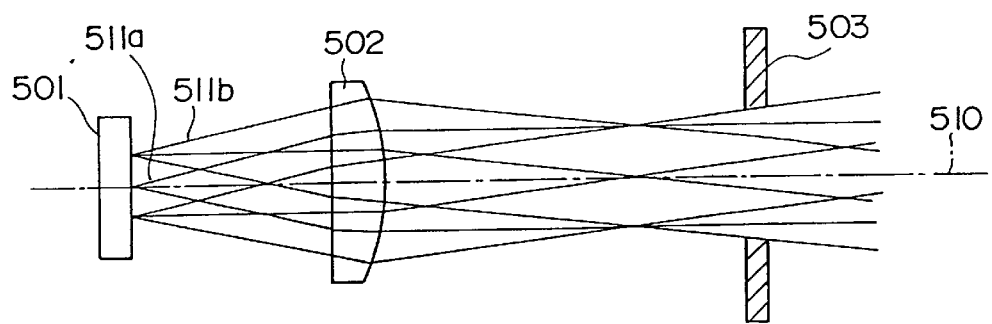
FIG. 46 is an optical side view showing a beam which passes through an aperture stop disposed at other than a focal point of a collimator lens.
Figure 47A:
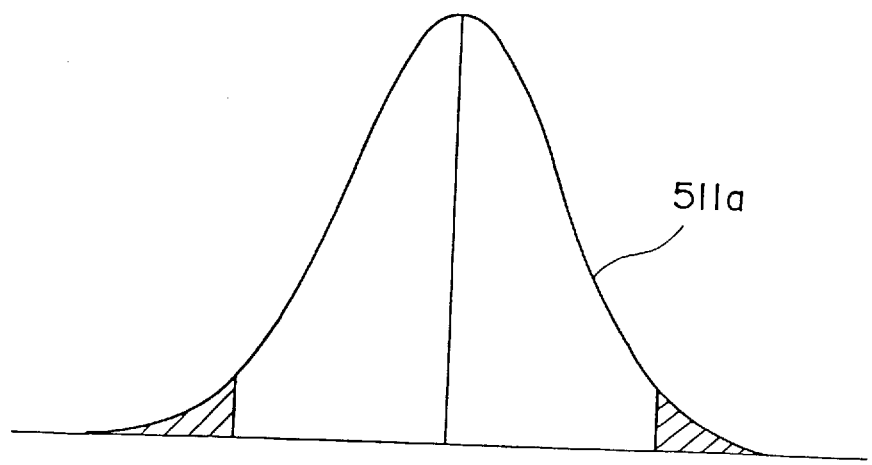
FIG. 47 comprises charts showing distributions of beam sectional intensity in the case where a beam is vignetted.
Figure 47B:
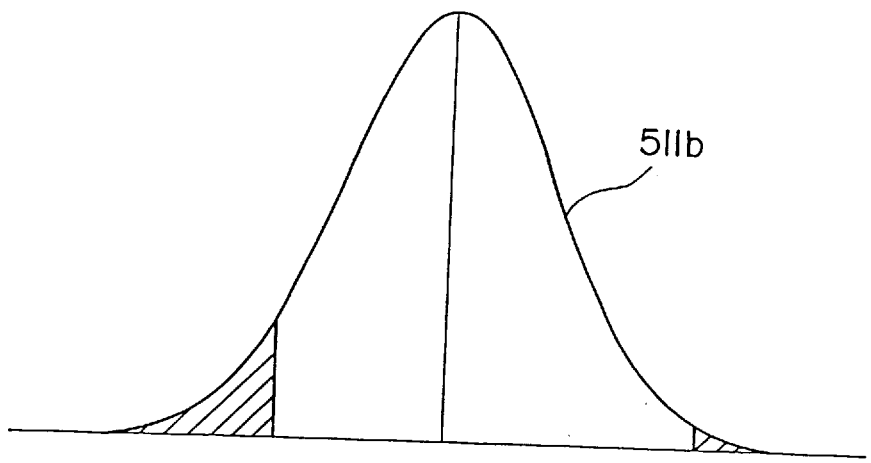

As shown in FIG. 46, when the aperture stop 503 is disposed at a position apart from the deflecting unit side focal point of the collimator lens 502, the center axes of a plurality of beams which passed through the aperture stop 503 are not matched each other. Thus, when a beam 511a which travels along an optical axis 510 of the collimator lens 502 and a beam 511b which travels with an inclination to the optical axis 510 pass through the aperture opening 503, they are vignetted in different manners. FIG. 47 shows the difference of the vignetting manners. FIG. 47 (a) shows the vignetting manner of the beam 511a, while FIG. 47 (b) shows the vignetting manner of the beam 511b. In these figures, the portions of intensity distributions of cross sections of beams which are vignetted by the aperture stop are hatched. The powers of beams which passed through the aperture stop 503 differ one by one. In this condition, the power of the beam 511a is larger than that of the beam 511b. When the difference between these powers exceeds a predetermined level, uneven density takes place on a printed paper. However, when this difference is in a particular range, a substantially good printing quality can be obtained. Thus, the allowable range where the aperture stop can be disposed is present.

When the condition represented by the formula (18) is satisfied, the fluctuation of powers of beams which passed through the aperture stop 503 can be suppressed to 20% or less. However, since the formula (18) is an approximate formula, it is satisfied under the condition of the formula (19). On the other hand, when the condition represented by the formula (19) is satisfied, the fluctuation of powers of beams which passed through the aperture stop 503 can be suppressed to 5% or less. Likewise, the formula (20) is an approximate formula. Thus, this formula is satisfied under the condition of the formula (21).

According to an experiment conducted by the applicant of the present invention, when only letters and lines are printed with the image forming apparatus, if the fluctuation of powers of image spots is approximately 20% or less, a good printing quality can be obtained. If the fluctuation is larger than 20%, the printing quality is degraded. On the other hand, when half tone patterns of graphic images or small dots are printed, the fluctuation of powers of image spots results in uneven density of printed images. To obtain a good printing quality, the fluctuation should be limited to approximately 5% or less. Thus, the conditions given by the formulas (18) and (19) are suitable for image forming apparatuses which only print letters and lines. On the other hand, the conditions given by the formulas (20) and (21) are suitable for image forming apparatus which print not only letters, but half tones and mesh dots.

According to the above-mentioned conditions, the aperture stop 503 can be disposed at any position in a wide range on the optical path between the semiconductor laser array 511 and the deflecting unit 503. Thus, the degree of freedom of designing an optical system is increased. Alternatively, the holding frame of the collimator lens 502 can be used as the aperture stop. In other words, since an independent aperture stop is not necessary, the number of constructional elements can be decreased.

Next, a position of the aperture stop 503 which satisfies the above-mentioned conditions will be specifically described with a system shown in FIG. 49. Now, consider the case where a surface light emitting type semiconductor laser array is used as the semiconductor laser array 501. The surface light emitting type semiconductor laser is a semiconductor laser where the center axes of beams emitted are nearly perpendicular to the surface of a device substrate. In the surface light emitting type semiconductor laser array 501, the spread angles of laser beams emitted therefrom can be set to 10 degrees or less and the distance of each adjacent light emitting portion can be set to 0.05 mm or less. Now, consider the semiconductor laser array 501 having two light emitting portions. The distance t between the light emitting portions 512a and 512b is set to 0.05 mm and the light emitting portion 512a is disposed on an optical axis 510 of the collimator lens 502. The lighting and the amount of light of the light emitting portions 512a and 512b are controlled by a control unit 560 (see FIG. 42). Beams emitted from the light emitting portions 511a and 511b are referred to as beams 511a and 511b, respectively. When the spread angle θ of each radiated beam is 10 degrees; the focal length f of the collimator lens 502 is 10 mm; and the distance h from the collimator lens 502 to the deflecting surface 505 of the rotating polygon mirror is 50 mm, then the diameter d of the beams becomes 3.0 mm. Now, assume that the center of the aperture stop 503 is present on the optical axis 510 and that the diameter D of the aperture stop 503 is equal to the beam diameter d.

Since D/d=1, both the conditions given by the formulas (19) and (21) are satisfied. According to the condition given by the formula (18), since s≦58 mm, the aperture stop 503 can be disposed at any position midway between the collimator lens 502 and the deflecting surface 505 of the rotating polygon mirror. On the other hand, according to the condition given by the formula (20), since s≦28 mm, the aperture stop 503 can be disposed at any position midway between the deflecting surface 505 side focal point of the collimator lens 502 and the position 28 mm right of the deflecting surface 505. In addition, even if the number of light emitting portions which are disposed in line is increased and thereby the value of t becomes large, provided that the conditions given by the formulas (18) and (19) are satisfied, when the number of the light emitting portions is 12 or less, the aperture stop 503 can be disposed. On the other hand, according to the conditions given by the formulas (20) and (21), when the number of light emitting portions is six or less, the aperture stop 503 can be disposed at the position of the collimator lens 502. When the aperture stop 503 can be disposed at the position of the collimator lens 502, since the holding frame of the collimator lens 502 can be used as an aperture stop, an independent aperture stop is not necessary and thereby the number of constructional elements of the scanning optical system can be decreased.

6-3 Effects

As described above, according to the present invention, an aperture stop is disposed on an optical path midway between a semiconductor laser array and a deflecting unit in the conditions given by the formulas (18) and (19). Thus, even if the spread angles of the beams deviate, the diameters of the image spots can be kept equal. Thereby, a stable and high printing quality can be obtained. In addition to a high printing quality of letters and lines, an aperture stop can be disposed on an optical path at any position in a wide range between a semiconductor laser array and a deflecting unit.

Alternatively, a holding frame of a collimator lens can be used as an aperture stop. As a result, the degree of freedom of designing an optical system is improved.

Moreover, an aperture stop is disposed on an optical path midway between a semiconductor laser array and a deflecting unit in the conditions given by the formulas (20) and (21). Thus, even if the spread angles of the beams deviate, the diameters of the image spots can be kept equal. Thereby, a stable and high printing quality can be obtained. In addition to a high printing quality of not only letters and lines, but half tone images and mesh points, an aperture stop can be disposed on an optical path at any position in a wide range between a semiconductor laser array and a deflecting unit. Alternatively, a holding frame of a collimator lens can be used as an aperture stop. As a result, the degree of freedom of designing an optical system is improved.

Industrial Utilization

The image forming apparatus according to the present invention can print data on papers at a high speed by using an electrophotographic process. The image forming apparatus can be used as an output unit of a computer, a facsimile machine, a multi-functional copy machine, and so forth.

We claim:

1. In an image forming apparatus, comprising:
an image bearing member (5) having a surface for forming a static latent image thereon; and
means comprising a laser beam scanning unit (53) for scanning said surface of said image bearing member (5) with a plurality of laser beams to form said static latent image;
the improvement wherein said laser beam scanning unit (53) comprises:
an array (21) of light emitting portions (21a) of one semiconductor substrate (22) for emitting laser beams from a surface of said semiconductor substrate and means for controlling lighting and amount of light emission of each of said light emitting portions (21a) individually;
means comprising a deflecting unit (3) for deflecting said laser beams emitted from said light emitting portions (21a) to said surface of said image bearing member (5);
wherein said light emitting portions (21a) are disposed two-dimensionally on said surface of said semiconductor substrate, each of said laser beams has a corresponding spot of a plurality of spots (6) different from each other, said spots are disposed two-dimensionally on said surface of said image bearing member (5) and each of said spots (6) runs along a scanning line on said surface of said image bearing member (5) which is different from scanning lines of others of said spots (6); and
wherein each of said light emitting portions (21a) of said semiconductor laser array (21) has an optical axis substantially perpendicular to said surface of said device substrate.

2. The image forming apparatus as set forth in claim 1, wherein each of said laser beams enters into said deflecting unit (3), without passing through any lenses.

3. The image forming apparatus as set forth in claim 1, wherein said deflecting unit is a rotating mirror with one reflecting surface.

4. The image forming apparatus as set forth in claim 3, wherein said reflecting surface of said rotating mirror is so disposed that said reflecting surface geometrically contains a rotating axis thereof; and wherein at least one center axis of each of said laser beams is reflected from said reflecting surface near said rotating axis thereon.

5. A laser beam scanning unit, comprising:

an array (21) of light emitting portions (21a) of one semiconductor substrate for emitting laser beams from a surface of said semiconductor substrate and means for controlling lighting and amount of light emitting portions (21a) individually; and means comprising a deflecting unit (3) for deflecting said laser beams emitted from said light emitting portions (21a);

wherein said light emitting portions (21a) are disposed two-dimensionally on said surface of said semiconductor substrate, each of said laser beams has a corresponding spot of a plurality of spots different from each other, said spots are disposed two-dimensionally on a scanned surface, and each of said spots runs along a scanning line which is different from scanning lines of others said spots; and wherein each of said light emitting portions has an optical axis substantially perpendicular to said surface of said semiconductor substrate.

* * * * *

UNITED STATES PATENT AND TRADEMARK OFFICE
CERTIFICATE OF CORRECTION

PATENT NO. : 5,870,132
DATED : February 9, 1999
INVENTOR(S) : Nozomu INOUE, et al.

It is certified that error appears in the above-identified patent and that said Letters Patent is hereby corrected as shown below:

On title page, item 60, after "5,610,647" insert -- which was PCT/JP92/00620 filed May 14, 1992. --

Signed and Sealed this

First Day of June, 1999

Attest:

Attesting Officer

Q. TODD DICKINSON

Acting Commissioner of Patents and Trademarks